(12) United States Patent
Sugihara et al.

(10) Patent No.: US 12,135,093 B2
(45) Date of Patent: Nov. 5, 2024

(54) VALVE DEVICE

(71) Applicant: AISAN KOGYO KABUSHIKI KAISHA, Obu (JP)

(72) Inventors: Koichi Sugihara, Chiryu (JP); Mamoru Yoshioka, Nagoya (JP); Shinji Kawai, Gifu (JP); Takashi Bessho, Chiryu (JP); Koki Yasuda, Tokai (JP); Kaisho So, Nagoya (JP); Hirotaka Fukuta, Kariya (JP); Mizuki Kodama, Toyota (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 162 days.

(21) Appl. No.: 17/639,873

(22) PCT Filed: Sep. 9, 2020

(86) PCT No.: PCT/JP2020/034037
§ 371 (c)(1),
(2) Date: Mar. 2, 2022

(87) PCT Pub. No.: WO2021/049507
PCT Pub. Date: Mar. 18, 2021

(65) Prior Publication Data
US 2022/0333708 A1    Oct. 20, 2022

(30) Foreign Application Priority Data

Sep. 11, 2019 (JP) .................................. 2019-165224

(51) Int. Cl.
*F16K 27/02* (2006.01)
*F02M 26/66* (2016.01)
(Continued)

(52) U.S. Cl.
CPC ............ *F16K 27/029* (2013.01); *F02M 26/66* (2016.02); *F02M 26/72* (2016.02); *F02M 26/70* (2016.02); *Y02T 10/12* (2013.01)

(58) Field of Classification Search
CPC ...... F16K 27/029; F02M 26/66; F02M 26/72; F02M 26/70; Y02E 10/12
(Continued)

(56) References Cited

U.S. PATENT DOCUMENTS 2,108,234 A * 2/1938 Gwynne ............. F16K 31/1262
251/363
2,645,450 A * 7/1953 Chessman ............ F16K 27/041
137/625.68

(Continued)

FOREIGN PATENT DOCUMENTS

| FR | 3 068 433 A1 | 1/2019 |
|---|---|---|
| JP | 2015-17506 A | 1/2015 |
| JP | 2016-6298 A | 1/2016 |

OTHER PUBLICATIONS

Nov. 10, 2020 International Search Report issued in International Application No. PCT/JP2020/034037.
(Continued)

*Primary Examiner* — William M McCalister
(74) *Attorney, Agent, or Firm* — Oliff PLC

(57) ABSTRACT

An EGR valve includes: an inner housing including a flow passage; a valve element which opens and closes the flow passage; a valve shaft on which the valve element is provided; an outer housing in which the inner housing is assembled; and a drive unit which drives the valve shaft. The flow passage of the inner housing includes an inlet and an outlet. The outer housing includes an assembly hole and separate flow passages. When the inner housing is assembled in the assembly hole, the inlet and the outlet of the inner housing communicate with the separate flow
(Continued)

passages of the outer housing; an inlet sealing member is provided between the inner housing and the outer housing to correspond to the periphery of the inlet; and an outlet sealing member is provided between the inner housing and the outer housing to correspond to the periphery of the outlet.

11 Claims, 34 Drawing Sheets

(51) Int. Cl.
    *F02M 26/70* (2016.01)
    *F02M 26/72* (2016.01)

(58) Field of Classification Search
    USPC .......................................... 251/363, 318–334
    See application file for complete search history.

(56) References Cited

U.S. PATENT DOCUMENTS

| | | | | | |
|---|---|---|---|---|---|
| 2,767,730 | A | * | 10/1956 | Laird | F16K 1/422 251/363 |
| 3,071,344 | A | * | 1/1963 | Banks | F16K 1/52 251/210 |
| 3,327,991 | A | * | 6/1967 | Wallace | F16K 1/385 251/363 |
| 3,497,177 | A | * | 2/1970 | Hulsey | F16K 3/0227 251/363 |
| 3,744,754 | A | * | 7/1973 | Demi | F16K 43/00 251/363 |
| 3,825,225 | A | * | 7/1974 | Demi | F16K 43/00 251/363 |
| 3,892,384 | A | * | 7/1975 | Myers | F16K 39/022 251/282 |
| 3,951,170 | A | * | 4/1976 | Hill | F16K 27/04 137/625.48 |
| 4,078,574 | A | * | 3/1978 | Kosarzecki | F16K 27/048 251/366 |
| 4,446,887 | A | * | 5/1984 | Redmon | F16K 47/04 251/363 |
| 4,491,155 | A | * | 1/1985 | Meyer | F16K 11/0712 251/324 |
| 4,493,338 | A | * | 1/1985 | Petursson | F16K 27/02 251/210 |
| 4,548,383 | A | * | 10/1985 | Wolfges | G05D 16/2024 137/625.68 |
| 4,666,126 | A | * | 5/1987 | Tujimura | F16K 39/02 251/282 |
| 4,669,702 | A | * | 6/1987 | Tripp | F16K 1/44 251/210 |
| 4,809,746 | A | * | 3/1989 | Wolfges | F16K 39/04 251/30.01 |
| 5,020,774 | A | * | 6/1991 | Christianson | F16K 3/32 251/363 |
| 5,063,961 | A | * | 11/1991 | Brunner | F16J 15/104 251/363 |
| 5,701,874 | A | * | 12/1997 | Sari | F02M 26/53 60/605.2 |
| 5,794,651 | A | * | 8/1998 | Miller | F16K 31/363 251/30.02 |
| 6,217,001 | B1 | * | 4/2001 | Gluchowski | F02M 26/67 251/129.07 |
| 6,932,321 | B2 | * | 8/2005 | Baumann | F16K 27/04 277/530 |
| 7,987,868 | B2 | * | 8/2011 | Perrin | F02M 26/70 251/363 |
| 8,813,771 | B2 | * | 8/2014 | Rayment | F16K 25/00 251/327 |
| 10,371,309 | B2 | * | 8/2019 | Gazave | F16L 59/141 |
| 2009/0095933 | A1 | * | 4/2009 | McGuire | F16K 3/0236 251/326 |
| 2009/0218536 | A1 | * | 9/2009 | Wears | F16K 11/044 251/319 |
| 2012/0312402 | A1 | | 12/2012 | Tyler | |

OTHER PUBLICATIONS

Mar. 15, 2022 International Preliminary Report on Patentability issued in International Application No. PCT/JP2020/034037.

* cited by examiner

VALVE DEVICE

CROSS-REFERENCE TO RELATED APPLICATIONS

This is a US national phase application based on the PCT International Patent Application No. PCT/JP2020/034037 filed on Sep. 9, 2020, and claiming the priority to Japanese Patent Application No. 2019-165224 filed on Sep. 11, 2019, the entire contents of which are incorporated by reference herein.

TECHNICAL FIELD

The technique disclosed in this description relates to a valve device to be provided in a passage for a fluid and used to regulate a flow rate of the fluid.

BACKGROUND ART

Conventionally, as one example of the technique of the above type, there has been known an EGR valve described in Patent Document 1 listed below. This EGR valve is provided with a housing internally including a flow passage for EGR gas, a valve seat provided in the flow passage, a valve element provided to be seatable on the valve seat, and a valve shaft placed in the housing to extend through the flow passage, the valve element being provided on the valve shaft. The flow passage includes a bent part that bends from a coaxial direction with the valve shaft to a direction intersecting the valve shaft. The housing has a nearly cylindrical shape and includes an inlet at one end in the axial direction and an outlet in the outer periphery of the housing. The EGR valve is assembled to an EGR passage, which is a mating member, in such a way that the housing is inserted in a mounting hole provided in the EGR passage. Herein, a sealing structure is provided between the housing of the EGR valve and the mounting hole to seal between them. This sealing structure includes sealing members (O-rings) placed in the outer periphery of the housing, at two positions opposing relative to the outlet of the flow passage.

RELATED ART DOCUMENTS

Patent Documents

Patent Document 1: Japanese unexamined patent application publication No. 2015-17506

SUMMARY OF INVENTION

Problems to be Solved by the Invention

However, in the sealing structure of the EGR valve described in Patent Document 1, one of the sealing members is provided corresponding to the periphery of the inlet of the flow passage, but the other sealing member is not provided corresponding to the periphery of the outlet of the flow passage. Therefore, around the outlet of the flow passage, a gap can be formed between the housing and the inner wall of the mounting hole. This may cause the EGR gas or condensed water to intrude in between the boundary surfaces of the housing and the inner wall of the mounting hole through the gap and the condensed water to accumulate on the boundary surfaces. Further, the accumulated condensed water may corrode metal components.

The present disclosure has been made to address the above problems and has a purpose to provide a valve device capable of preventing a fluid from intruding between boundary surfaces of a housing and a mating member through an inlet and an outlet of a flow passage while the housing is assembled in the mating member, and also to prevent leakage of a fluid to the outside of the flow passage and suction of outside air from the outside of the flow passage.

Means of Solving the Problems (1) To achieve the above-mentioned purpose, one aspect of the present invention provides a valve device comprising: a housing including a flow passage for a fluid, the flow passage including an inlet and an outlet provided in the housing; a valve element for opening and closing the flow passage; a valve shaft on which the valve element is provided; and a mating member to which the housing is assembled, the mating member including: an assembly hole for the housing; and another flow passage, wherein while the housing is assembled in the assembly hole of the mating member, the inlet and the outlet of the flow passage communicate with the other flow passage, an inlet sealing member is provided between the housing and the mating member, corresponding to a periphery of the inlet, and an outlet sealing member is provided between the housing and the mating member, corresponding to a periphery of the outlet.

According to the above configuration (1), while the housing is assembled in the assembly hole of the mating member, the inlet and the outlet of the flow passage provided in the housing communicate with the other flow passage of the mating member. Herein, the inlet sealing member is provided between the housing and the mating member correspondingly around the inlet of the flow passage, so that a gap between the housing and the mating member is sealed around the inlet. Further, the outlet sealing member is provided between the housing and the mating member correspondingly around the outlet of the flow passage, so that the gap between the housing and the mating member is sealed around the outlet.

(2) To achieve the foregoing purpose, in the configuration (1), preferably, at least one of the inlet and the outlet has an opening that opens in a direction intersecting the valve shaft, an outer surface of the housing around the opening is formed parallel to the valve shaft, and further an inner surface of the assembly hole, which faces the outer surface around the opening, is formed parallel to the outer surface around the opening.

According to the foregoing configuration (2), in addition to the operations of the configuration (1), the outer surface of the housing around the opening, on which at least one of the inlet sealing member and the outlet sealing member is provided, and the inner surface of the assembly hole, which faces the outer surface, are formed parallel to each other and also parallel to the valve shaft. Thus, the direction to assemble the housing into the assembly hole can be coaxial with the valve shaft.

(3) To achieve the foregoing purpose, in the configuration (1), preferably, at least one of the inlet and the outlet has an opening that opens in a direction intersecting the valve shaft, an outer surface of the housing around the opening is inclined with an orientation that approaches the valve shaft in a direction of assembly into the assembly hole with respect to a direction coaxial with the valve shaft, and further an inner surface of the assembly hole, which faces the outer surface around the opening, is inclined to match an inclination of the outer surface around the opening.

According to the foregoing configuration (3), in addition to the operations of the configuration (1), the outer surface of the housing around the opening, on which at least one of the inlet sealing member and the outlet sealing member is provided, is inclined with the orientation that comes close to the valve shaft in the direction of assembly into the assembly hole with respect to the direction coaxial with the valve shaft. The inner surface of the assembly hole, which faces the outer surface located around the opening, is inclined to meet the inclination of the outer surface around the opening. Therefore, when the housing is assembled into the assembly hole in the direction coaxial with the valve shaft, the outer surface around the opening can be brought closer to the inner surface of the assembly hole with room to spare from the leading side of that inclination.

(4) To achieve the foregoing purpose, in the configuration (2) or (3), preferably, the outer surface around the opening is curved about the valve shaft, and further the inner surface of the assembly hole, which faces the outer surface around the opening, is curved to match a curvature of the outer surface around the opening.

According to the foregoing configuration (4), in addition to the operations of the configuration (2) or (3), the curved outer surface of the housing around the opening is matched to the curved inner surface of the assembly hole.

(5) To achieve the foregoing purpose, in one of the configurations (1) to (4), preferably, the flow passage is formed bending from the direction coaxial with the valve shaft to at least one direction intersecting the valve shaft.

According to the foregoing configuration (5), in addition to the operations of one of the configurations (1) to (4), the flow passage is formed bending from the direction coaxial with the valve shaft to at least one direction intersecting the valve shaft, so that it can be assumed that the center line of the inlet of the flow passage and the center line of the outlet intersect each other.

(6) To achieve the foregoing purpose, in one of the configurations (1) to (5), preferably, at least the other flow passage of the mating member is internally provided with a passage member for flowing the fluid, the passage member is made of resin, and the passage member has an outer surface provided with a recess that forms an air layer between the outer surface of the passage member and the mating member.

According to the foregoing configuration (6), in addition to the operations of one of the configurations (1) to (5), the flow passage member made of resin and configured to flow a fluid is provided in at least the other flow passage of the mating member. Thus, the portion of the other flow passage of the mating member is resinified, i.e., constructed of resin, and has a lower thermal mass than metal. Further, the air layer defined by the outer surface of the passage member and the mating member provides heat insulation of the other flow passage. Consequently, the thermal mass of the whole passage device is further reduced.

(7) To achieve the foregoing purpose, in one of the configurations (1) to (6), preferably, one of the inlet and the outlet opens in a direction coaxial with the valve shaft and the other opens in a direction intersecting the valve shaft, one of the inlet sealing member and the outlet sealing member is provided between the housing and the mating member, corresponding to a periphery of a coaxial opening that opens in the coaxial direction, and the other is provided between the housing and the mating member, corresponding to a periphery of an intersecting opening that opens in the intersecting direction, and the inlet sealing member or the outlet sealing member, which is provided corresponding to the periphery of the intersecting opening, has a lower hardness than the outlet sealing member or the inlet sealing member, which is provided corresponding to the periphery of the coaxial opening, and further has a sealing structure that can ensure a sealing function while allowing both a positional displacement due to a thermal expansion difference between at least the housing and the mating member and a positional displacement due to a positive pressure and/or a negative pressure, which act on the inlet sealing member or the outlet sealing member, which is provided corresponding to the periphery of the intersecting opening.

According to the foregoing configuration (7), in addition to the operations of one of the configurations (1) to (6), for example, the inlet sealing member may be provided between the housing and the mating member correspondingly around the coaxial opening that opens in the coaxial direction, and the outlet sealing member may be provided between the housing and the mating member correspondingly around the intersectional opening that opens in the intersecting direction. In this case, the outlet sealing member has a sealing structure capable of ensuring the sealing function while allowing the positional displacement, so that the sealing property of the outlet sealing member is maintained even if the positional displacement occurs.

(8) To achieve the foregoing purpose, in one of the configurations (1) to (5), preferably, the inlet sealing member or the outlet sealing member is placed in a groove formed in an outer surface of a part of the housing, and the assembly hole of the mating member is formed with an opening edge that is chamfered and can contact with the inlet sealing member or the outlet sealing member when the part of the housing is inserted into the assembly hole.

According to the foregoing configuration (8), in addition to the operations of one of the configurations (1) to (5), the opening edge of the assembly hole is chamfered. This can prevent damage to the inlet sealing member or the outlet sealing member by contact with the opening edge of the assembly hole when the housing is assembled into the assembly hole.

(9) To achieve the foregoing purpose, in the configuration (6), preferably, while the housing is assembled in the assembly hole of the mating member, a part of the housing is inserted in the passage member, the inlet sealing member or the outlet sealing member is mounted in a groove formed in an inner surface of the passage member in which the part of the housing is inserted, and the part of the housing is provided with an end edge that is chamfered and can contact with the inlet sealing member or the outlet sealing member when the part of the housing is inserted into the passage member.

According to the foregoing configuration (9), in addition to the operations of the configuration (6), the end edge of the housing is chamfered. This can prevent damage to the inlet sealing member or the outlet sealing member by contact with the end edge of the housing when the housing is assembled into the assembly hole.

(10) To achieve the foregoing purpose, in one of the configurations (1) to (9), preferably, the fluid is an EGR gas, the valve device includes an EGR valve for regulating a flow rate of the EGR gas, and the EGR valve includes the housing, the flow passage, the valve element, and the valve shaft.

According to the foregoing configuration (10), in addition to the operations of one of the configurations (1) to (9), the EGR valve is configured to seal between the housing and the mating member around the inlet and the outlet of the flow passage.

Effects of the Invention

According to the foregoing configuration (1), while the housing is assembled in the mating member, it is possible to prevent intrusion of a fluid in between the boundary surface of the housing and the boundary surface of the mating member through the inlet and the outlet of the flow passage, and further prevent leakage of the fluid to the outside of the flow passage and suction of outside air from the outside of the flow passage.

According to the foregoing configuration (2), in addition to the operations of the configuration (1), it is possible to assemble the housing into the assembly hole of the mating member while avoiding the interference with the valve shaft, the drive unit for the valve shaft, and the mating member.

According to the foregoing configuration (3), in addition to the operations of the configuration (1), it is possible to prevent twisting and drop-off of the inlet sealing member and the outlet sealing member in the process of assembling the housing into the assembly hole, and enhance the assembling easiness of the housing to the assembly hole.

According to the foregoing configuration (4), in addition to the operations of the configuration (2) or (3), this valve device can be implemented as a valve device having a substantially columnar housing.

According to the foregoing configuration (5), in addition to the operations of one of the configurations (1) to (4), this valve device can be implemented as a poppet EGR valve in which a flow passage of a housing is bent.

According to the foregoing configuration (6), in addition to the operations of one of the configurations (1) to (5), when the fluid flows, resultant heat causes prompt raise the temperature of the other flow passage, thus enabling prevention of the generation of condensed water in the other passage. Further, since the other flow passage is resinified, even if condensed water slightly occurs in the other flow passage, the other flow passage can be prevented from corroding due to the condensed water. Furthermore, it is possible to suppress heat transfer (escape of heat) from the flow passage member to the mating member, and thus prompt the temperature rise of the other flow passage.

According to the foregoing configuration (7), in addition to the operations of one of the configurations (1) to (6), it is possible to prevent a fluid from intruding between the boundary surfaces of the housing and the mating member regardless of positional displacement between at least the housing and the mating member, and positional displacement of the inlet sealing member and the outlet sealing member, and to prevent leakage of a fluid to the outside of the flow passage and suction of outside air from the outside of the flow passage.

According to the foregoing configuration (8), in addition to the operations of one of the configurations (1) to (5), the durability of the sealing function of the inlet sealing member or the outlet sealing member can be improved.

According to the foregoing configuration (9), in addition to the operations of the configuration (6), the durability of the sealing function of the inlet sealing member or the outlet sealing member can be improved.

According to the foregoing configuration (10), in addition to the operations of one of the configurations (1) to (9), it is possible to prevent corrosion between the housing and the mating member due to EGR gas (condensed water generated from EGR gas) having a strong acid property.

MODE FOR CARRYING OUT THE INVENTION

A detailed description of several embodiments of a valve device will now be given referring to the accompanying drawings.

First Embodiment

A first embodiment of the valve device embodied in an EGR valve will be first described below.
<Configuration of EGR Valve>

Figure 1:
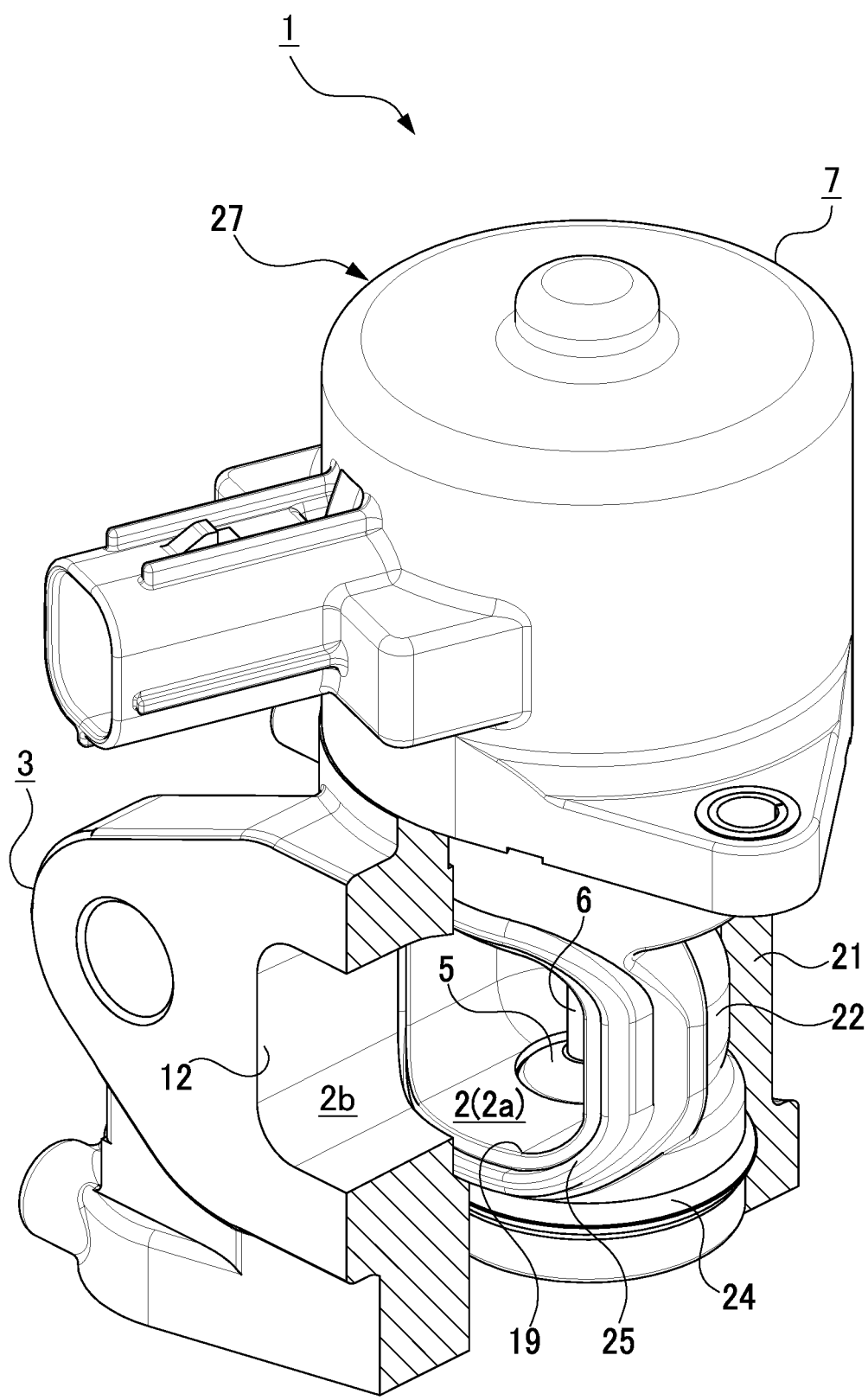
FIG. 1 is a partially-sectional perspective view of an EGR valve in a first embodiment.
Figure 2:
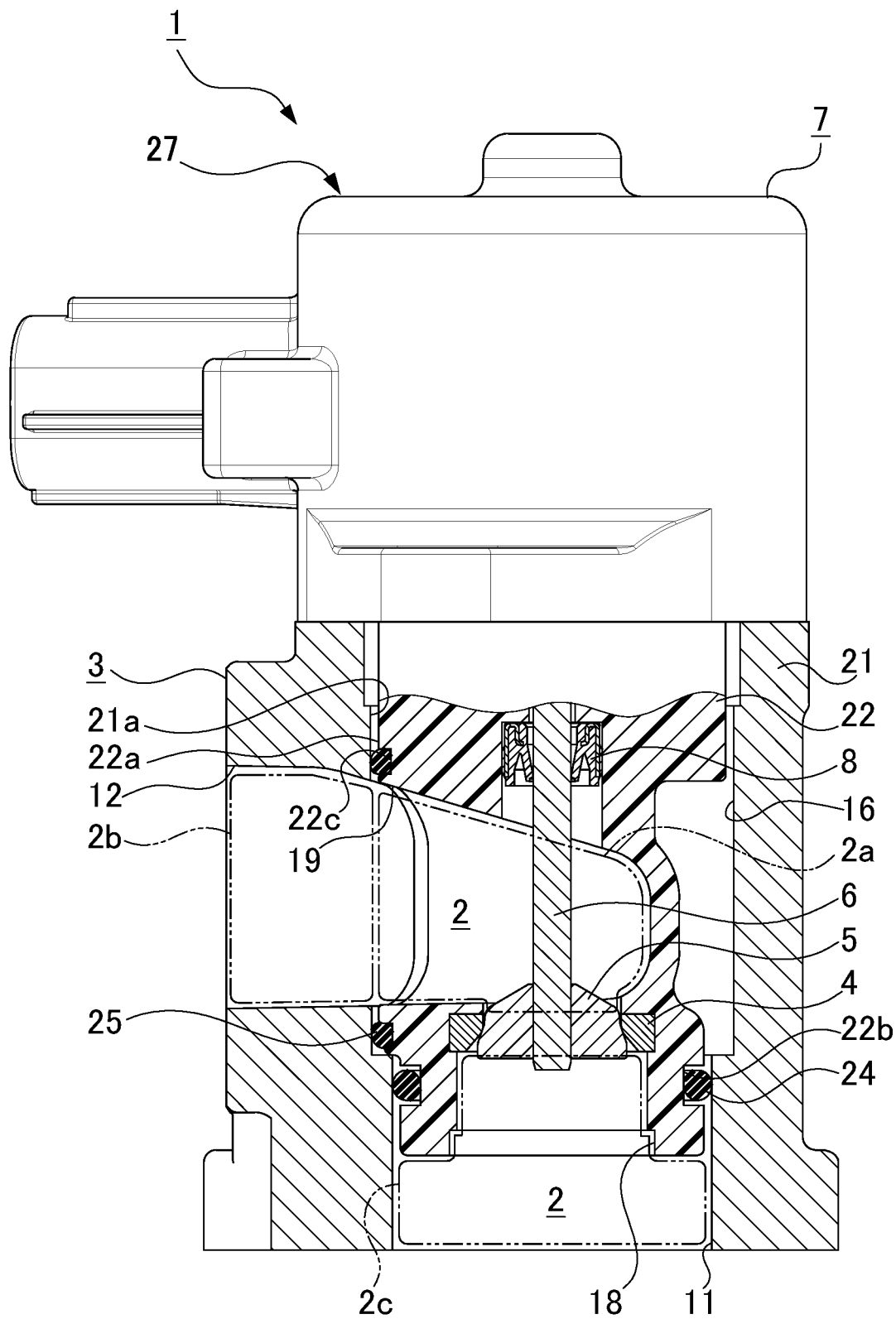
FIG. 2 is a partially-sectional front view of the EGR valve in the first embodiment.
Figure 3:
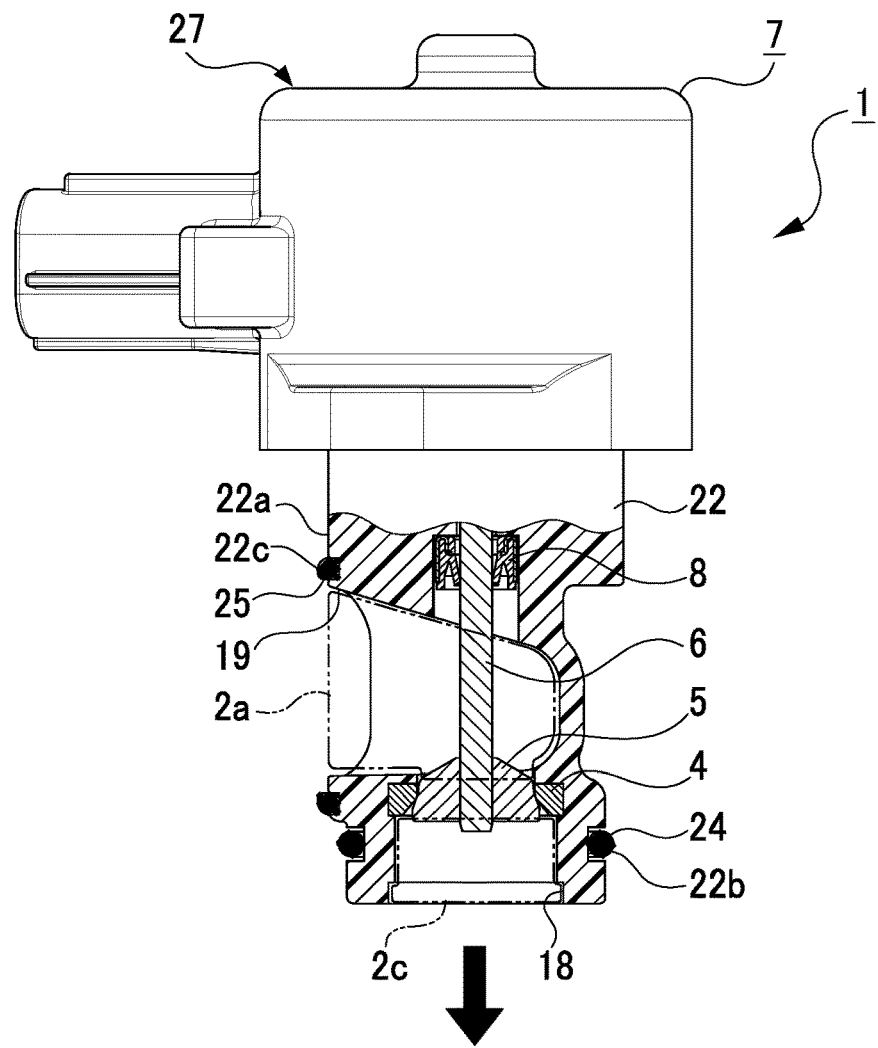
FIG. 3 is a partially-sectional front view of the EGR valve in an exploded state in the first embodiment.
Figure 3:
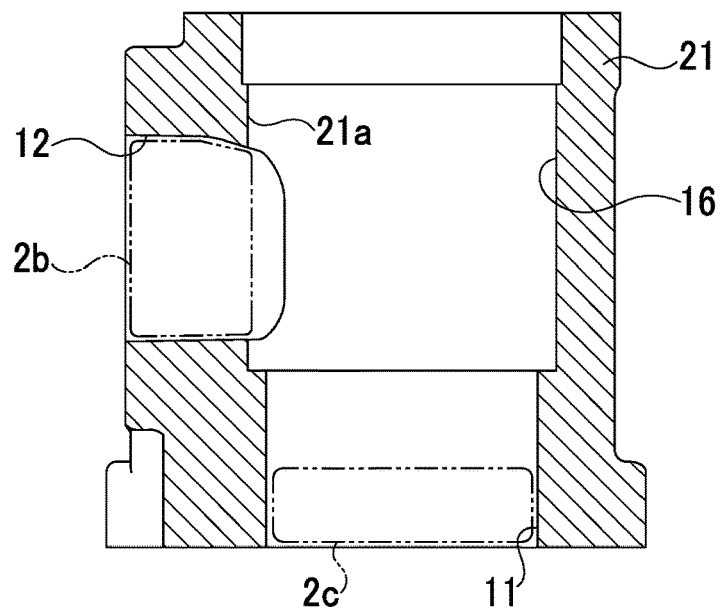
Figure 4:
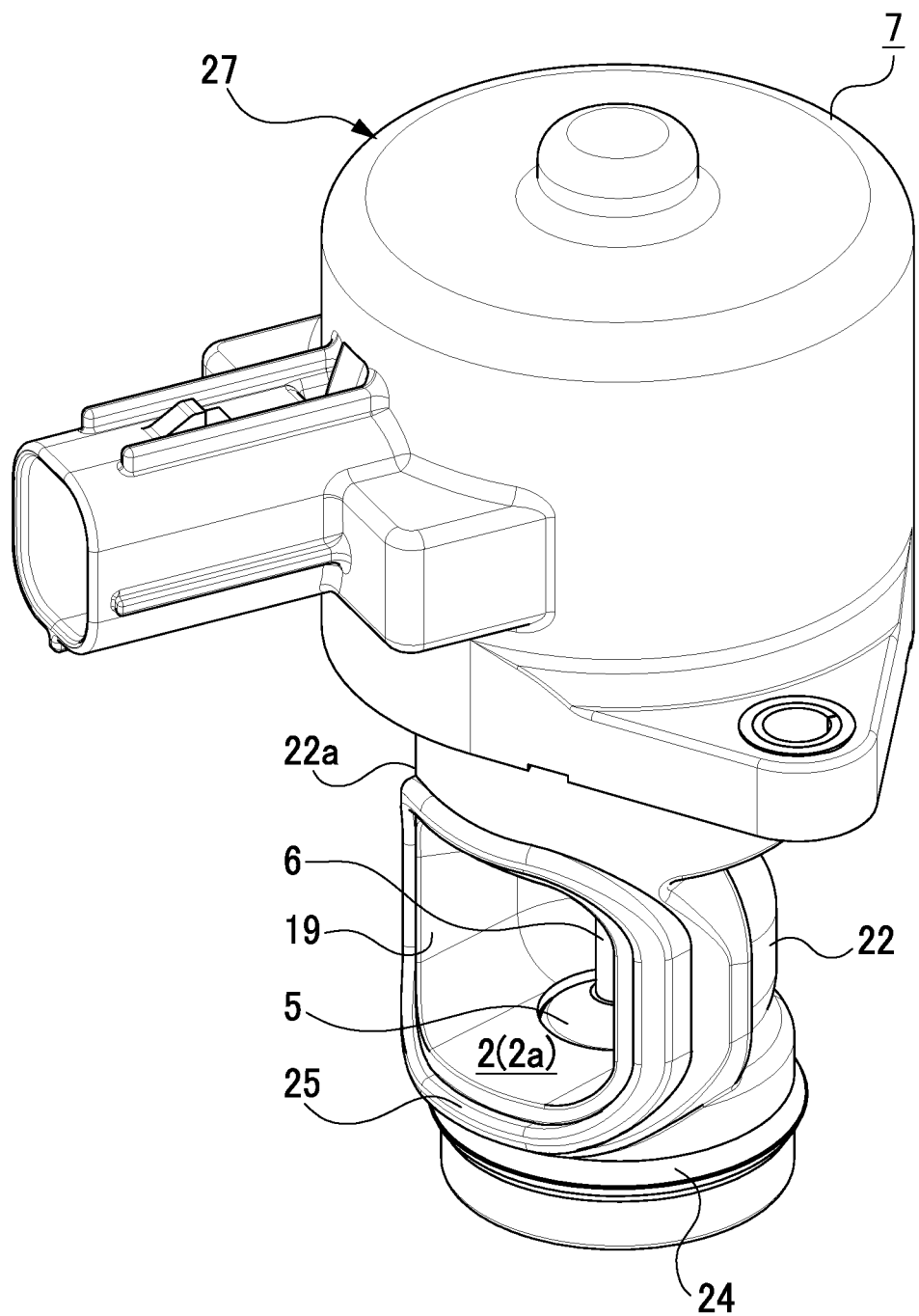
FIG. 4 is a perspective view of a valve assembly constituting the EGR valve in the first embodiment.

FIG. 1 is a partially-sectional perspective view of an EGR valve 1 in the present embodiment. FIG. 2 is a partially-sectional front view of the EGR valve 1. FIG. 3 is a partially-sectional front view of the EGR valve 1 in an exploded state. FIG. 4 is a perspective view of a valve assembly 27 constituting the EGR valve 1. The EGR valve 1 is provided in an EGR passage (not shown) connected to an intake passage in order to return part of exhaust gas discharged from an engine into the exhaust passage as EGR gas to the engine. The EGR valve 1 is used to regulate a flow rate of EGR gas in the EGR passage. The EGR valve 1 in the present embodiment corresponds to a valve device in this disclosure. The EGR gas corresponds to a fluid in this disclosure.

As shown in FIGS. 1 to 4, the EGR valve 1 has a poppet valve structure and is provided with an assembled housing 3 including a flow passage 2 for EGR gas, an annular valve seat 4 provided in the flow passage 2, an umbrella-like-shaped valve element 5 provided to be seatable on the valve seat 4, a valve shaft 6 having one end on which the valve element 5 is provided, and a drive unit 7 to reciprocally drive the valve shaft 6 together with the valve element 5. The drive unit 7 can be constituted of for example a DC motor. In FIG. 1, an outer housing 21 is illustrated in a partially-sectional view. In FIG. 2, all components excepting the drive unit 7 are illustrated in a sectional view. The valve seat 4 is made separately from the assembled housing 3 and assembled in the flow passage 2. The valve seat 4 and the valve element 5 are made of a metal material. Each shape of the valve seat 4 and the valve element 5 is one example. This EGR valve 1 is configured to move the valve element 5 close to or away from the valve seat 4 to change an opening degree between the valve element 5 and the valve seat 4 in order to regulate a flow rate of EGR gas in the flow passage 2. In the present embodiment, details of the drive unit 7 are omitted.

As shown in FIGS. 2 and 3, the valve shaft 6 extends downward from the drive unit 7 and is vertically mounted in the assembled housing 3. The valve shaft 6 is placed in parallel to the axis of the valve seat 4. The valve element 5 is configured to seat on (contact with) and separate from the valve seat 4 as the valve shaft 6 is reciprocally driven. Between the assembled housing 3 (an inner housing 22) and the valve shaft 6, a lip seal 8 is provided to seal between those components 3 (22) and 6. In the present embodiment, the valve element 5 is positioned to be movable on a lower side (an upstream side) of the valve seat 4.

As shown in FIGS. 2 and 3, the flow passage 2 includes an inlet 11 and an outlet 12 provided in the assembled housing 3. The flow passage 2 includes a bent passage part 2a (indicated by a dashed-two dotted line) located on an upper side (a downstream side) of the valve seat 4 and bent in an intersecting direction with a direction toward an inlet 11. The flow passage 2 downstream of the valve seat 4 includes, besides the bent passage part 2a, an outlet passage part 2b (indicated by a dashed-two dotted line) located downstream of the bent passage part 2a and continuous to an outlet 12. The flow passage 2 upstream of the valve seat 4 includes an inlet passage part 2c (indicated by a dashed-two dotted line) continuous to the inlet 11. Specifically, the flow passage 2 of the assembled housing 3 includes the inlet passage part 2c, the bent passage part 2a, and the outlet passage part 2b, which are arranged in this order from the inlet 11 to the outlet 12.

As shown in FIGS. 2 and 3, in the present embodiment, the assembled housing 3 is constituted of two components, i.e., the outer housing 21 and the inner housing 22. In the present embodiment, the inner housing 22 corresponds to a housing in the present disclosure and the outer housing 21 corresponds to a mating member in the present disclosure in which the inner housing 22 is assembled.

The outer housing 21 has a nearly columnar shape, including the outlet passage part 2b, an assembly hole 16 intersecting the outlet passage part 2b, and a part of the inlet passage part 2c coaxial with the assembly hole 16. The outlet passage part 2b and the part of the inlet passage part 2c correspond to another flow passage in the present disclosure.

The inner housing 22 has a nearly columnar shape, including the bent passage part 2a, part of the inlet passage part 2c, an inlet 18 of the inlet passage part 2c, and an outlet 19 of the bent passage part 2a. The bent passage part 2a is formed bending from the direction coaxial with the valve shaft 6 to one direction intersecting the valve shaft 6. The outlet 19 of the bent passage part 2a has an opening that opens in the direction intersecting the valve shaft 6 and, around the opening, an outer surface 22a of the inner housing 22 is formed parallel to the valve shaft 6 and curved about the valve shaft 6. Further, an inner surface 21a of the assembly hole 16 of the outer housing 21, which faces the outer surface 22a around the opening of the outlet 19, is formed parallel to the outer surface 22a around the opening of the outlet 19 and curved about the valve shaft 6. Moreover, the inner surface 21a of the assembly hole 16 of the outer housing 21, which faces the outer surface 22a around the opening of the outlet 19, is curved to match the outer surface 22a around the opening of the outlet 19.

The inner housing 22 is assembled in the assembly hole 16 of the outer housing 21, forming the assembled housing 3. In the present embodiment, the inner housing 22 is made of a resin material and the outer housing 21 is made of a metal material, e.g., aluminum.

<Inlet Sealing Member and Outlet Sealing Member>

As shown in FIGS. 1 to 4, an inlet sealing member 24 and an outlet sealing member 25 are provided between the assembly hole 16 of the outer housing 21 and the outer surface of the inner housing 22. In the present embodiment, these two sealing members 24 and 25 are each formed of a rubber O-ring. In the present embodiment, the inlet sealing member 24 is provided near the inlet 18 of the inner housing 22, in the outer periphery of the inner housing 22, corresponding to the periphery of the inlet 18. On the outer periphery of the inner housing 22 near the inlet 18, a peripheral groove 22b is formed. The inlet sealing member 24 is assembled in this peripheral groove 22b.

In the present embodiment, the outlet sealing member 25 is provided corresponding to the periphery of the outlet 19, i.e., around an opening of the outlet 19, of the inner housing 22. On the curved outer surface 22a of the inner housing 22, around the opening of the outlet 19, an annular groove 22c is formed surrounding the outlet 19. The outlet sealing member 25 is assembled in this annular groove 22c. The outlet sealing member 25 is curved to match the curvature around the opening of the outlet 19 while the outlet sealing member 25 is assembled in the annular groove 22c.

Herein, as shown in FIG. 2, while the inner housing 22 is assembled in the assembly hole 16 of the outer housing 21, the inlet 18 and the outlet 19 of the inner housing 22 are respectively communicated with the inlet passage part 2c and the outlet passage part 2b of the outer housing 21. Near the inlet 18 of the inner housing 22, the inlet sealing member 24 is provided between the outer periphery of the inner housing 22 and the outer housing 21. Further, the outlet sealing member 25 is provided between the outer surface 22a of the inner housing 22 and the outer housing 21, along the periphery of the opening of the outlet 19 of the inner housing 22.

<Manufacture of EGR Valve>

For manufacturing the EGR valve 1 in the present embodiment, the drive unit 7 (including the valve shaft 6 and others), the inner housing 22, the valve seat 4, the valve element 5, the inlet sealing member 24 and the outlet sealing member 25 are assembled together in advance, forming a valve assembly 27. Then, this valve assembly 27 is assembled to the outer housing 21. Specifically, the inner housing 22 of the valve assembly 27 is inserted in (drop-in) the assembly hole 16 of the outer housing 21. At that time, the outlet 19 of the bent passage part 2a and the outlet passage part 2b (another passage) are communicated with each other between the inner housing 22 and the outer housing 21. Further, the inlet 18 of the inlet passage part 2c of the inner housing 22 and the inlet passage part 2c of the outer housing 21 are communicated with each other. Thus, the EGR valve 1 is obtained in the form of a valve device shown in FIG. 2.

<Operations and Effects of the EGR Valve>

According to the configuration of the EGR valve 1 in the present embodiment described above, while the inner housing 22 (the housing) is assembled in the assembly hole 16 of the outer housing 21 (the mating member), the inlet 18 of the inlet passage part 2c (the passage) and the outlet 19 of the bent passage part 2a (the passage), which are provided in the inner housing 22, are communicated respectively with the inlet passage part 2c (another passage) and the outlet passage part 2b (another passage) of the outer housing 21. Here, the inlet sealing member 24 is provided between the inner housing 22 and the outer housing 21, corresponding to the periphery of the inlet 18 of the inlet passage part 2c of the inner housing 22, so that a gap between the inner housing 22 and the outer housing 21 is sealed around the inlet 18. Further, the outlet sealing member 25 is provided between the inner housing 22 and the outer housing 21, corresponding to the periphery of the outlet 19 of the bent passage part 2a of the inner housing 22, so that a gap between the inner housing 22 and the outer housing 21 is sealed around the outlet 19. Accordingly, while the inner housing 22 (the housing) is assembled in the outer housing 21 (the mating member), it is possible to prevent EGR gas and condensed water from the inlet 18 of the inlet passage part 2c and the outlet 19 of the bent passage part 2a of the inner housing 22 from intruding between a boundary surface of the inner housing 22 and a boundary surface of the outer housing 21. It is also possible to prevent leakage of a fluid to the outside of the flow passage 2 and suction of outside air through the flow passage 2. As a result, it is possible to prevent the condensed water from accumulating on the boundary surfaces and hence metal components from corroding due to the condensed water.

According to the configuration of the present embodiment, the outer surface 22a of the inner housing 22 (the housing) around the opening of the outlet 19 to which the outlet sealing member 25 is provided and the inner surface 21a of the assembly hole 16, which faces the outer surface 22a, are formed parallel to each other and further parallel to the valve shaft 6. Accordingly, the direction of assembling the inner housing 22 into the assembly hole 16 can be the same as a direction coaxial with the valve shaft 6. Thus, the inner housing 22 (the housing) can be assembled into the assembly hole 16 of the outer housing 21 (the mating member) while avoiding the interference of the valve shaft 6 and the drive unit 7 related thereto with respect to the outer housing 21.

According to the configuration of the present embodiment, the curved outer surface 22a of the inner housing 22 (the housing) around the opening of the outlet 19 is combined with the curved inner surface 21a of the assembly hole 16. Thus, this EGR valve 1 can be implemented as an EGR valve including the inner housing 22 (the housing) having a nearly columnar shape.

According to the configuration of the present embodiment, the bent passage part 2a (the flow passage) of the inner housing 22 (the housing) is formed bending from the direction coaxial with the valve shaft 6 to one direction intersecting the valve shaft 6. Thus, it can be assumed that the central line of the inlet 18 of the inlet passage part 2c (the flow passage) and the central line of the outlet 19 of the bent passage part 2a intersect with each other in the inner housing 22. Thus, the valve device can be implemented as the poppet EGR valve 1 including the bent flow passage 2 in the inner housing 22 (the housing).

According to the configuration of the present embodiment, in the EGR valve 1 for regulating a flow rate of EGR gas, a seal is formed between the inner housing 22 (the housing) and the outer housing 21 (the mating member) around each of the inlet 18 and the outlet 19. This configuration can prevent corrosion between the inner housing 22 and the outer housing 21 caused by strongly-acid EGR gas (condensed water generated from this EGR gas).

Second Embodiment

A second embodiment of the valve device embodied in an EGR valve will be described below. In the following description, the equivalent components or parts to those in the first embodiment are assigned the same reference signs as in the first embodiment and their details are omitted. The following description will be given with a focus on differences from the first embodiment.

<Configuration of EGR Valve>

Figure 5:
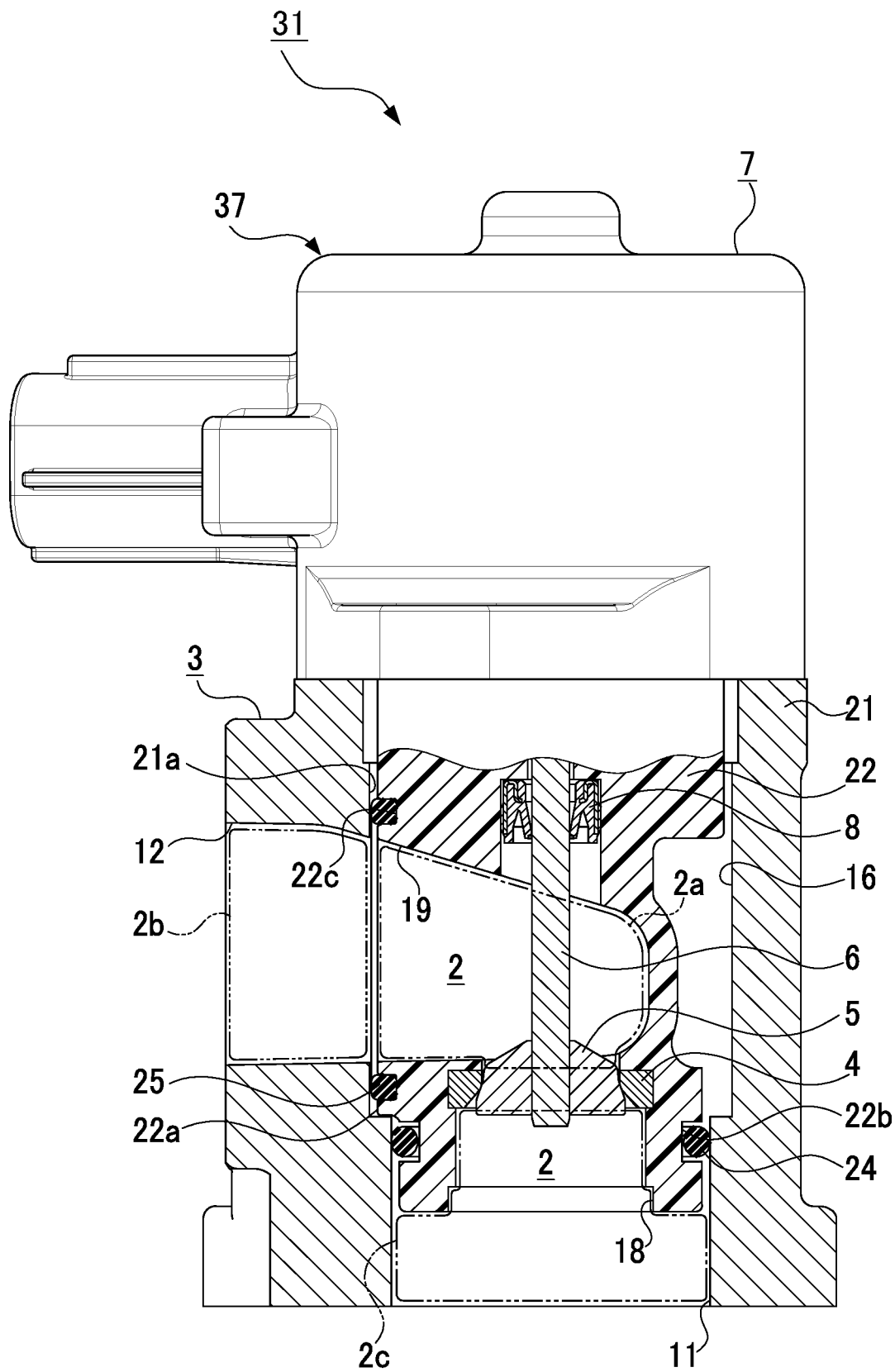
FIG. 5 is a partially-sectional front view of an EGR valve in a second embodiment.
Figure 6:
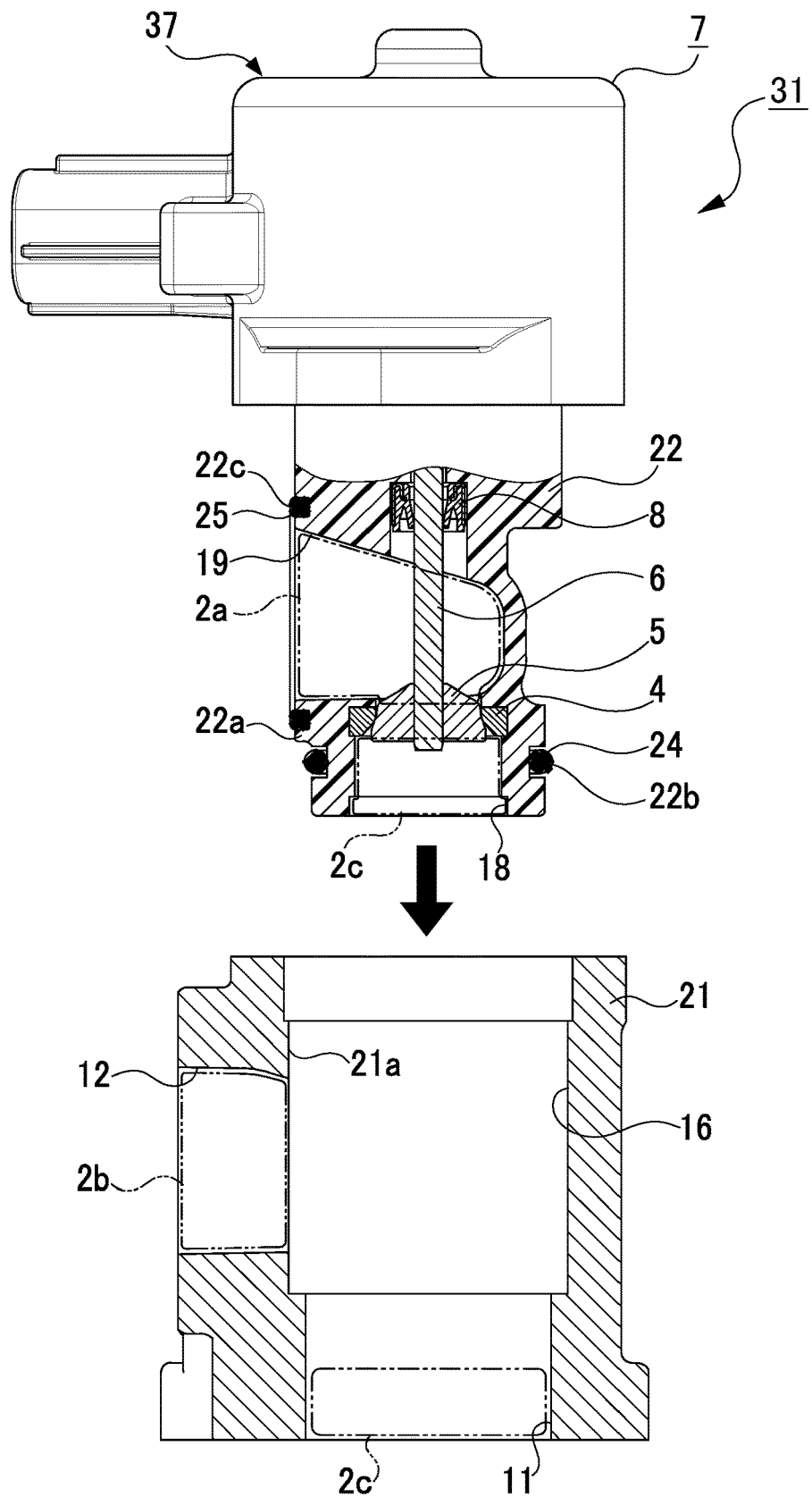
FIG. 6 is a partially-sectional front view of the EGR valve in an exploded state in the second embodiment.
Figure 7:
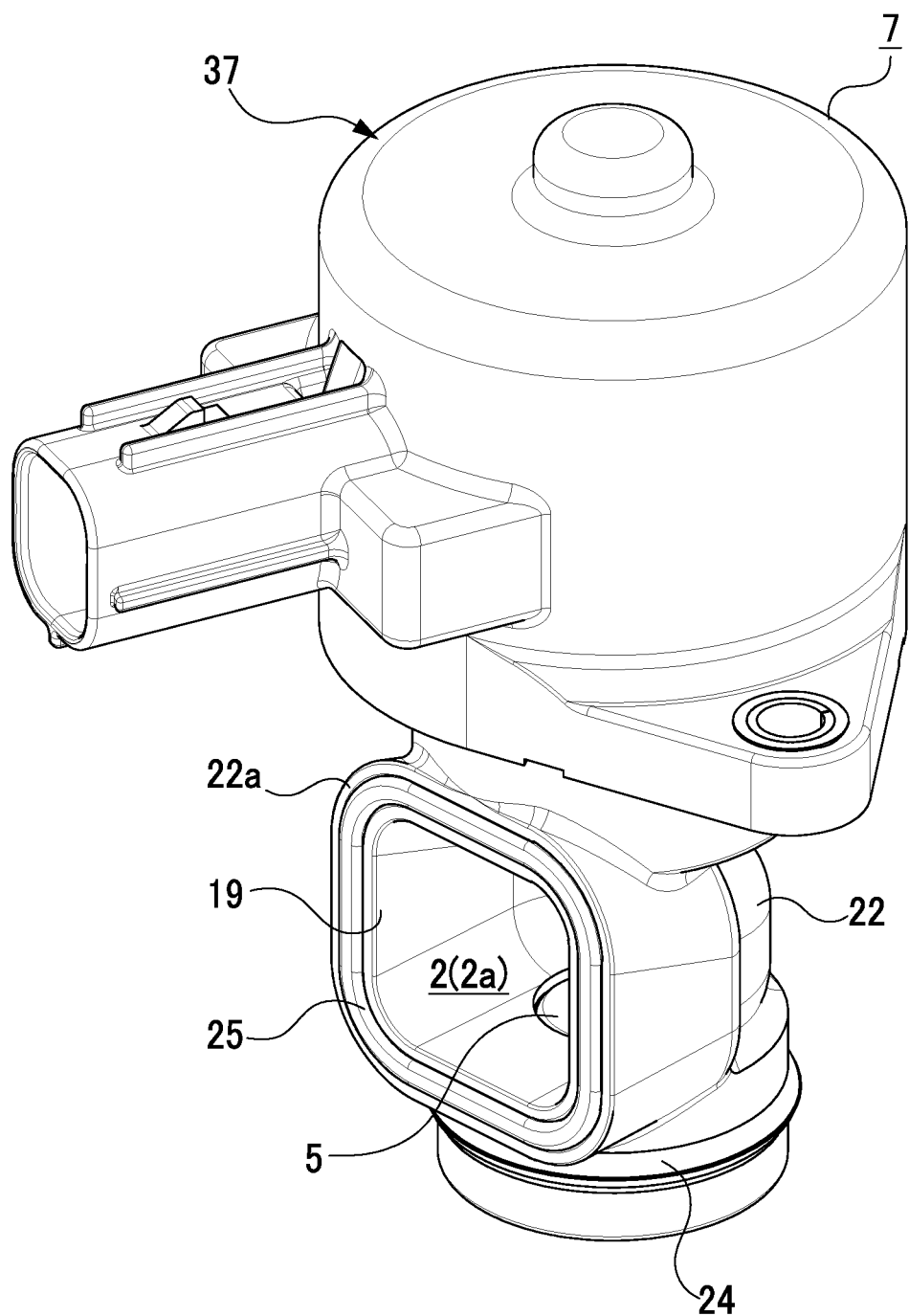
FIG. 7 is a perspective view of a valve assembly constituting the EGR valve in the second embodiment.

FIG. 5 is a front partially-sectional view of an EGR valve 31 in this embodiment. FIG. 6 is a partially-sectional front view of the EGR valve 31 in an exploded state. FIG. 7 is a perspective view of a valve assembly 37 constituting the EGR valve 31. The present embodiment differs from the first embodiment mainly in the placement of the outlet sealing member 25.

In the present embodiment, as shown in FIGS. 5 to 7, the outer surface 22a of the inner housing 22 around the outlet 19, i.e., around the opening of the outlet 19, is not curved about the valve shaft 6 but is formed flat in parallel to the valve shaft 6. Further, the inner surface 21a of the assembly hole 16 of the outer housing 21, which faces the outer surface 22a around the opening of the outlet 19, is flat to match the flat outer surface 22a around the opening of the outlet 19.

<Inlet Sealing Member and Outlet Sealing Member>

In the present embodiment, as shown in FIGS. 5 to 7, the inlet sealing member 24 is identical in structure to that in the first embodiment. In contrast, the outlet sealing member 25 in the present embodiment is assembled in the flat outer surface 22a around the opening of the outlet 19 of the inner housing 22. Specifically, the flat outer surface 22a around the opening of the outlet 19 is formed with the annular groove 22c surrounding the outlet 19. The outlet sealing member 25 is assembled in this annular groove 22c. While being assembled in the annular groove 22c, the outlet sealing member 25 flatly expands along the flatness of the periphery of the opening of the outlet 19.

<Operations and Effects of the EGR Valve>

According to the configuration of the EGR valve 31 in the present embodiment described above, the equivalent operations and effects to those of the EGR valve 1 in the first embodiment can be achieved. According to the configuration of the present embodiment, additionally, the outlet sealing member 25 is placed in the flat outer surface 22a of the inner housing 22 around the opening of the outlet 19 and expands flatly along the outer surface 22a. Further, the inner surface 21a of the assembly hole 16 of the outer housing 21, which is a portion contacting the outlet sealing member 25, is also formed flat. Thus, the entire outlet sealing member 25 can be brought into contact with the flat inner surface 21a of the assembly hole 16 with relative ease and uniform force. In this regard, the effect of sealing the EGR gas by the outlet sealing member 25 can be enhanced.

Third Embodiment

A third embodiment of the valve device embodied in an EGR valve will be described below.

<Configuration of EGR Valve>

Figure 8:
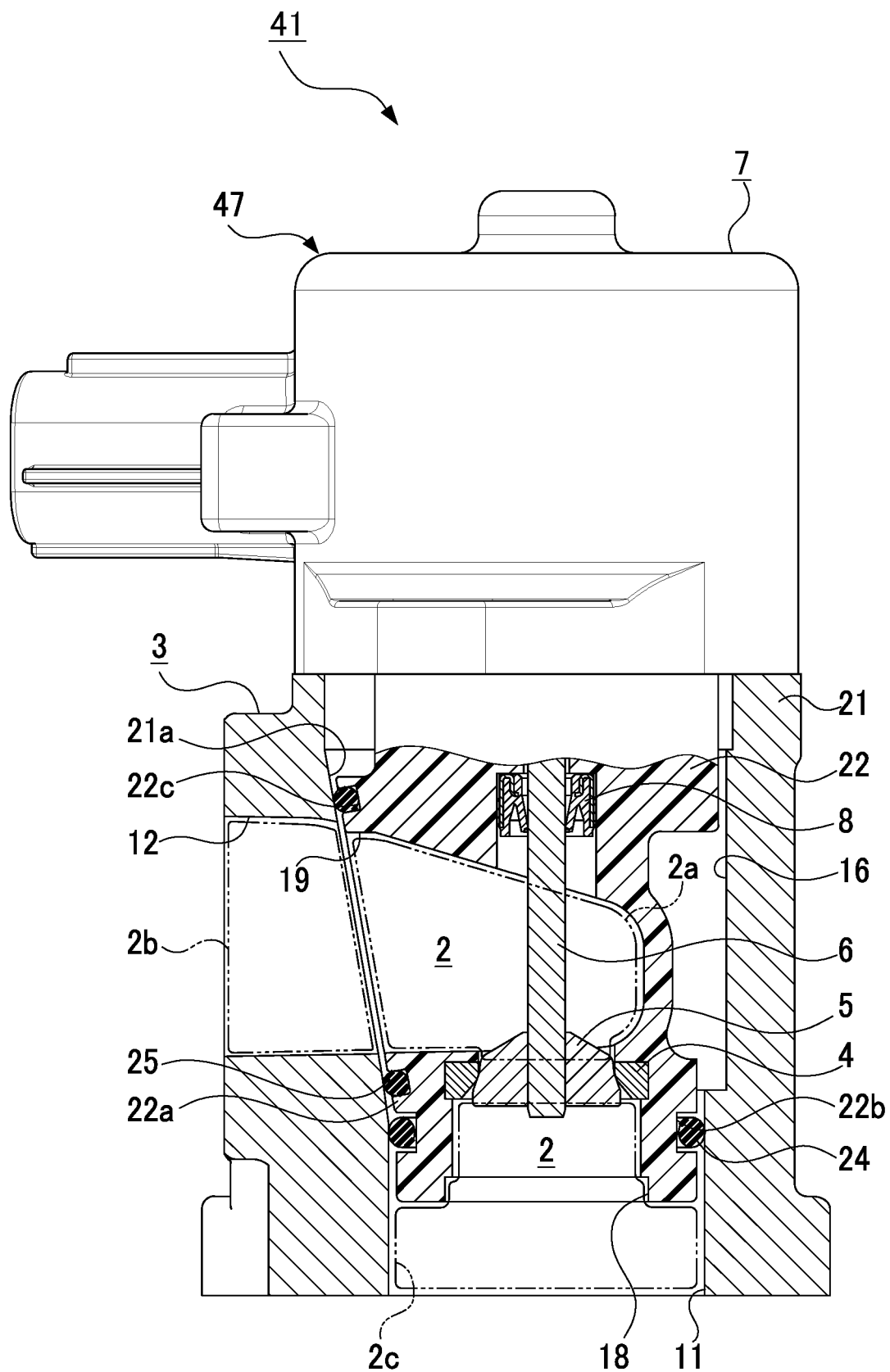
FIG. 8 is a partially-sectional front view of an EGR valve in a third embodiment.
Figure 9:
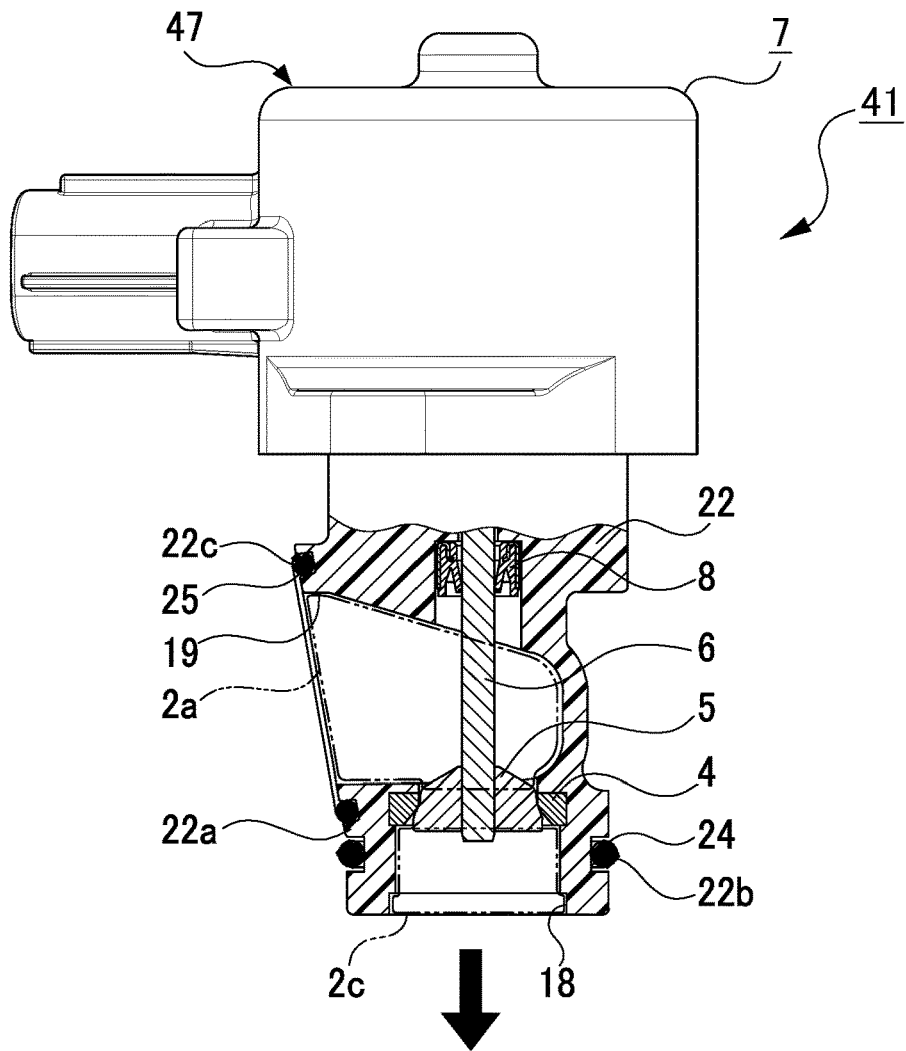
FIG. 9 is a partially-sectional front view of the EGR valve in an exploded state in the third embodiment.
Figure 9:
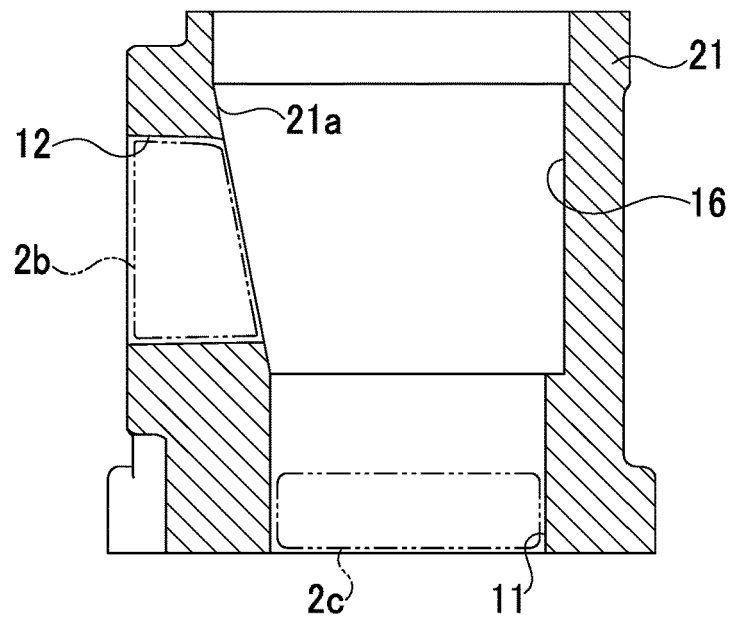
Figure 10:
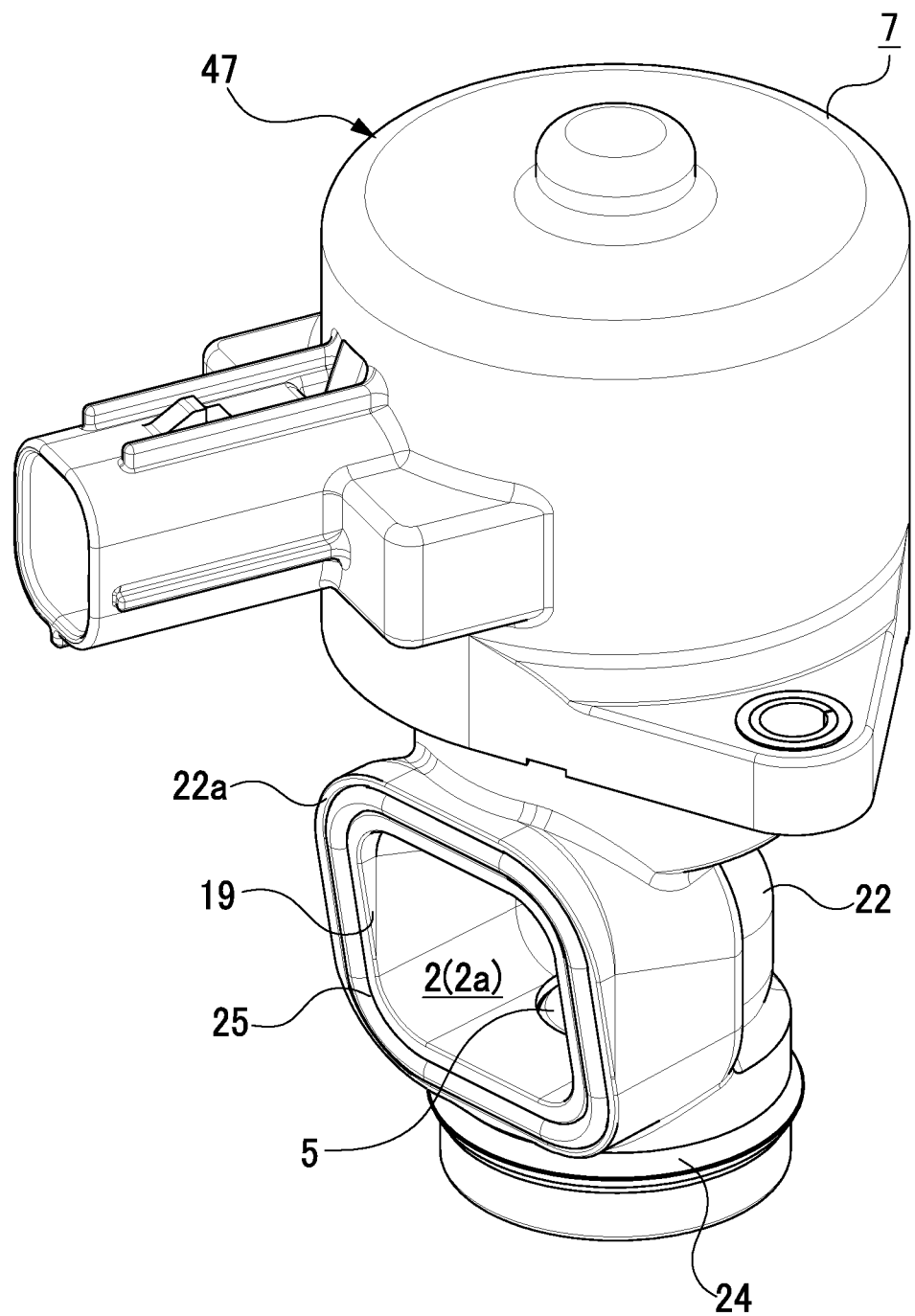
FIG. 10 is a perspective view of a valve assembly constituting the EGR valve in the third embodiment.

FIG. 8 is a partially-sectional front view of an EGR valve 41 in the present embodiment. FIG. 9 is a partially-sectional front view of the EGR valve 41 in an exploded state. FIG. 10 is a perspective view of a valve assembly 47 constituting the EGR valve 41. The present embodiment differs from each of the foregoing embodiments mainly in the placement of the outlet sealing member 25.

In the present embodiment, as shown in FIGS. 8 to 10, the outer surface 22a of the inner housing 22 around the outlet 19, i.e., around the opening of the outlet 19, is flat and inclined, relative to the direction coaxial with the valve shaft 6, with an orientation that approaches the valve shaft 6 in a direction of assembly into the assembly hole 16. Further, the inner surface 21a of the assembly hole 16 of the outer housing 21, which faces the outer surface 22a around the opening of this outlet 19, is flat and inclined to match the inclined flat outer surface 22a around the opening of the outlet 19.

<Inlet Sealing Member and Outlet Sealing Member>

In the present embodiment, as shown in FIGS. 8 to 10, the inlet sealing member 24 is identical in structure to that in each of the aforementioned embodiments. In the present embodiment, in contrast, the outlet sealing member 25 is provided in the inclined flat outer surface 22a of the inner housing 22 around the opening of the outlet 19. Specifically, the inclined flat outer surface 22a around the opening of this outlet 19 is formed with the annular groove 22c surrounding the outlet 19. The outlet sealing member 25 is assembled in this annular groove 22c. While being assembled in the annular groove 22c, the outlet sealing member 25 expands flatly and along the inclined flat surface around the opening of the outlet 19.

<Operations and Effects of the EGR Valve>

According to the configuration of the EGR valve 41 in the present embodiment described above, the equivalent operations and effects to the EGR valve 31 in the second embodiment can be achieved. According to the configuration of the present embodiment, additionally, in the inner housing 22, the outer surface 2a around the opening of the outlet 19 where the outlet sealing member 25 is provided is inclined with an orientation that approaches the valve shaft 6 in the direction of assembly into the assembly hole 16 with respect to the direction coaxial with the valve shaft 6. The inner surface 21a of the assembly hole 16, which faces the outer surface 22a around the opening, is inclined to match the inclination of the outer surface 22a around the opening. Therefore, when the inner housing 22 is assembled into the assembly hole 16 in the direction coaxial with the valve shaft 6, the outer surface 22a around the opening of the outlet 19 is brought closer to the inner surface 21a of the assembly hole 16 with room to spare from the leading end of the inclination. This can prevent the outlet sealing member 25 from twisting or dropping off when the inner housing 22 is assembled into the assembly hole 16, and improve the assembling easiness of the inner housing 22 to the assembly hole 16.

Fourth Embodiment

A fourth embodiment of the valve device embodied in an EGR device will be described below.

<Configuration of Valve Device>

Figure 11:
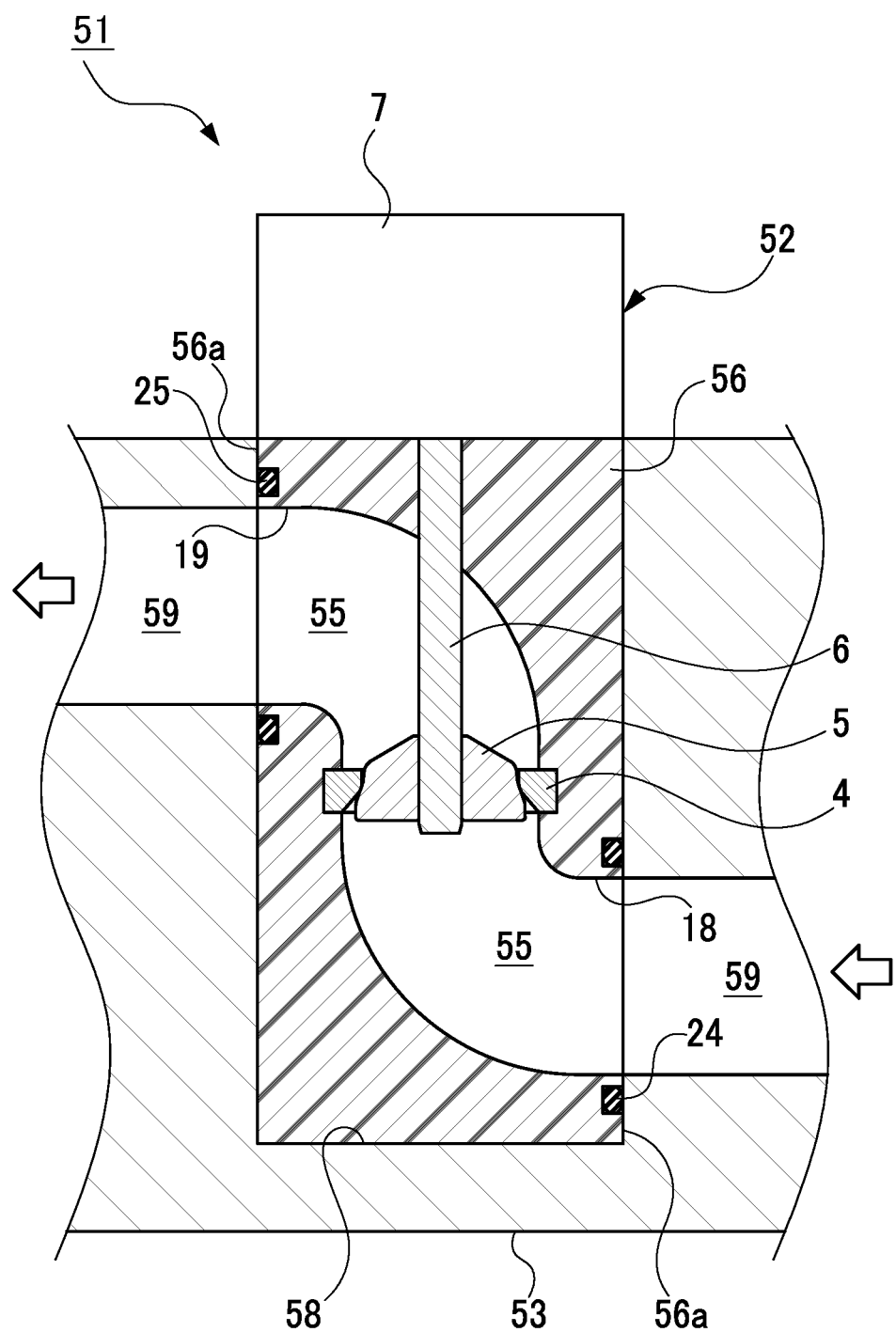
FIG. 11 is a schematic cross-sectional view of a valve device in a fourth embodiment.
Figure 12:
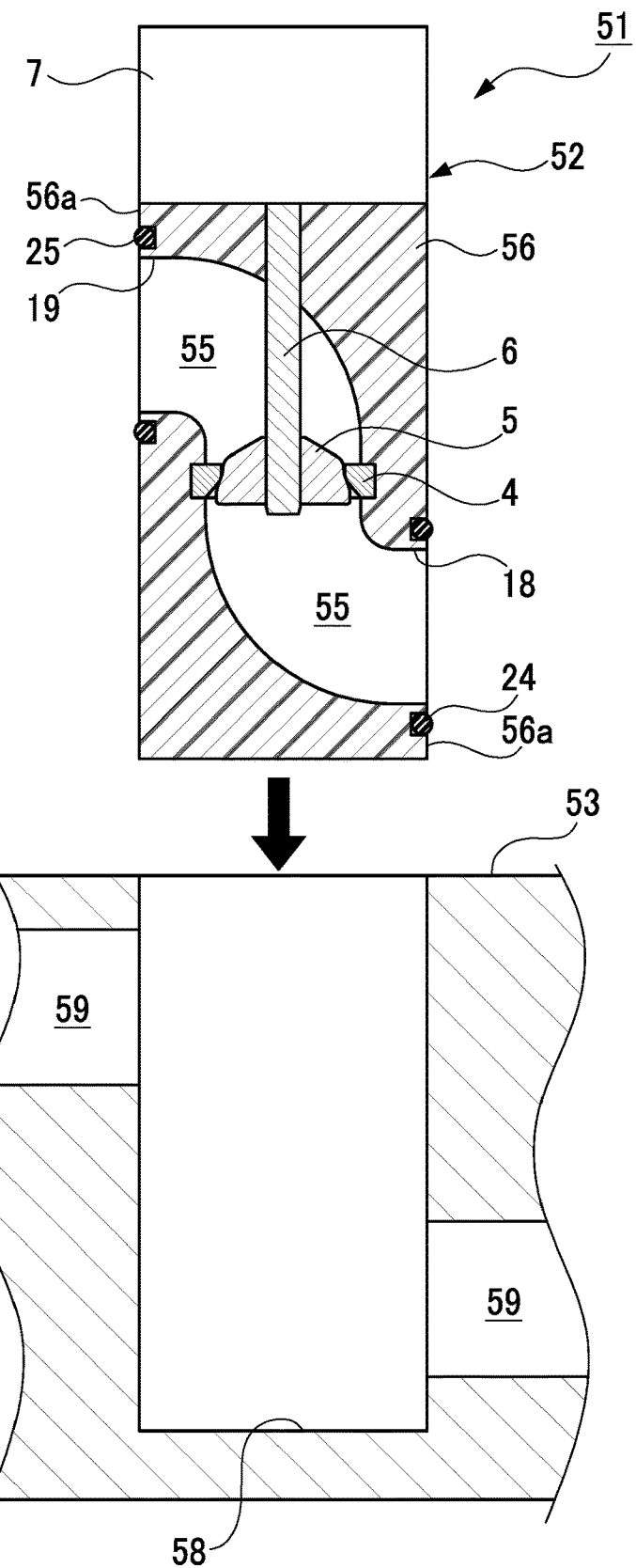
FIG. 12 is a schematic cross-sectional view of the valve device in an exploded state in the fourth embodiment.

FIG. 11 is a schematic cross-sectional view of a valve device 51 in the present embodiment (including some uncut parts; the same applies to the following description). FIG. 12 is a schematic cross-sectional view of the valve device 51 in an exploded state in the present embodiment. The present embodiment differs from each of the aforementioned embodiments in the configuration of the valve device 51. In FIG. 11, arrows indicate a flow direction of EGR gas.

As shown in FIGS. 11 and 12, the valve device 51 in the present embodiment is composed of an EGR valve 52 and an EGR passage 53 which is a mating member thereof. The EGR valve 52 includes a housing 56 including a flow passage 55, the inlet 18 and the outlet 19 of the flow passage 55 provided in the housing 56, the valve seat 4 provided in the flow passage 55, the valve element 5 provided to be seatable on the valve seat 4 to open and close the flow passage 55, the valve shaft 6 on which the valve element 5 is provided, and the drive unit 7 for reciprocally driving the valve shaft 6. The flow passage 55 is bent in a S-shaped cross section. Specifically, a part of the flow passage 55 on the inlet 18 side is bent from the direction coaxial with the valve shaft 6 to one direction (an upstream direction) intersecting the valve shaft 6. A part of the flow passage 55 on the outlet 19 side is bent from the direction coaxial with the valve shaft 6 to another direction (a downstream direction) intersecting the valve shaft 6.

In the present embodiment, as shown in FIGS. 11 and 12, the EGR passage 53 includes an assembly hole 58 in which the housing 56 is assembled, and another passage 59 communicated with the assembly hole 58. An upstream side of the other passage 59 relative to the assembly hole 58 communicates with a lower part of the assembly hole 58. Further, a downstream side of the other passage 59 relative to the assembly hole 58 communicates with an upper part of the assembly hole 58.

In the present embodiment, the housing 56 of the EGR valve 52 is assembled in the assembly hole 58 of the EGR passage 53 to form the valve device 51. In this assembly state, the inlet 18 of the flow passage 55 of the housing 56 communicates with the other flow passage 59 on the upstream side and the outlet 19 of the flow passage 55 of the housing 56 communicates with the other flow passage 59 on the downstream side.

<Inlet Sealing Member and Outlet Sealing Member>

Between the assembly hole 58 and the housing 56, there are provided the inlet sealing member 24 corresponding to the inlet 18 and the outlet sealing member 25 corresponding to the outlet 19. In the present embodiment, the inlet sealing member 24 is provided on an outer surface 56a of the housing 56 around the opening of the inlet 18 of the flow passage 55. The outlet sealing member 25 is provided in the outer surface 56a of the housing 56 around the opening of the outlet 19 of the flow passage 55.

<Operations and Effects of the EGR Valve>

According to the configuration of the valve device 51 in the present embodiment described above, even though it differs from the foregoing first and second embodiments in the shape of the flow passage 55 and the placement of the inlet sealing member 24 and the outlet sealing member 25, the equivalent operations and effects to those in the first and second embodiments can be achieved. In addition, according to the configuration of the present embodiment, the housing 56 of the EGR valve 52 is assembled and contained in the assembly hole 58 of the EGR passage 53. Thus, the EGR valve 52 in the EGR passage 53 has fewer protruding parts. This enables compact installation of the EGR valve 52 in the EGR passage 53.

Fifth Embodiment

A fifth embodiment of the valve device embodied in an EGR device will be described below.

<Configuration of Valve Device>

Figure 13:
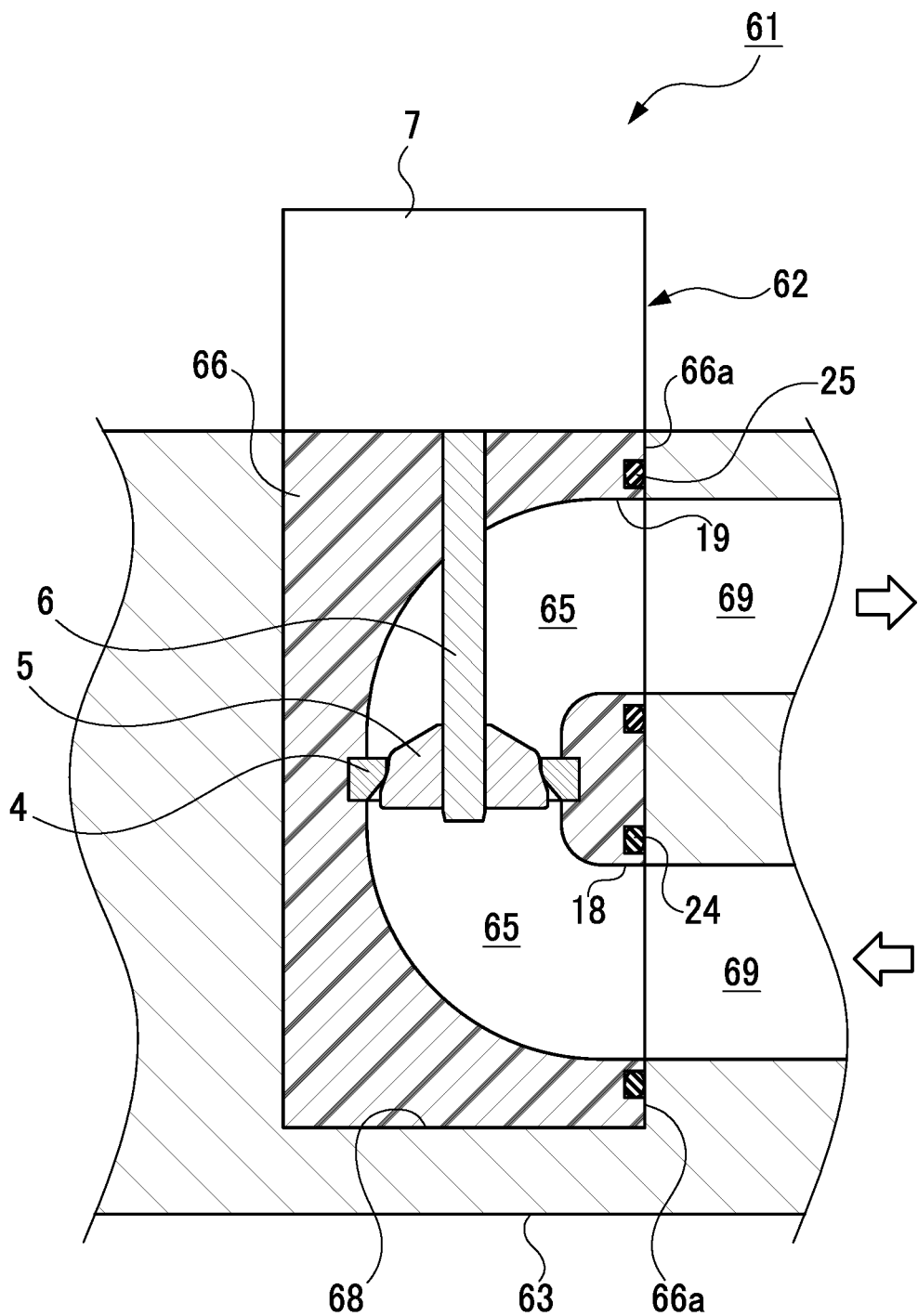
FIG. 13 is a schematic cross-sectional view of a valve device in a fifth embodiment.
Figure 14:
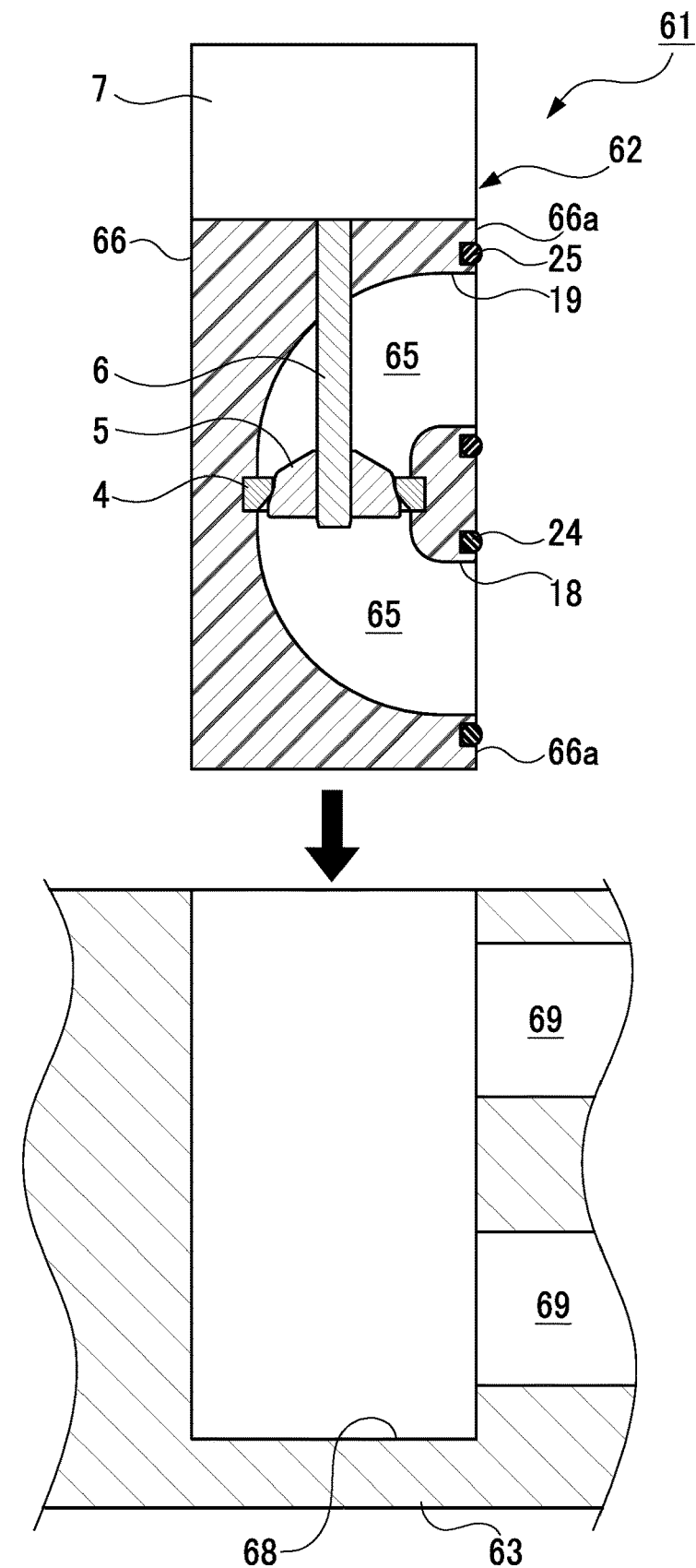
FIG. 14 is a schematic cross-sectional view of the valve device in an exploded state in the fifth embodiment.

FIG. 13 is a schematic cross-sectional view of a valve device 61 in the present embodiment. FIG. 14 is a schematic cross-sectional view of the valve device 61 in an exploded state in the present embodiment. The present embodiment differs from the fourth embodiment in the configuration of the valve device 61. In FIG. 13, arrows indicate a flow direction of EGR gas.

The present embodiment differs from the fourth embodiment in the shape and the placement of a flow passage 65 and another flow passage 69, and the placement of the inlet sealing member 24 and the outlet sealing member 25. Specifically, as shown in FIGS. 13 and 14, the valve device 61 in the present embodiment is composed of an EGR valve 62 and an EGR passage 63 which is a mating member thereof. The flow passage 65 of the housing 66 of the EGR valve 62 is bent in a U-shaped cross section. Specifically, a part of the flow passage 65 on the inlet 18 side and a part of the flow passage 65 on the outlet 19 side are bent from the direction coaxial with the valve shaft 6 to the same direction intersecting the valve shaft 6. In the present embodiment, an upstream side of the other flow passage 69 relative to the assembly hole 68 communicates with a lower part of the assembly hole 68. Further, a downstream side of the other flow passage 69 relative to the assembly hole 68 communicates with an upper part of the assembly hole 68.

<Inlet Sealing Member and Outlet Sealing Member>

In the present embodiment, the inlet sealing member 24 is provided on an outer surface 66a of the housing 66 around the opening of the inlet 18 of the flow passage 65. Further, the outlet sealing member 25 is provided in the outer surface 66a of the housing 66 around the opening of the outlet 19. While the housing 66 is assembled in the assembly hole 68, the inlet sealing member 24 is placed between the housing 66 and the assembly hole 68 of the EGR passage 63 around the opening of the inlet 18 of the housing 66. Further, the outlet sealing member 25 is placed between the housing 66 and the assembly hole 68 around the opening of the outlet 19 of the housing 66.

<Operations and Effects of the EGR Valve>

According to the configuration of the valve device 61 in the present embodiment described above, even though it differs from the valve device 51 in the fourth embodiment in the shape of the flow passage 65 and the placement of the inlet sealing member 24 and the outlet sealing member 25, the equivalent operations and effects to those in the fourth embodiment can be achieved.

Sixth Embodiment

A sixth embodiment of the valve device embodied in an EGR device will be described below.

<Configuration of Valve Device>

Figure 15:
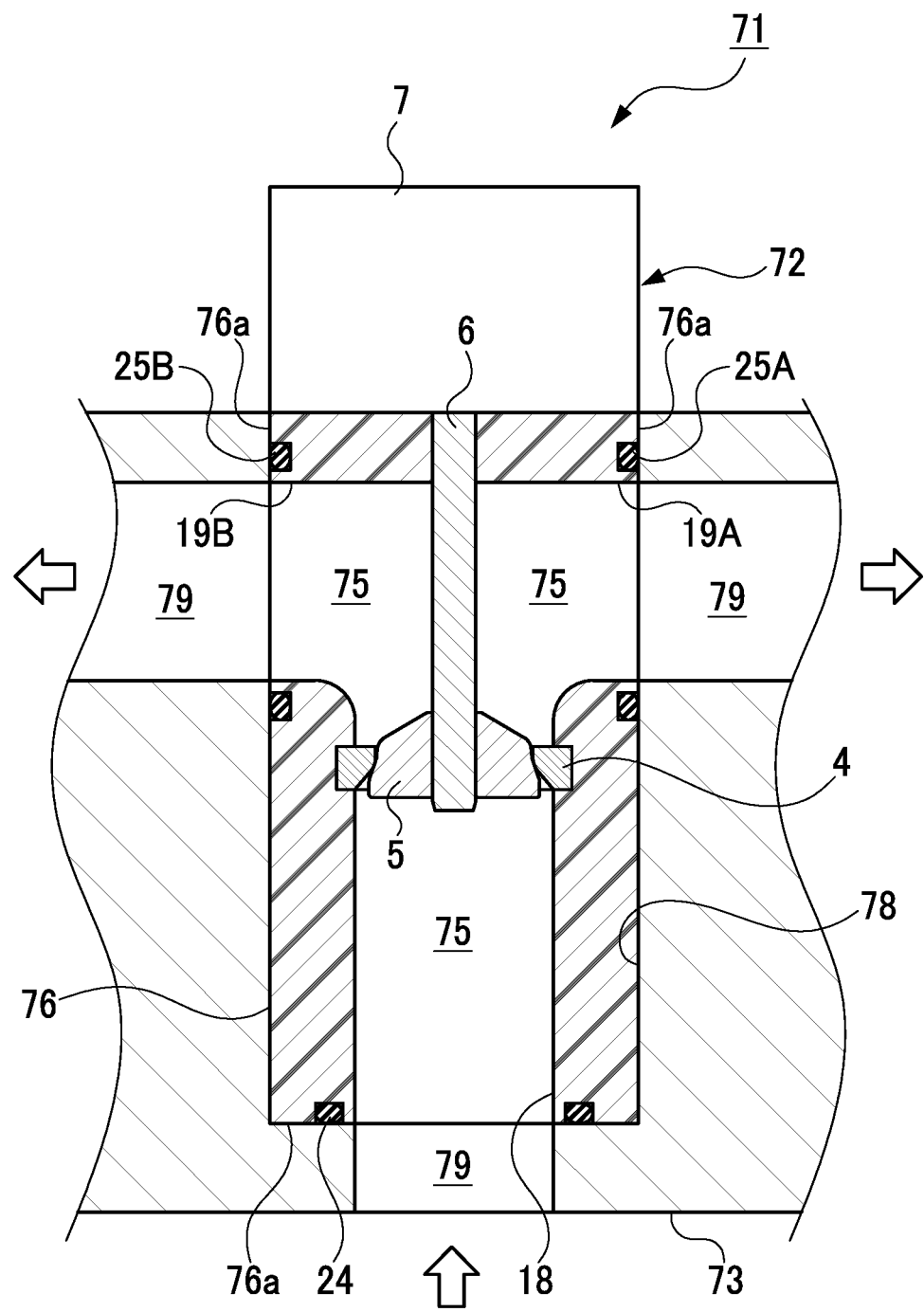
FIG. 15 is a schematic cross-sectional view of a valve device in a sixth embodiment.
Figure 16:
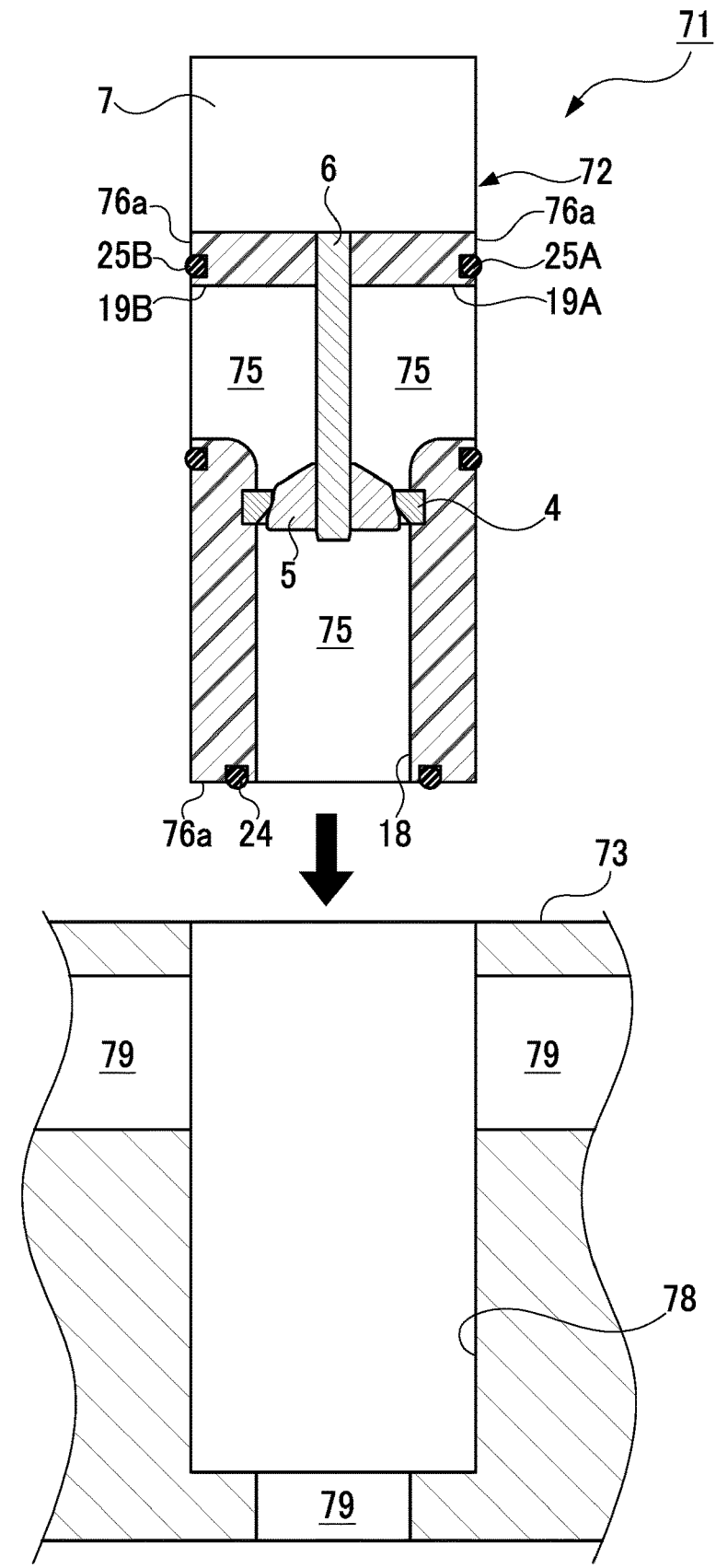
FIG. 16 is a schematic cross-sectional view of the valve device in an exploded state in the sixth embodiment.

FIG. 15 is a schematic cross-sectional view of a valve device 71 in the present embodiment. FIG. 16 is a schematic cross-sectional view of the valve device 71 in an exploded state in the present embodiment. The present embodiment differs in the configuration of the valve device 71 from the foregoing fourth and fifth embodiments. In FIG. 15, arrows indicate a flow direction of EGR gas.

The present embodiment differs from the fourth and fifth embodiments in the shape and the placement of a flow passage 75 and another flow passage 79, and the placement of the inlet sealing member 24 and outlet sealing members 25A and 25B. Specifically, as shown in FIGS. 15 and 16, the valve device 71 in the present embodiment is composed of an EGR valve 72 and an EGR passage 73 which is a mating member thereof. The flow passage 75 of the housing 76 of the EGR valve 72 is bent in a T-shaped cross section. The flow passage 75 of the housing 76 includes a single inlet 18, and two outlets 19A and 19B. That is, a part of the flow passage 75 on the inlet 18 side extends in the direction coaxial with the valve shaft 6. In contrast, parts of the flow passage 75 on the two outlets 19A and 19B are bent from the direction coaxial with the valve shaft 6 to two directions (opposite directions) intersecting the valve shaft 6. In the present embodiment, the upstream side of the other flow passage 79 relative to the assembly hole 78 communicates with a bottom part of the assembly hole 78. Further, two downstream sides of the other flow passage 79 downstream of the assembly hole 78 communicate with an upper part of the assembly hole 78 on opposite sides of the assembly hole 78.

<Inlet Sealing Member and Outlet Sealing Member>

In the present embodiment, the inlet sealing member 24 is provided on an outer surface 76a of the housing 76 around the opening of the inlet 18 of the flow passage 75. Further, the two outlet sealing members 25A and 25B are each provided in the outer surface 76a of the housing 76 around each opening of the two outlets 19A and 19B. While the housing 76 is assembled in the assembly hole 78, the inlet sealing member 24 is provided between the housing 76 and the assembly hole 78 of the EGR passage 73 around the opening of the inlet 18 of the housing 76. Further, the two outlet sealing members 25A and 25B are respectively provided between the housing 76 and the assembly hole 78 around the openings of the two outlets 19A and 19B of the housing 76.

<Operations and Effects of the EGR Valve>

According to the configuration of the valve device 71 in the present embodiment described above, even though it differs in the shape of the flow passage 75 and the placement of the inlet sealing member 24 and the outlet sealing members 25A and 25B from the valve devices 51 and 61 of the fourth and fifth embodiments, the equivalent operations and effects to those in the fourth and fifth embodiments can be achieved.

Seventh Embodiment

A seventh embodiment of the valve device embodied in an EGR device will be described below.

<Configuration of Valve Device>

Figure 17:
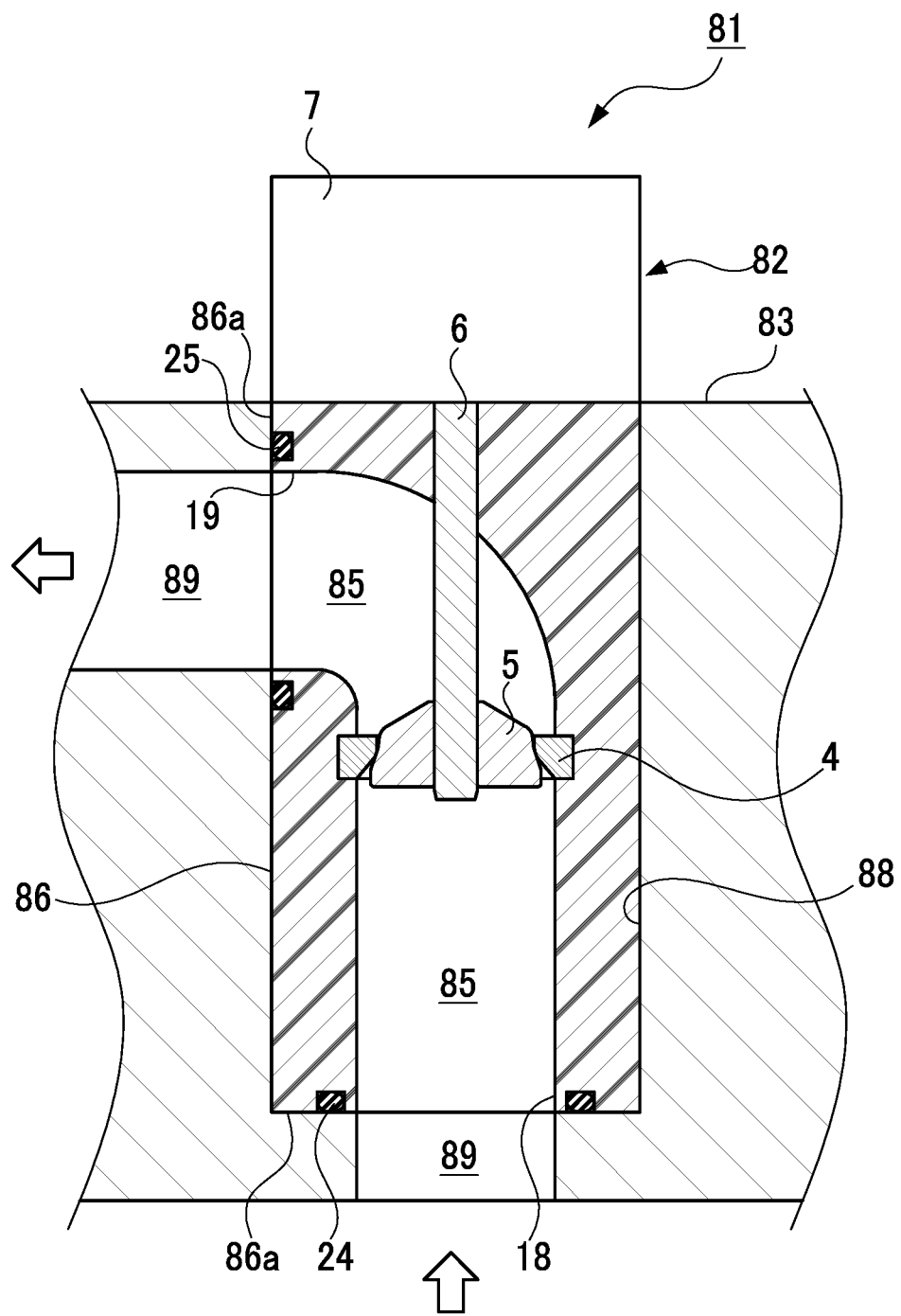
FIG. 17 is a schematic cross-sectional view of a valve device in a seventh embodiment.
Figure 18:
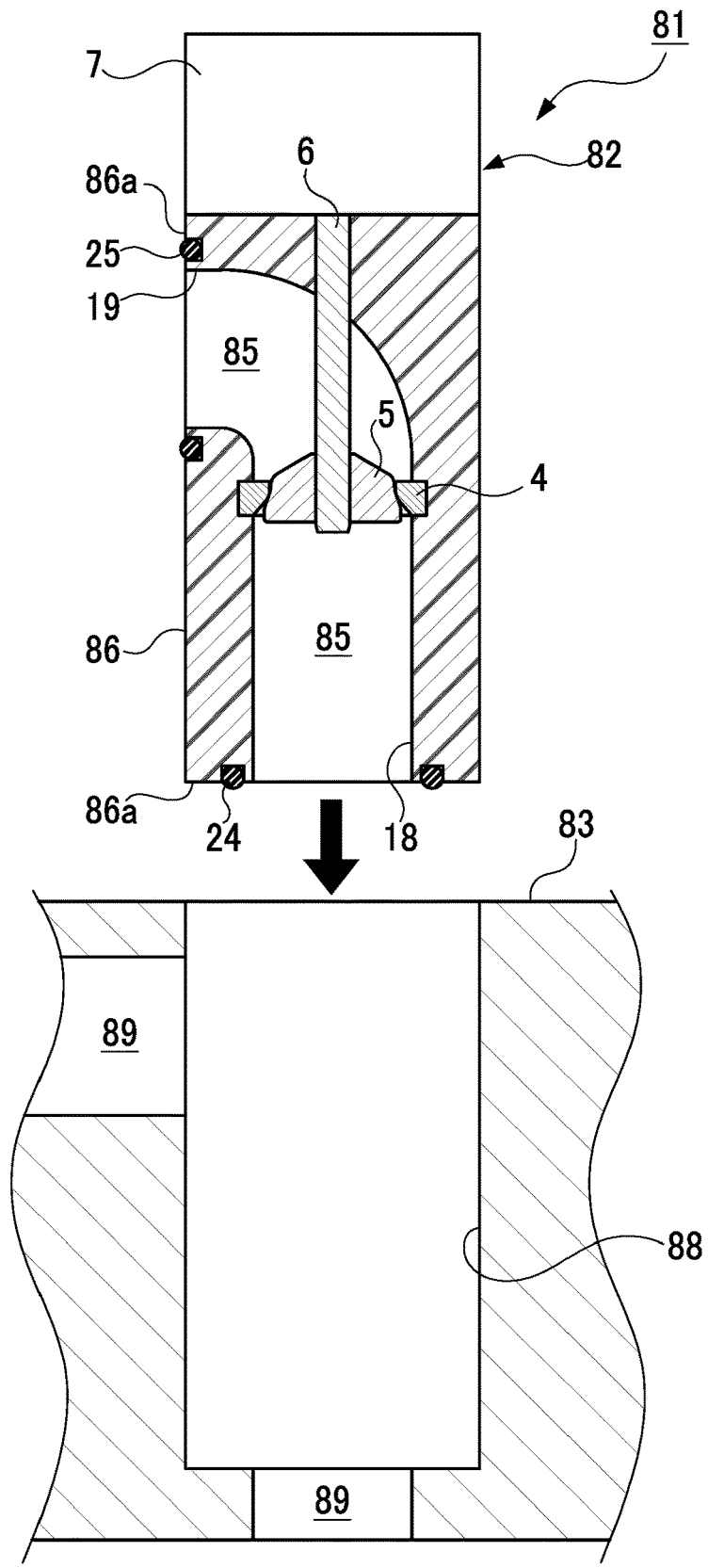
FIG. 18 is a schematic cross-sectional view of the valve device in an exploded state in the seventh embodiment.

FIG. 17 is a schematic cross-sectional view of a valve device 81 in the present embodiment. FIG. 18 is a schematic cross-sectional view of the valve device 81 in an exploded state in the present embodiment. The present embodiment differs in the configuration of the valve device 81 from the foregoing fourth to sixth embodiments. In FIG. 17, arrows indicate a flow direction of EGR gas.

The present embodiment differs from the fourth to sixth embodiments in the shape and the placement of a flow passage 85 and another flow passage 89, and the placement of the inlet sealing member 24 and the outlet sealing member 25. Specifically, as shown in FIGS. 17 and 18, the valve device 81 in the present embodiment is composed of an EGR valve 82 and an EGR passage 83 which is a mating member thereof. The flow passage 85 of the housing 86 of the EGR valve 82 is bent in an inverted J-shaped cross section. The flow passage 85 of the housing 86 includes the inlet 18 and the outlet 19. Specifically, a part of the flow passage 85 on the inlet 18 side extends in a direction coaxial with the valve shaft 6 while a part of the flow passage 85 on the outlet 19 side is bent from the direction coaxial with the valve shaft 6 to one direction (a downstream direction) interesting with the valve shaft 6. In the present embodiment, an upstream side of the other flow passage 89 relative to the assembly hole 88 communicates with a bottom part of the assembly hole 88. Further, a downstream side of the other flow passage 89 relative to the assembly hole 88 communicates with an upper part of the assembly hole 88.

<Inlet Sealing Member and Outlet Sealing Member>

In the present embodiment, the inlet sealing member 24 is provided on an outer surface 86a of the housing 86 around the opening of the inlet 18 of the flow passage 85. The outlet sealing member 25 is provided in the outer surface 86a of the housing 86 around the opening of the outlet 19 of the flow passage 85. While the housing 86 is assembled in the assembly hole 88, the inlet sealing member 24 is provided between the housing 86 and the assembly hole 88 of the EGR passage 83 around the opening of the inlet 18 of the housing 86. The outlet sealing member 25 is provided between the housing 86 and the assembly hole 88 around the opening of the outlet 19 of the housing 86.

<Operations and Effects of the EGR Valve>

According to the configuration of the valve device 81 in the present embodiment described above, even though it differs in the shape of the flow passage 85 and the placement of the inlet sealing member 24 and the outlet sealing member 25 from the valve devices 51, 61, and 71 of the fourth to sixth embodiments, the equivalent operations and effects to those of the fourth to sixth embodiments can be achieved.

Eighth Embodiment

An eighth embodiment of the valve device embodied in an air-intake device will be described below.

<Configuration of Valve Device>

Figure 19:
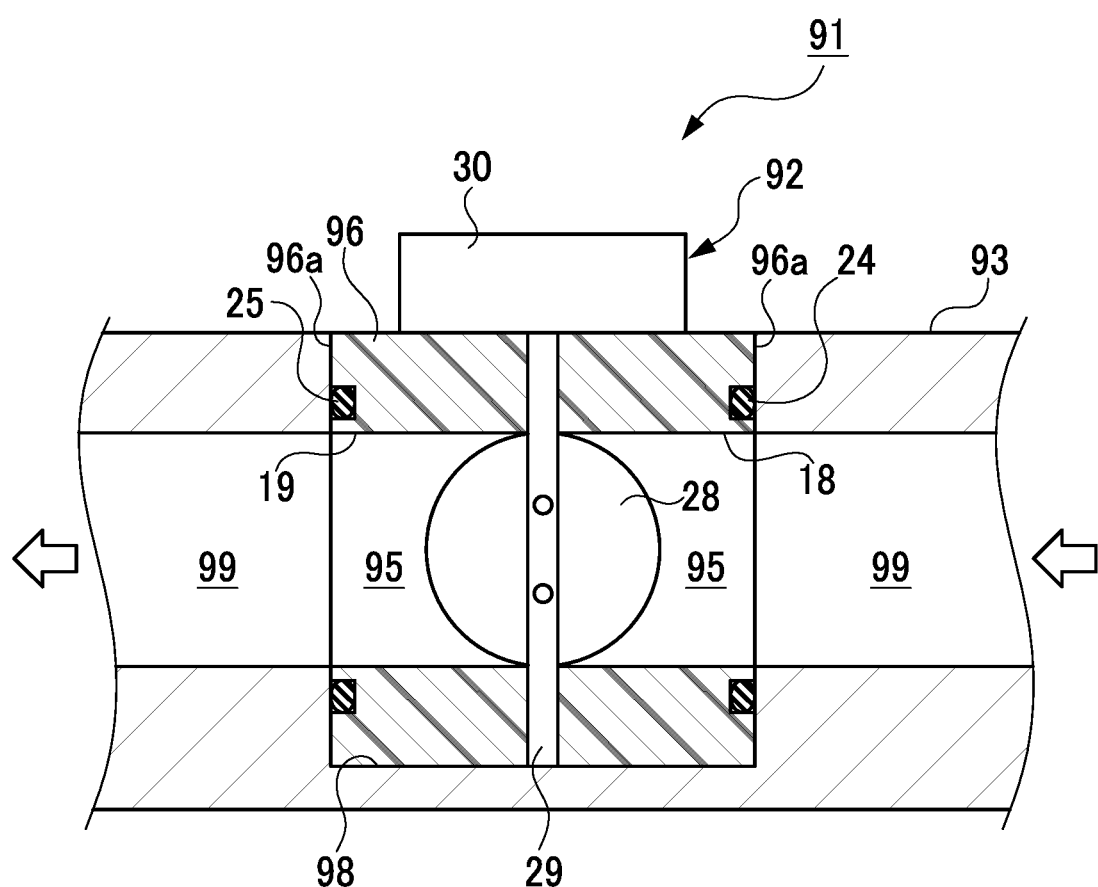
FIG. 19 is a schematic cross-sectional view of a valve device in an eighth embodiment.
Figure 20:
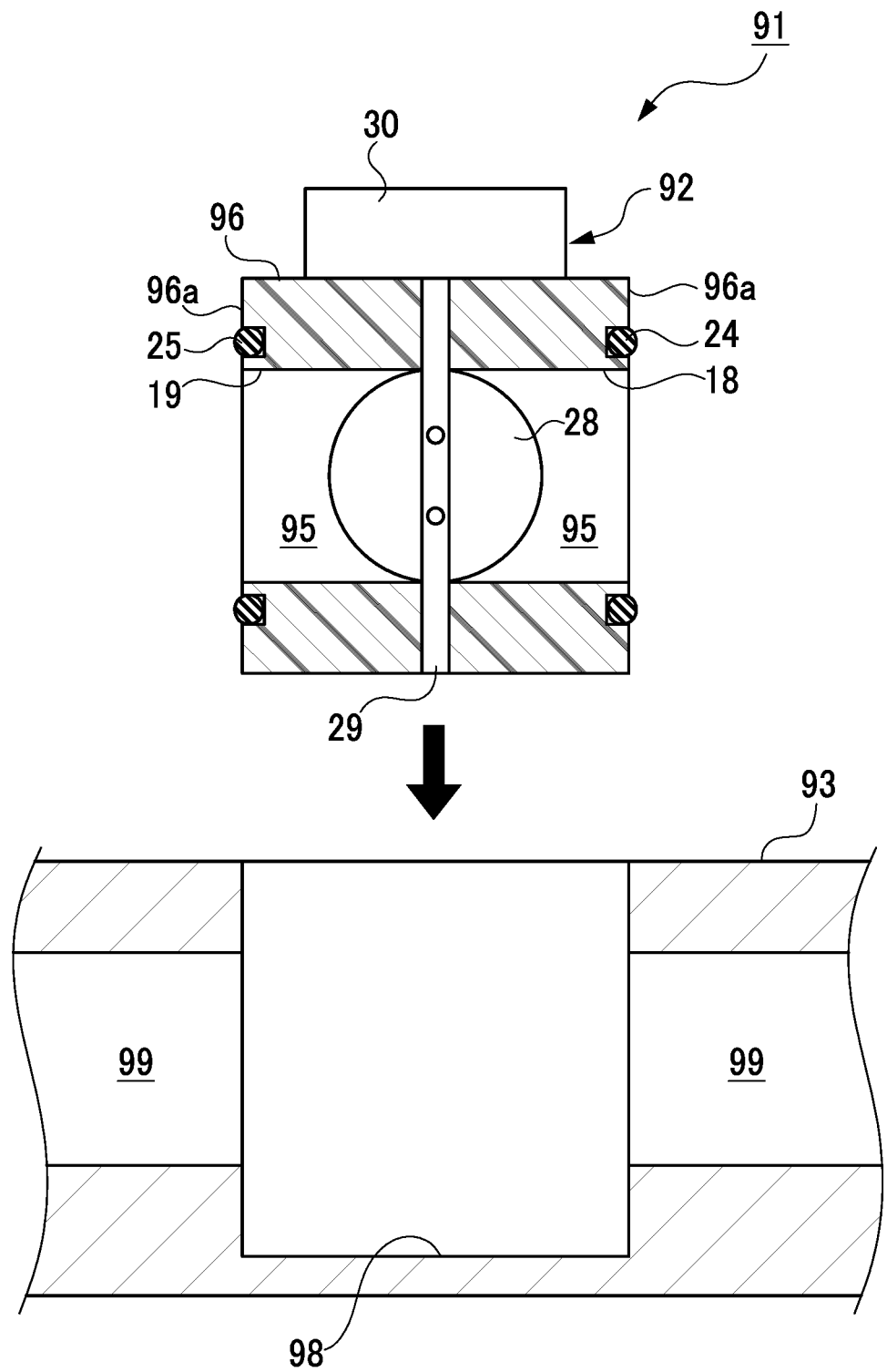
FIG. 20 is a schematic cross-sectional view of the valve device in an exploded state in the eighth embodiment.

FIG. 19 is a schematic cross-sectional view of a valve device 91 in the present embodiment. FIG. 20 is a schematic cross-sectional view of the valve device 91 in an exploded state in the present embodiment. The present embodiment differs from the fourth to seventh embodiments in terms of the configuration of the valve device 91. In FIG. 19, arrows indicate a flow direction of intake air.

As shown in FIGS. 19 and 20, the valve device 91 in the present embodiment is composed of a throttle valve 92 and an intake passage 93 which is a mating member thereof. The throttle valve 92 is provided with a butterfly valve element 28, a valve shaft 29 on which the valve element 28 is provided, and a drive unit 30 to drive the valve shaft 29 to rotate. A flow passage 95 of a housing 96 of the throttle valve 92 has a straight shape. The flow passage 95 includes the inlet 18 and the outlet 19. Specifically, a part of the flow passage 95 close to the inlet 18 extends in one direction (an upstream direction) intersecting the valve shaft 29, while the other part of the flow passage 95 close to the outlet 19 extends in the other direction (a downstream direction) interesting with the valve shaft 29. In the present embodiment, the upstream side of the other flow passage 99 relative to the assembly hole 98 communicates with a one side portion of the assembly hole 98. Further, the downstream side of the other flow passage 99 relative to the assembly hole 98 communicates with an opposite side portion of the assembly hole 98.

<Inlet Sealing Member and Outlet Sealing Member>

In the present embodiment, the inlet sealing member 24 is provided in an outer surface 96a of the housing 96 around the opening of the inlet 18 of the flow passage 95. The outlet sealing member 25 is provided in the outer surface 96a of the housing 96 around the opening of the outlet 19 of the flow passage 95. While the housing 96 is assembled in the assembly hole 98, the inlet sealing member 24 is placed between the housing 96 and the assembly hole 98 of the intake passage 93 around the opening of the inlet 18 of the flow passage 95. Further, the outlet sealing member 25 is placed between the housing 96 and the assembly hole 98 around the opening of the outlet 19 of the flow passage 95.

<Operations and Effects of the EGR Valve>

According to the configuration of the valve device 91 in the present embodiment described above, even though it differs in the shape of the flow passage 95 and the placement of the inlet sealing member 24 and the outlet sealing member 25 from the valve devices 51, 61, 71, and 81 in the fourth to seventh embodiments, the equivalent operations and effects to those in the fourth to seventh embodiments can be achieved.

Ninth Embodiment

A ninth embodiment of the valve device embodied in an EGR valve will be described below.
<Issues with Mating Member being Made of Metal>
In the foregoing first to eighth embodiments, the mating members constituting the valve devices (e.g., the housing 21) are made of a metal material (e.g., aluminum). Thus, each mating member has a large thermal mass and good heat transfer to the outside (allowing the heat of the EGR gas to easily escape to the outside). So, when the temperature of the inner wall of a flow passage is below 60° C., condensed water is likely to be generated from the EGR gas in the flow passage.

When the temperature of hot water (e.g., engine cooling water) to start EGR (hereinafter, referred to as an EGR-start water temperature) is 60° C., the mating member is heated by the hot water and, at the start of EGR, the temperature of the inner wall of the flow flow passage is thus 60° C. In this state, therefore, the generation of condensed water in the flow passage can be suppressed. However, if the EGR-start water temperature is 40° C., the EGR is started with the temperature of the inner wall of the flow passage being 40° C. In this state, condensed water will be generated in the flow passage until the temperature of the inner wall of the flow passage reaches 60° C. In contrast, if the mating member is not heated by the hot water, the temperature of the inner wall of the flow passage at the start of EGR is the temperature before engine start, so that condensed water is apt to be generated in the flow passage until the temperature of the inner wall of the flow passage reaches 60° C. by the heat of the EGR gas.

Figure 21:
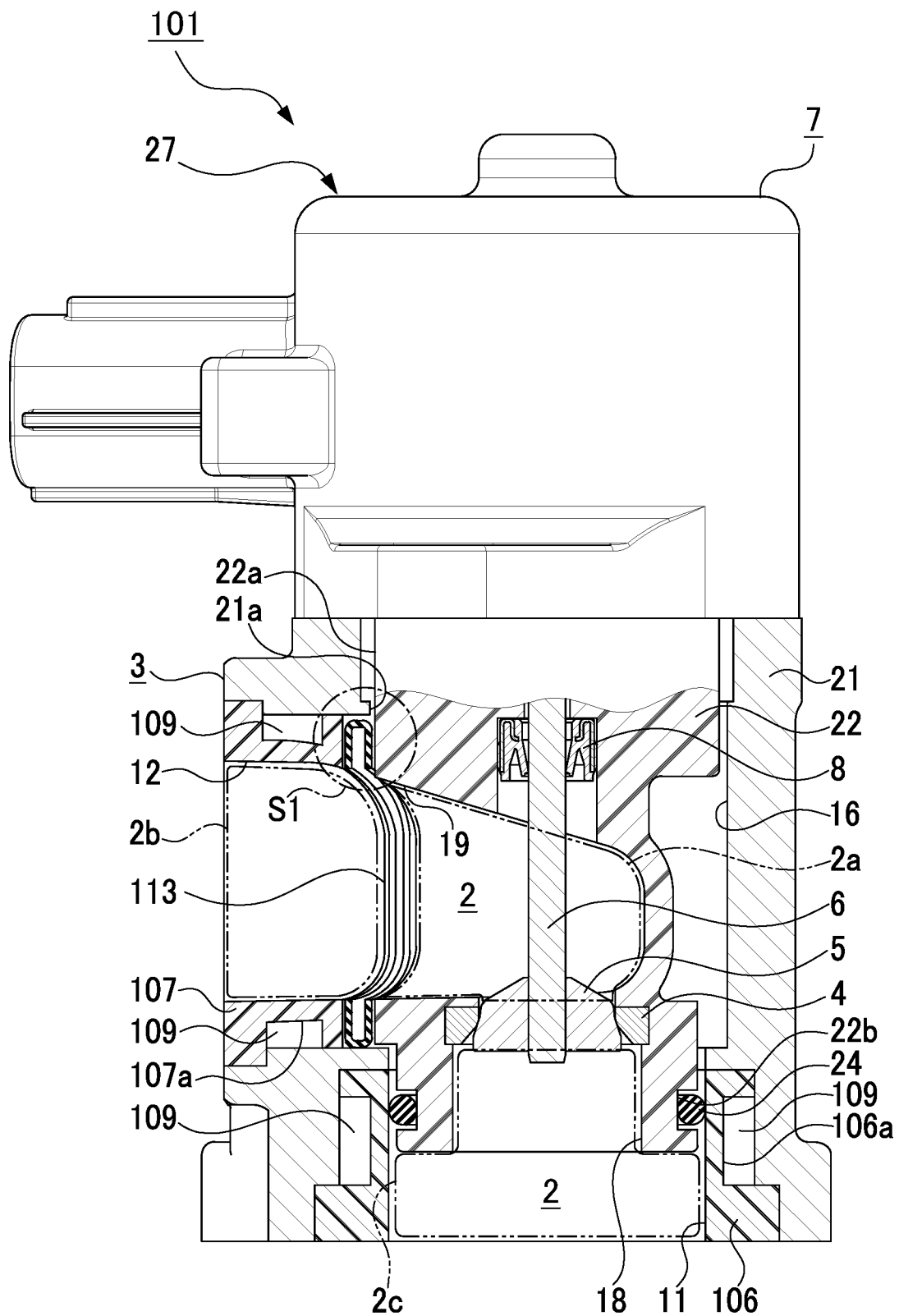
FIG. 21 is a partially-sectional front view of an EGR valve in a ninth embodiment.
Figure 22:
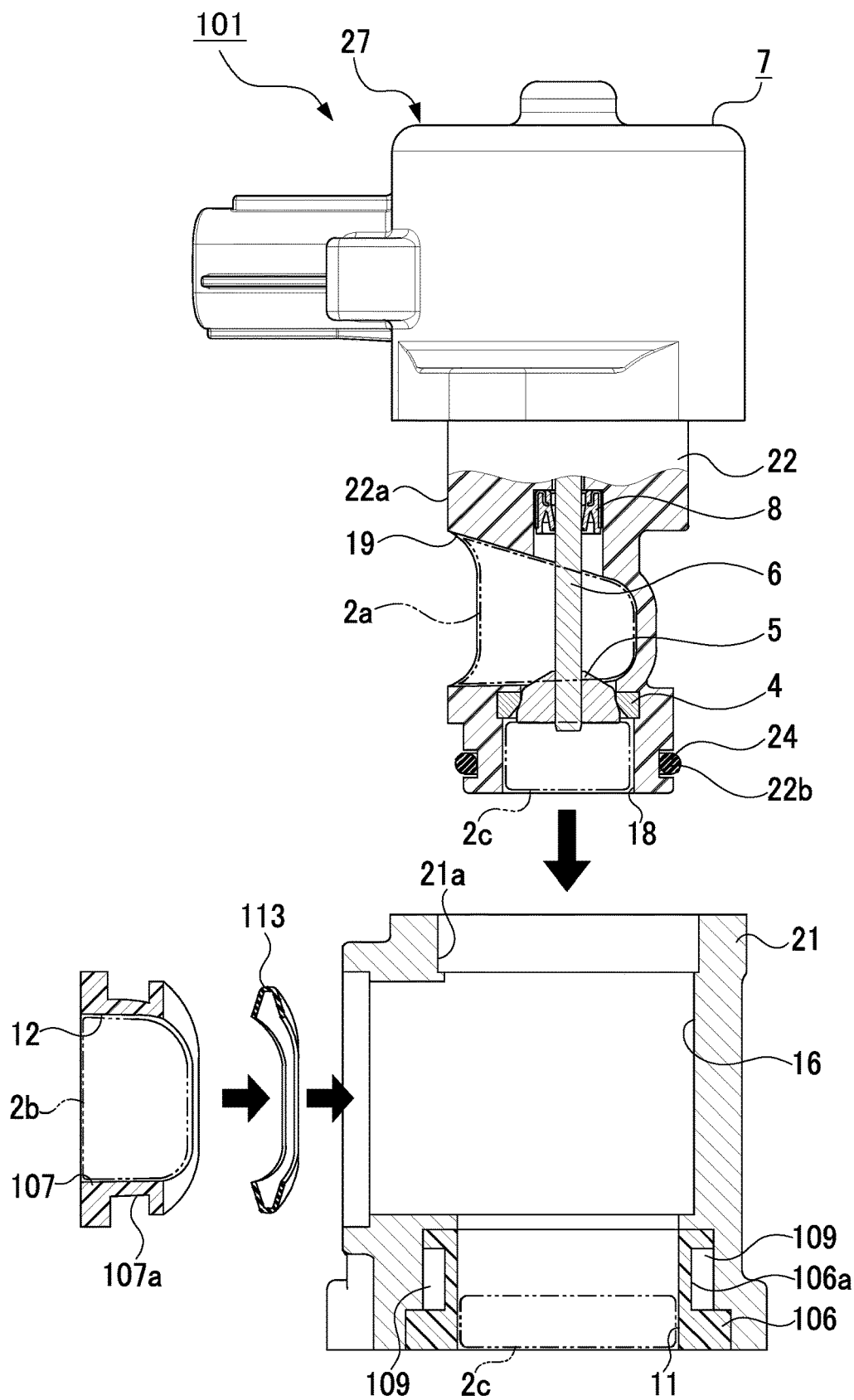
FIG. 22 is a partially-sectional front view of the EGR valve in an exploded state in the ninth embodiment.

In order to address the above issues, consequently, the EGR valve in each of the embodiments described below is configured with the following technical features.
<Configuration of EGR Valve>
FIG. 21 is a partially-sectional front view of an EGR valve 101 in the present embodiment. FIG. 22 is a partially-sectional front view of the EGR valve 101 in an exploded state. The EGR valve 101 in the present embodiment differs from the EGR valve 1 in the first embodiment mainly in terms of the configurations of the outer housing 21, the inlet sealing member 24, and an outlet sealing member 113.
<Outer Housing>
As shown in FIGS. 21 and 22, the outer housing 21 (a mating member) of the EGR valve 101 in the present embodiment is provided with passage members 106 and 107 for a flow of EGR gas (a fluid) respectively located in an inlet passage part 2c (another flow passage) and a part of the assembly hole 16 and in an outlet passage part 2b (another low passage). In other words, an inlet passage member 106 is provided in the inlet passage part 2c and the part of the assembly hole 16, and an outlet passage member 107 is provided in the outlet passage part 2b. The inlet passage member 106 and the outlet passage member 107 are formed in a nearly pipe shape and made of resin. With this configuration, the inlet passage part 2c and the part of the assembly hole 16, and the outlet passage part 2b of the outer housing 21, which are constituted of metal materials in the first embodiment, are constituted of metal materials and resin materials. Thus, the inlet passage part 2c and the outlet passage part 2b have lower thermal mass as compared with that in the first embodiment, and the flow passage 2 is entirely resinified.

In the present embodiment, the passage members 106 and 107 are respectively provided, in their outer surfaces, with recesses 106a and 107a to form an air layer 109 between each of the passage members 106 and 107 and the outer housing 21 (the mating member). Accordingly, each air layer 109 between each of the passage members 106 and 107 and the outer housing 21 forms a heat insulation configuration.
<Inlet Sealing Member and Outlet Sealing Member>
In the present embodiment, as shown in FIGS. 21 and 22, similar to the first to third embodiments, in the inner housing 22 having the inlet 18 and the outlet 19, the inlet 18 opens in a direction coaxial with the valve shaft 6 and the outlet 19 opens in a direction intersecting the valve shaft 6. The inlet sealing member 24 is provided between the inner housing 22 and the outer housing 21 (the mating member), corresponding to the periphery of the inlet 18 (a coaxial opening) that opens in the direction coaxial with the valve shaft 6. Further, the outlet sealing member 113 is provided between the inner housing 22 and the outer housing 21, corresponding to the periphery of the outlet 19 (an intersecting opening) that opens in the direction intersecting the valve shaft 6.

In the present embodiment, as shown in FIGS. 21 and 22, a lower end part of the inner housing 22 is assembled in a part of the inlet passage member 106. In the present embodiment, the inlet sealing member 24 is provided, near the inlet 18 of the inner housing 22, in the outer periphery of the inner housing 22 corresponding to the periphery of the inlet 18. The inlet sealing member 24 is constituted of a rubber O-ring and assembled in a peripheral groove 22b formed in the outer periphery of the inner housing 22. Further, the inlet sealing member 24 provided in the outer periphery of the lower end part of the inner housing 22 exhibits the sealing function by contact with the inner surface of the inlet passage member 106.

In the present embodiment, on the other hand, the outlet sealing member 113 is provided corresponding to the periphery of the outlet 19 (around the opening) of the inner housing 22. The outlet sealing member 113 is constituted of a rubber lip seal, and is mounted around the opening of the outlet 19, and enclosed by a curved outer surface 22a of the inner housing 22, the inner surface of the outer housing 21, and the end face of the outlet passage member 107. In this assembled state, the outlet sealing member 113 is curved to follow the curvature around the opening of the outlet 19. To assemble the outlet sealing member 113, in FIG. 22, the inner housing 22 of the valve assembly 27 is first assembled into the assembly hole 16 of the outer housing 21, the outlet sealing member 113 is inserted into a hole that constitutes the outlet passage part 2b of the outer housing 21, and then the outlet passage member 107 is press-fitted into the hole.

Figure 23:
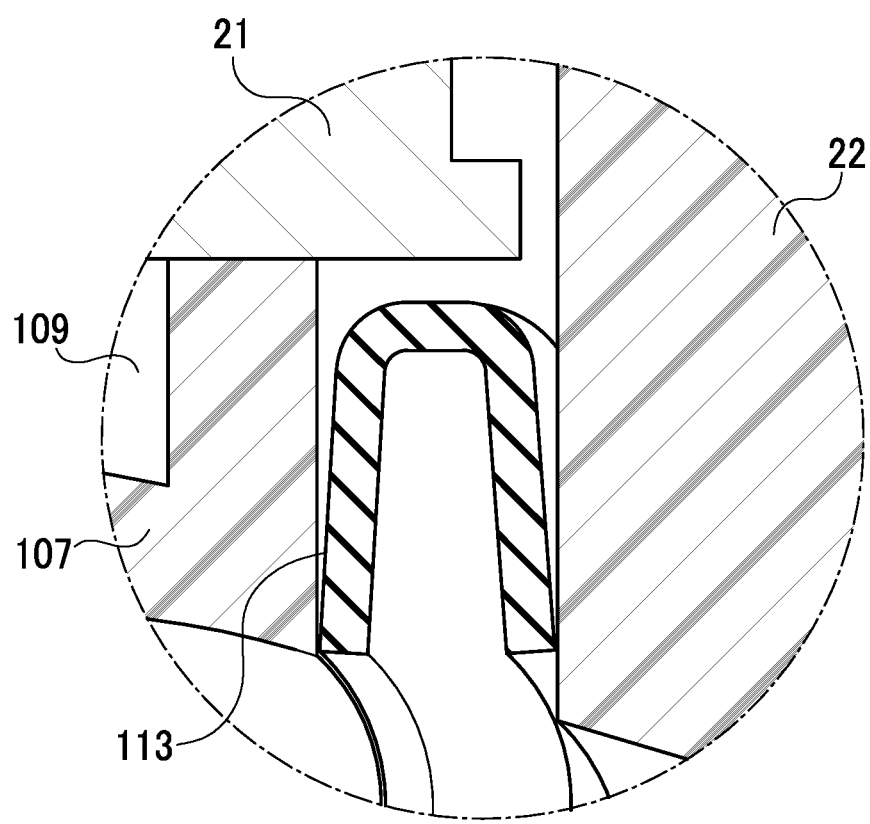
FIG. 23 is an enlarged cross-sectional view of a part of an outlet sealing member enclosed by a dashed-dotted line in FIG. 21 in the ninth embodiment.

FIG. 23 is an enlarged cross-sectional view of a part of the outlet sealing member 113 enclosed by a chain-line circle S1 in FIG. 21. As shown in FIG. 23, the outlet sealing member 113 has a nearly U-shaped cross section, one side of which contacts the end face of the outlet passage member 107 and the other side of which contacts the outer surface 22a of the inner housing 22. As shown in FIG. 23, the outlet sealing member 113 is sandwiched by three members different in material, size and shape, that is, by the inner housing 22 made of resin, the outlet passage member 107 made of resin, and the outer housing 21 made of metal. Those members 21, 22, and 107 may cause positional displacement due to differences in thermal expansion among them. Furthermore, the outlet sealing member 113 may be subjected to positive pressure and negative pressure of intake air acting from the intake passage side of the engine and cause positional displacement due to the pressure.

In the present embodiment, therefore, the outlet sealing member 113 provided corresponding to the periphery of around the outlet 19 which is an intersecting opening has a lower hardness than the inlet sealing member 24 provided corresponding to the periphery of the inlet 18 which is a coaxial opening, and the outlet sealing member 113 has a sealing structure that can ensure the sealing function while allowing both the positional displacement due to thermal expansion differences among the inner housing 22, the outer housing 21, and the outlet passage member 107 and the positional displacement due to the positive pressure and/or the negative pressure, which act on the outlet sealing member 113. The outlet sealing member 113 (a lip seal) having a nearly U-shaped cross section as shown in FIG. 23 is one example of a sealing structure.

The inlet sealing member 24 (an O-ring) provided between the inner housing 22 and the inlet passage member 106 also has a sealing structure that can ensure the sealing function while allowing both the positional displacement due to a thermal expansion difference between the inner housing 22 and the inlet passage member 106 and the positional displacement due to the positive pressure and/or the negative pressure, which act on the inlet sealing member 24. However, since the inlet sealing member 24 and the outlet sealing member 113 are different in sealing requirements, these members 24 and 113 have different sealing structures. Specifically, the inlet sealing member 24 requires high surface pressure to position the valve assembly 27 (the EGR valve main body) with respect to the outer housing 21 and thus must have a high hardness sealing property. In contrast, when the outlet sealing member 113 seals with high surface pressure, the valve assembly 27 may be displaced to the right in FIG. 21. Thus, the outlet sealing member 113 needs to make up a sealing structure with a sealing member having a lower hardness than the inlet sealing member 24. Accordingly, the inlet sealing member 24 and the outlet sealing member 113 are similar in that they are required to address both the positional displacement due to the thermal expansion difference and the positional displacement due to the positive pressure and/or the negative pressure, but they differ in terms of the sealing structures for the above-mentioned reasons.

<Operations and Effects of the EGR Valve>

According to the configuration of the EGR valve 101 in the present embodiment described above, even though the configurations of the outer housing 21 (the mating member) and each configuration of the sealing members 24 and 113 are different from those of the EGR valve 1 in the first embodiment, basically, the equivalent operations and effects to those of the first embodiment can be obtained.

In addition, according to the configuration of this embodiment, the outlet sealing member 113 has the sealing structure that can ensure the sealing function while allowing both the positional displacement due to the thermal expansion differences among the inner housing 22, the outer housing 21, and the outlet passage member 107, and the positional displacement due to the positive pressure and/or the negative pressure, which act on the outlet sealing member 113. Therefore, even if the above positional displacements occur, the sealing property of the outlet sealing member 113 is maintained. Thus, regardless of the positional displacement among the inner housing 22, the outer housing 21, and the outlet passage member 107, and the positional displacement of the outlet sealing member 113, it is possible to prevent the EGR gas (a fluid) from intruding between the boundary surfaces of the inner housing 22 and the outer housing 21 (the mating member), thus preventing leakage of EGR gas to the outside of the flow passage 2 and suction of outside air from the outside of the flow passage 2.

According to the configuration of the present embodiment, the outer housing 21 (the mating member) is provided with the inlet passage member 106 in at least the inlet passage part 2c (another flow passage) and the part of the assembly hole 16 and the outlet passage member 107 in the outlet passage part 2b (another flow passage), each of the passage members 106 and 107 being made of resin and configured to flow EGR gas (a fluid) through. Accordingly, parts of the outer housing 21, which define the inlet passage part 2c and the outlet passage part 2b (another flow passage), are resinified, so that the thermal mass of these parts is lower than metal. Thus, when the EGR gas (the fluid) flows through the inlet passage part 2c and the outlet passage part 2b (another channel), the heat of the EGR gas (the fluid) can rapidly raise the temperature of the inlet passage part 2c and the outlet passage part 2b (another channel), thereby preventing the generation of condensed water in the inlet passage part 2c and the outlet passage part 2b. Even if some condensed water is generated, the inlet passage part 2c and the outlet passage part 2b each of which is resinified can avoid corroding due to the condensed water. Further, the air layer 109 formed between the outer housing 21 (the mating member) and each of the outer surface of the inlet passage member 106 and the outer surface of the outlet passage member 107 makes a heat-insulation configuration of the inlet passage part 2c and the outlet passage part 2b. Thus, the thermal mass of the entire flow passage 2 is further reduced. This configuration can prevent heat transfer (heat escape) from each of the passage members 106 and 107 to the outer housing 21, and prompt a temperature rise of the inlet passage part 2c and the outlet passage part 2b (another flow passage).

Specifically, according to the configuration of the EGR valve 101 in the present embodiment, the inlet passage part 2c and the outlet passage part 2b of the metal outer housing 21 are resinified by the resin inlet passage member 106 and the resin outlet passage member 107, so that the thermal mass of the outer housing 21 is reduced, and the inlet passage part 2c and the outlet passage part 2b can be configured to be thermally insulated, and thus the inner wall of the flow passage 2 can be quickly heated up by the heat of EGR gas. It is consequently possible to suppress the amount of condensed water to be generated on the inner wall of the flow passage 2 even if EGR is started from a stage where engine coolant or outside air is low in temperature.

Figure 24:
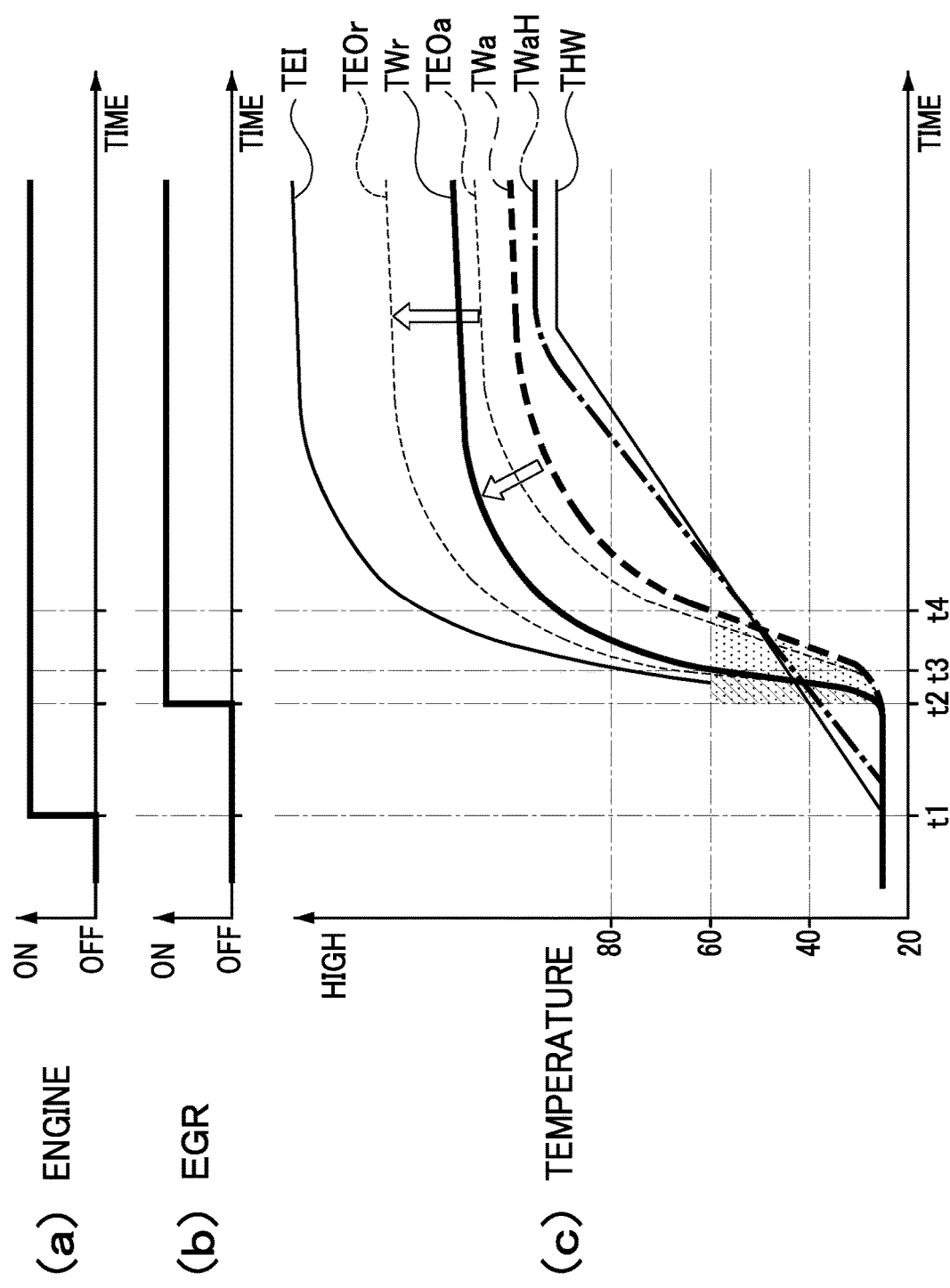
FIG. 24 is a time chart showing behaviors of (a) engine ON/OFF, (b) EGR ON/OFF, and (c) various temperatures in an engine equipped with the EGR valve in the ninth embodiment.

Herein, the following description is given to the effects resulting from the temperature rise achieved by the resin inlet passage member 106 and the resin outlet passage member 107 provided to the metal outer housing 21. FIG. 24 is a time chart showing behaviors of (a) engine ON/OFF, (b) EGR ON/OFF, and (c) various temperatures in an engine equipped with an EGR device. In the temperature shown in FIG. 24(c), a curve TEI indicates an inlet gas temperature that is the EGR gas temperature at the inlet 11 (the first embodiment and the present embodiment), a curve TEOr indicates a resinified outlet gas temperature that is the EGR gas temperature at the outlet 12 when the flow passage 2 is fully resinified (the present embodiment), a curve TEOa indicates a metalized outlet gas temperature that is the EGR gas temperature at the outlet 12 when the inlet passage part 2c and the outlet passage part 2b are metalized (the first embodiment). In contrast, a curve TWr indicates a resinified inner-wall temperature that is the temperature of the inner wall of the flow passage 2 when the flow passage 2 is fully resinified, a curve TWa indicates a metalized inner-wall temperature that is the temperature of the inner wall of the flow passage 2 when the inlet passage part 2c and the outlet passage part 2b are metalized (the first embodiment), a curve TWaH indicates a heated metalized inner-wall temperature that is the temperature of the inner wall of the flow passage 2 when the inlet passage part 2c and the outlet passage part 2b are metalized and they are heated by engine coolant (hot water), and a curve THW indicates a cooling water temperature that is the temperature of engine coolant (the first embodiment and the present embodiment).

As shown in FIG. 24, when the engine starts operating at time t1 and then starts EGR at time t2, the metalized inner-wall temperature TWa reaches 60° C. at time t4. Thus, condensed water is generated in the flow passage 2 between time t2 and time t4. In contrast, the resinified inner-wall temperature TWr reaches 60° C. at time t3 earlier than time t4. Thus, condensed water is generated in the flow passage 2 between time t2 and time t3, but the generation amount of condensed water (a region hatched with oblique lines in FIG. 24) can be smaller than the generation amount of condensed water (a region hatched with dots in FIG. 24) in the EGR valve 1 in the first embodiment.

Tenth Embodiment

A tenth embodiment of the valve device embodied in an EGR valve will be described below.
<Outlet Sealing Member>

Figure 25:
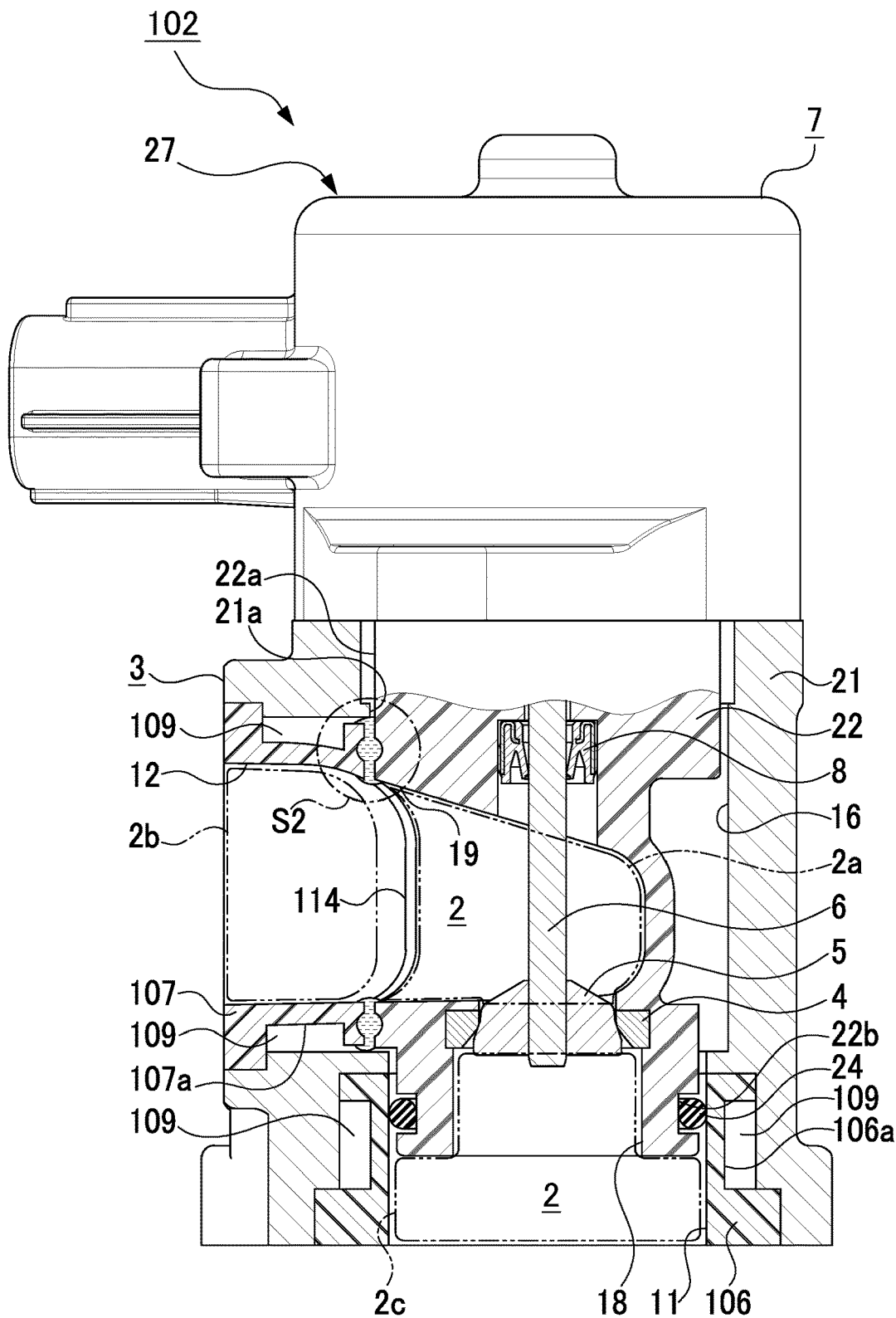
FIG. 25 is a partially-sectional front view of an EGR valve in a tenth embodiment.
Figure 26:
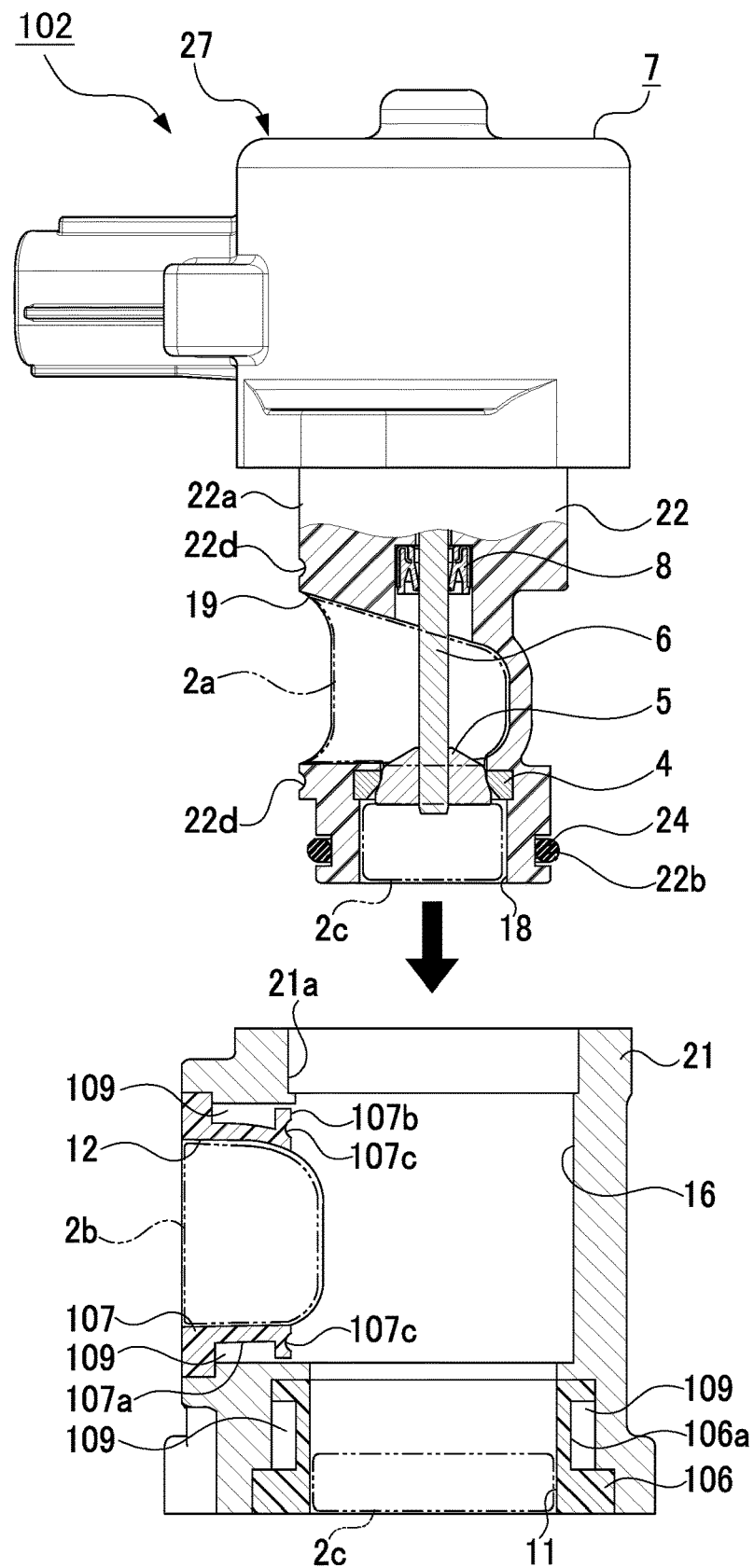
FIG. 26 is a partially-sectional front view of an EGR valve in an exploded state in the tenth embodiment.
Figure 27:
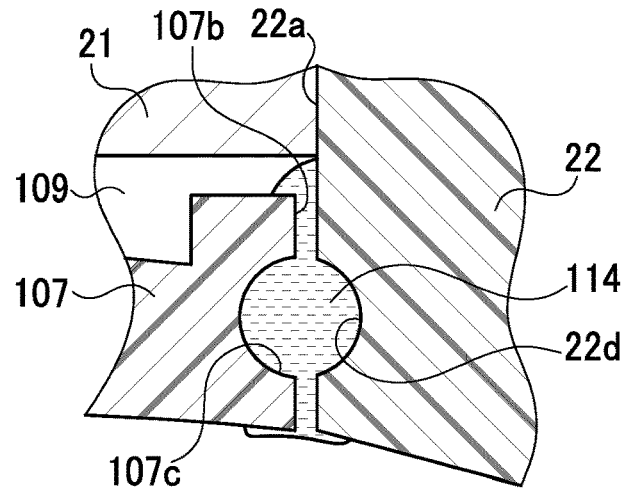
FIG. 27 is an enlarged cross-sectional view of a part of an outlet sealing member enclosed by a dashed-dotted line in FIG. 25 in the tenth embodiment.

An EGR valve 102 in the present embodiment differs in the configuration of an outlet sealing member 114 from the configuration of the outlet sealing member 113 of the ninth embodiment. FIG. 25 is a partially-sectional front view of the valve device 102 in the present embodiment. FIG. 26 is a partially-sectional front view of the EGR valve 102 in an exploded state. FIG. 27 is an enlarged cross-sectional view of a part of the outlet sealing member 114 enclosed by a dashed-dotted line S2 in FIG. 25.

As shown in FIG. 25, the outlet sealing member 114 in the present embodiment is constituted of an adhesive filled in a gap between an inner housing 22 and an outlet passage member 107. As shown in FIGS. 26 and 27, an annular end face 107b of the outlet passage member 107 includes an annular groove 107c circularly formed to contain the outlet sealing member 114. An outer surface 22a of the inner housing 22 includes an annular groove 22d circularly formed corresponding to the annular groove 107c. The two annular grooves 107c and 22d are each semi-circular in cross-section, forming a filling chamber having a circular cross-section in combination. The outlet sealing member 114 can be provided in a way that the valve assembly 27 is assembled in the assembly hole 16 of the outer housing 21 as shown in FIG. 26, and then, an adhesive is filled in the filling chamber formed by the two annular grooves 107c and 22d and the gap formed between the outer surface 22a of the inner housing 22 and the end face 107b of the outlet passage member 107.

Herein, the inner housing 22 and the outlet passage member 107, each of which is made of resin and constitutes the EGR valve 102, are different in thermal expansion from the metal outer housing 21, so that the mating surfaces of the inner housing 22 and the outlet passage member 107 may be displaced in position from each other. Further, the outlet sealing member 114 may be subjected to a positive pressure or a negative pressure of intake air acting from the EGR passage through the flow passage 2. Therefore, the adhesive employed for the outlet sealing member 114 must have the ability to follow the positional displacement in order to ensure the sealing function while allowing the positional displacement due to the thermal expansion difference among the members 21, 22, and 107 and the positional displacement due to the positive pressure or the negative pressure of the intake air acting on the outlet sealing member 114. Accordingly, this adhesive requires to be flexible after curing. This adhesive also requires resistance to condensed water.

In the present embodiment, therefore, as the adhesive that constitutes the outlet sealing member 114, there may be employed for example adhesives whose main component is epoxy-based, silicone-modified polymer, epoxy-modified silicone-based, or rubber-based (nitrile rubber-based, NBR-based). In this embodiment, the outlet sealing member 114 is constituted of the adhesive containing the above main component, providing fluidity and viscosity, and forming a sealing structure that can ensure a sealing function while allowing the above positional displacements.
<Operations and Effects of the EGR Valve>

According to the configuration of the EGR valve 102 in the present embodiment described above, differently from the EGR valve 101 in the ninth embodiment, the following operations and effects in terms of the outlet sealing member 114 can be achieved. Specifically, the outlet sealing member 114 has the sealing structure that can ensure the sealing function while allowing the above positional displacement. Thus, the sealing property of the outlet sealing member 114 is maintained even if the above positional displacements occur. Therefore, regardless of the positional displacement between the inner housing 22, the outer housing 21, and the outlet passage member 107, and the positional displacement of the outlet sealing member 114, it is possible to prevent the EGR gas (a fluid) from intruding between the boundary surfaces of the inner housing 22 and the outer housing 21 (the mating member), and preventing leakage of EGR gas to the outside of the flow passage 2 and suction of outside air from the outside of the flow passage 2.

Figure 28:
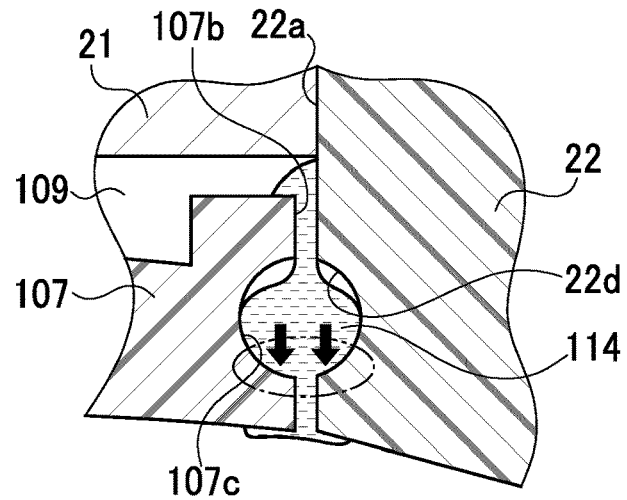
FIG. 28 is a cross-sectional view, corresponding to FIG. 27, showing that a negative pressure of intake air acts on the outlet sealing member in the tenth embodiment.
Figure 29:
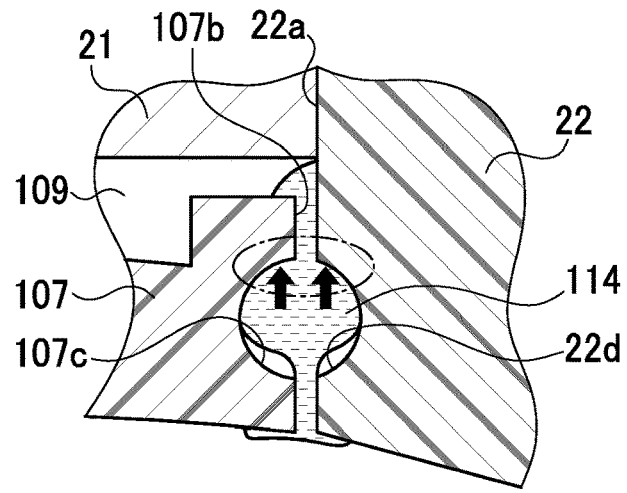
FIG. 29 is a cross-sectional view, corresponding to FIG. 27, showing that a positive pressure of intake air acts on the outlet sealing member in the tenth embodiment.

When the positive pressure and the negative pressure of intake air act on the outlet sealing member 114, especially, the outlet sealing member 114 functions as below. FIG. 28 is a cross-sectional view corresponding to FIG. 27, showing that the negative pressure of intake air acts on the outlet sealing member in the 114 and FIG. 29 is a cross-sectional view corresponding to FIG. 27, showing that the positive pressure of intake air acts on the outlet sealing member 114. As shown in FIG. 28, when the negative pressure of intake air acts on the outlet sealing member 114, the outlet sealing member 114 (the adhesive) in the filling chamber formed by the two annular grooves 107c and 22d is drawn by the negative pressure and displaced toward the flow passage 2, thereby ensuring the sealing function while following the positional displacement. In contrast, as shown in FIG. 29, when the positive pressure of intake air acts on the outlet sealing member 114, the outlet sealing member 114 (the adhesive) in the filling chamber formed by the two annular grooves 107c and 22d is pressed by the positive pressure and displaced toward the air layer 109, thereby ensuring the sealing function while following the positional displacement.

Eleventh Embodiment

An eleventh embodiment of the valve device embodied in an EGR valve will be described below.

<Inlet Sealing Member and Others>

Figure 30:
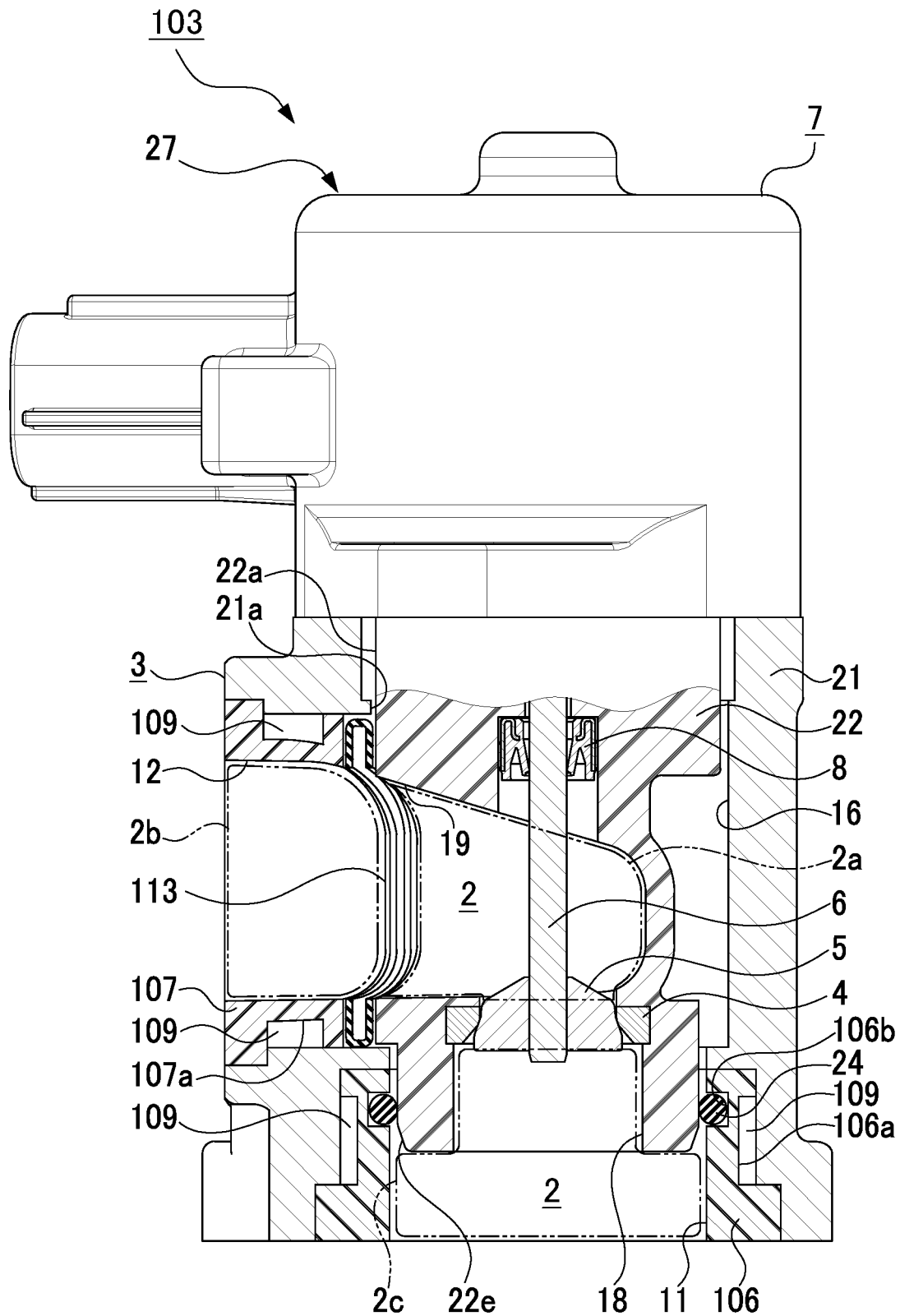
FIG. 30 is a partially-sectional front view of an EGR valve in an eleventh embodiment.
Figure 31:
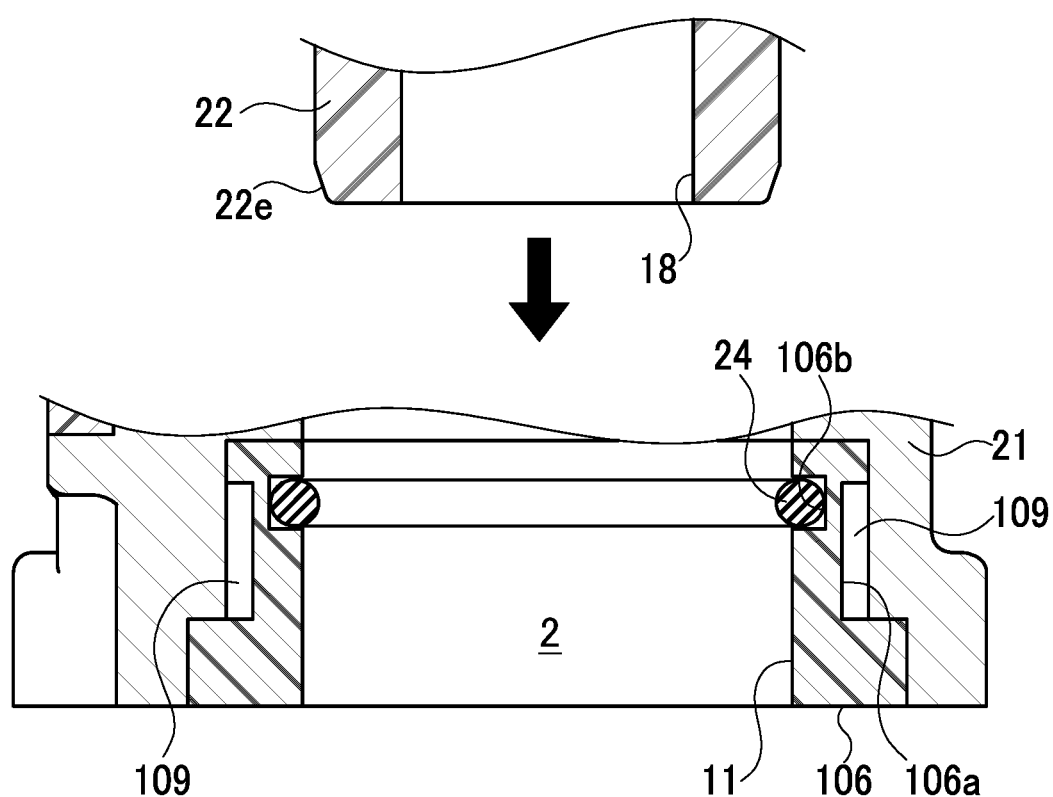
FIG. 31 is a cross-sectional view of a part of an inlet sealing member of an EGR valve in an exploded state in the eleventh embodiment.

An EGR valve 103 in the present embodiment differs in the configuration related to the outlet sealing member 24 from the EGR valve 101 in the ninth embodiment. FIG. 30 is a partially-sectional front view of the EGR valve 103 in the present embodiment. FIG. 31 is a cross-sectional view of a part of the inlet sealing member 24 of the EGR valve 103 in an exploded state. In the present embodiment, as shown in FIGS. 30 and 31, while the inner housing 22 is assembled in the assembly hole 16 of the outer housing 21, a lower part (a part) of the inner housing 22 is inserted in the inlet passage member 106. The inlet sealing member 24, which is constituted of an O-ring, is mounted in a peripheral groove 106b formed in the inner surface of the inlet passage member 106 in which the part (the lower part) of the inner housing 22 is inserted. Herein, the lower part of the inner housing 22 is provided with an end edge 22e, which can come into contact with the inlet sealing member 24 when the lower part of the inner housing 22 is inserted into the inlet passage member 106. In the present embodiment, this end edge 22e is chamfered in a taper shape.

<Operations and Effects of the EGR Valve>

According to the configuration of the EGR valve 103 described above, differently from the EGR valve 101 in the ninth embodiment, the following operations and effects in terms of the inlet sealing member 24 can be achieved. Specifically, since the end edge 22e of the lower part of the inner housing 22 is chamfered, this can prevent damage to the inlet sealing member 24 by contact with the end edge 22e of the inner housing 22 when the inner housing 22 is assembled into the assembly hole 16. Consequently, the durability of the sealing function of the inlet sealing member 24 can be enhanced.

Twelfth Embodiment

A twelfth embodiment of the valve device embodied in an EGR valve will be described below.

<Outer Housing>

Figure 32:
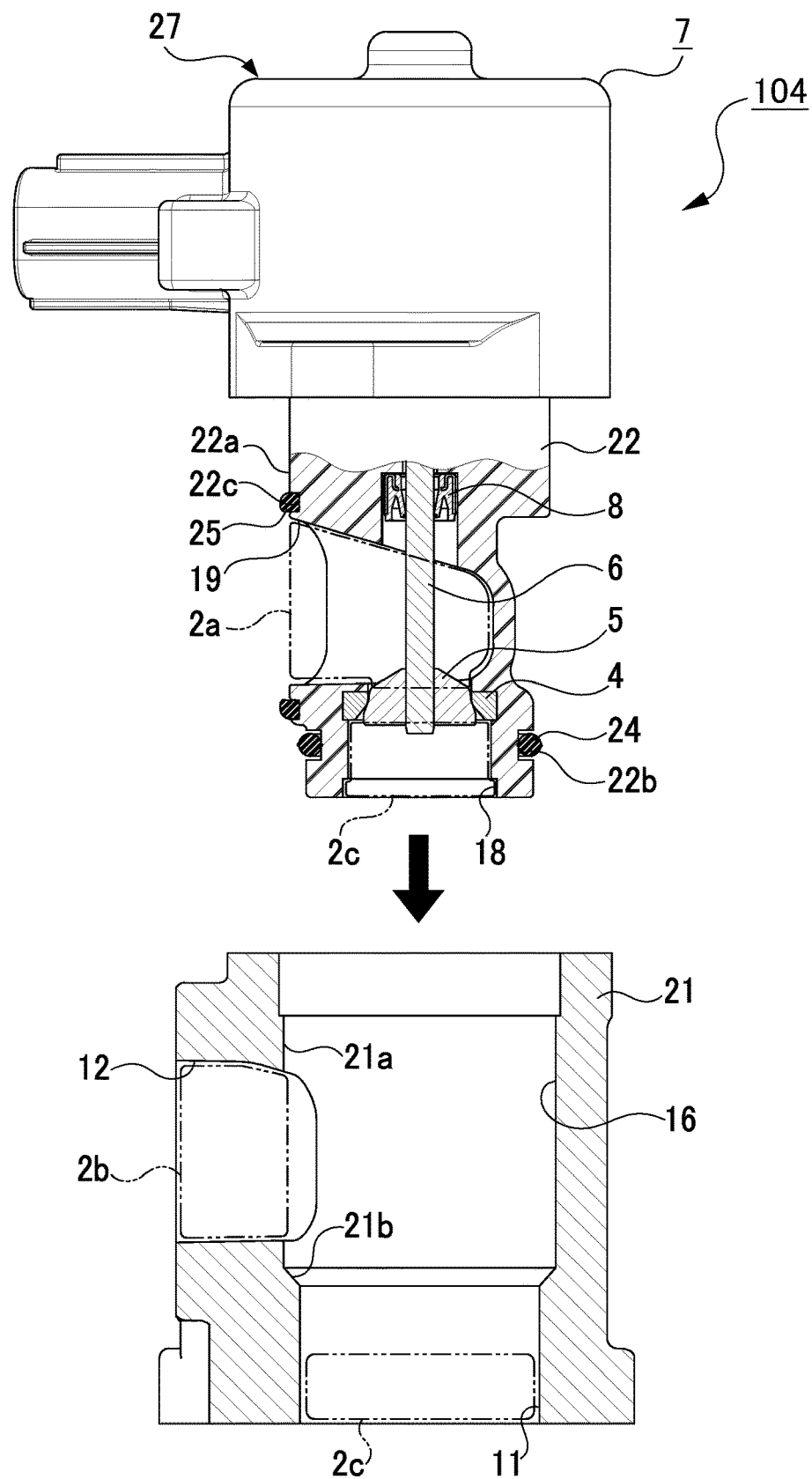
FIG. 32 is a partially-sectional front view of an EGR valve in an exploded state in a twelfth embodiment.

An EGR valve 104 in the present embodiment differs in the configuration of the outer housing 21 from the EGR valve 101 in the ninth embodiment. FIG. 32 is a partially-sectional front view of the EGR valve 104 in an exploded state. In the present embodiment, as shown FIG. 32, differently from the ninth embodiment, the assembly hole 16 of the outer housing 21 (the mating member) is internally provided with an opening edge 21b, which is chamfered in a taper shape and can come into contact with the inlet sealing member 24 when a lower part (a part) of the inner housing 22 is inserted into the assembly hole 16.

According to the configuration of the EGR valve 104 in the present embodiment, since the opening edge 21b of the assembly hole 16 of the outer housing 21 is chamfered, this can prevent the inlet sealing member 24 from getting damaged by contact with the opening edge 21b of the assembly hole 16 when the inner housing 22 is assembled into the assembly hole 16. Consequently, the durability of the sealing function of the inlet sealing member 24 can be enhanced.

Thirteenth Embodiment

A thirteenth embodiment of the valve device embodied in an EGR valve constituted of a double eccentric valve will be described below.

In the case of an EGR valve constituted of a double eccentric valve, when a housing that forms a flow passage is made of a metal material (e.g., aluminum), the housing has a large heat mass and good heat transfer to the outside (allowing the heat of the EGR gas to easily escape to the outside), so that condensed water is apt to be generated from the EGR gas in the flow passage when the temperature of the inner wall of the flow passage is 60° C. or less. Since the temperature of the inner wall of the flow passage at the start of EGR is the temperature of outside air before the engine starts, condensed water is apt to be generated in the flow passage until the inner wall of the flow passage reaches a temperature of 60° C. due to the heat of EGR gas.

Herein, for example, Japanese unexamined patent application publication No. 2016-6298 (Cited reference) proposes an EGR valve intended to prevent the generation of condensed water in a flow passage. This EGR valve is provided with an outer-layer housing made of a resin material and an inner-layer passage member made of a metal material, which is produced separately from the housing and internally provided with the flow passage. The passage member is covered by the housing, so that the flow passage is provided in the housing. Furthermore, an air layer for heat insulation is provided between the inner-layer passage member and the outer-layer housing. In this EGR valve, EGR gas flowing through the flow passage quickly warms the metal passage member. Since the passage member is covered by the resin housing, heat release from the passage member is prevented. Moreover, since the air layer is provided between the passage member and the housing, heat release from the passage member is further prevented by the air layer.

Meanwhile, in the EGR valve of the above cited reference, the outer-layer housing is internally formed with a recess, thereby forming the air layer between the passage member and the housing. In order to cover the passage member with the housing, it is therefore necessary to form the housing of separate pieces in advance and then sequentially fix those separate pieces to the outside of the passage member by welding. Herein, it is conceivable to form the housing as a single piece without dividing and make up the passage member in a drop-in shape for the housing. However, the outer-layer housing is formed inside with a recess for the air layer, it is difficult to mold the housing having such a shape from resin by a single die-cutting process.

Therefore, in order to quickly raise the temperature of the inner wall of the flow passage at the start of EGR to 60° C. or higher by the heat of EGR gas, and to quickly suppress the generation of condensed water in the flow passage, the EGR valve of this embodiment has the following technical features.

<Configuration of EGR Valve>

Figure 33:
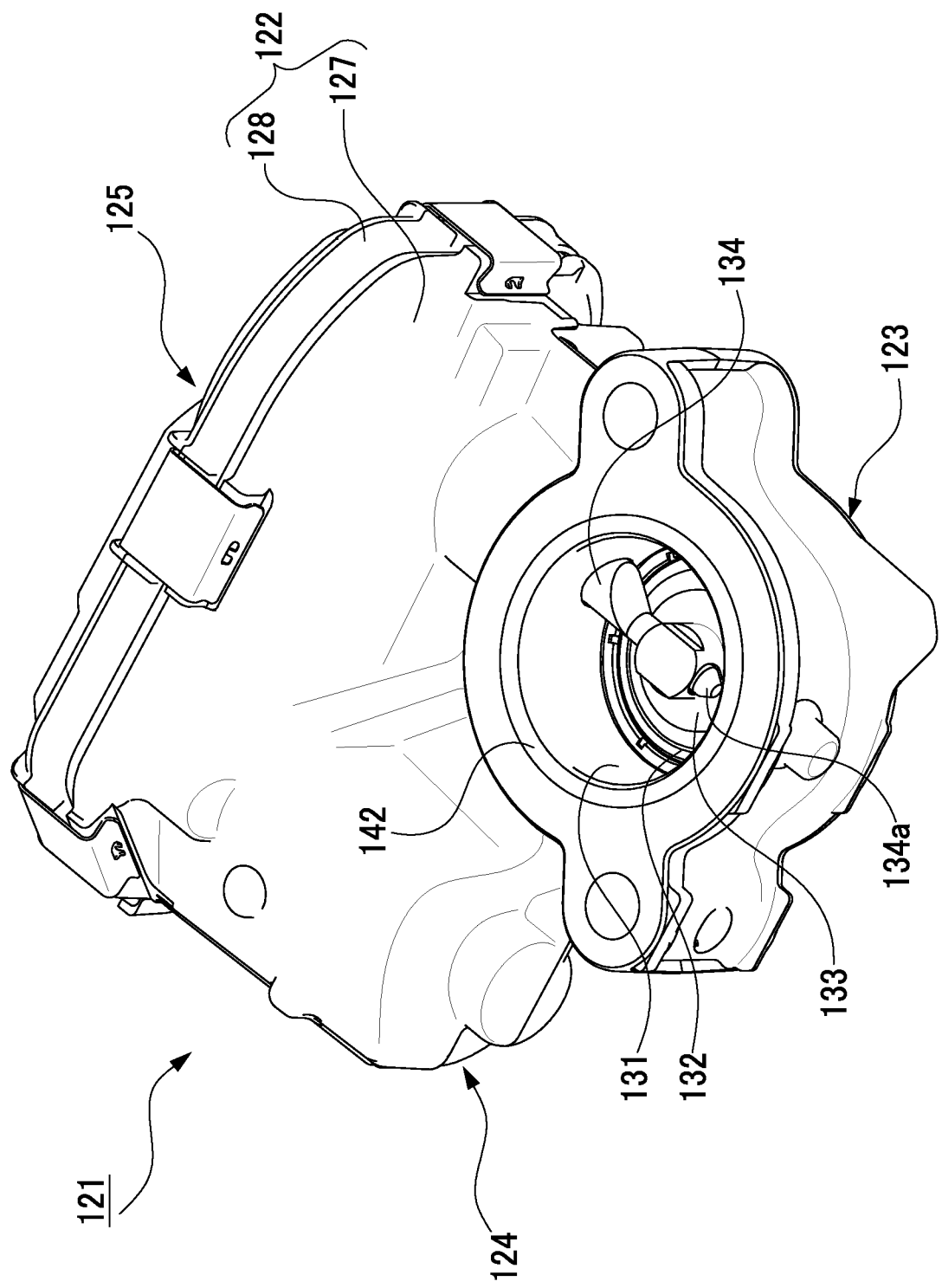
FIG. 33 is a perspective view of an EGR valve constituted of a double eccentric valve in a thirteenth embodiment.

FIG. 33 is a perspective view of an EGR valve 121 constituted of a double eccentric valve. As shown in FIG. 33, this EGR valve 121 is provided with a housing 122. The housing 122 is provided with a valve section 123 that constitutes the double eccentric valve, a motor section 124 that incorporates a motor (not shown), and a speed-reducing mechanism section 125 that incorporates a speed-reducing mechanism 137 (see FIG. 34). The valve section 123 is provided with a flow passage 131 for flowing EGR gas. In the flow passage 131, there are placed a valve seat 132, a valve element 133, and a part of a rotary shaft 134. The rotary shaft 134 serving as a valve shaft is configured to receive the rotary torque of the motor transmitted through the speed-reducing mechanism 137.

Figure 34:
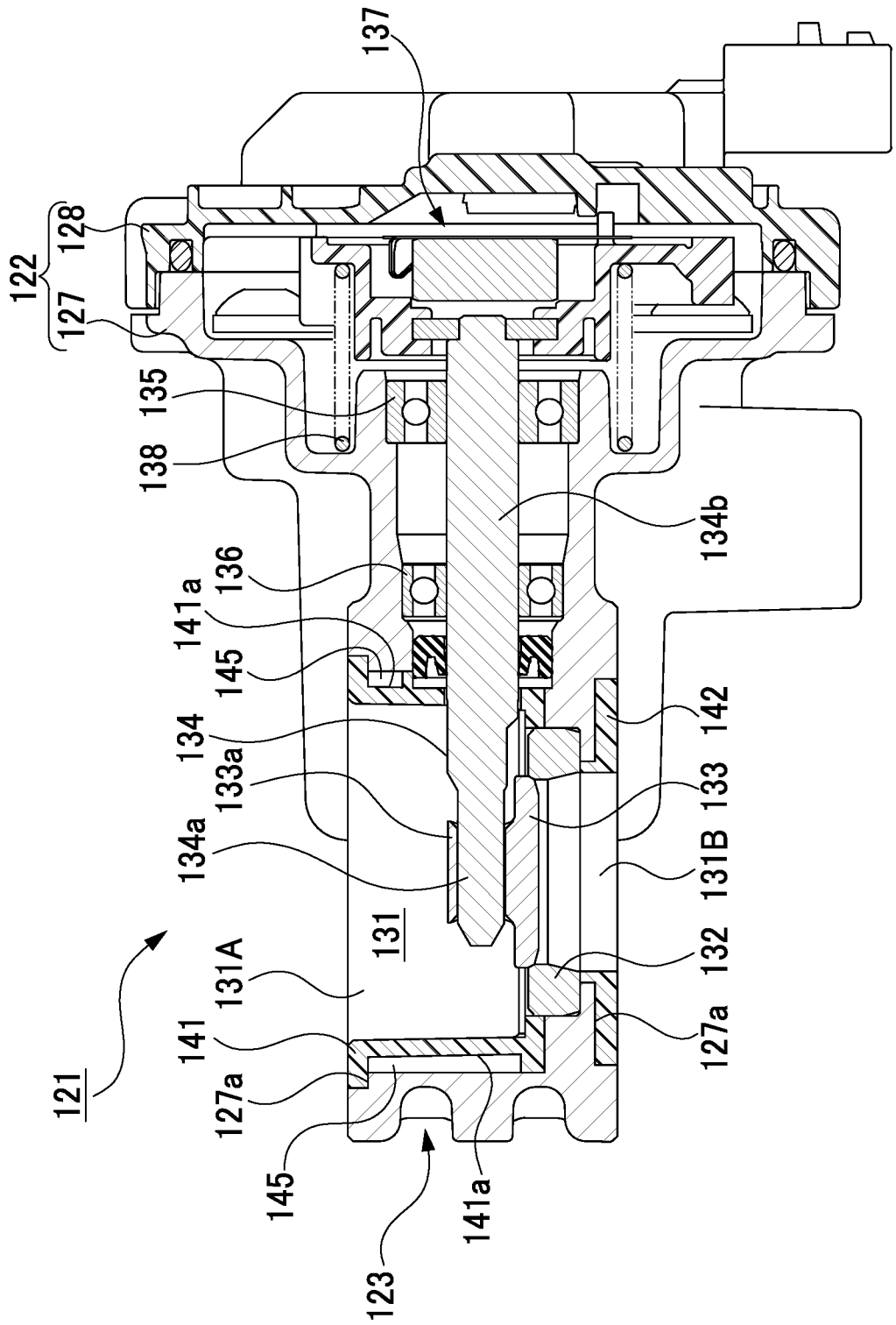
FIG. 34 is a cross-sectional view of the EGR valve taken along a rotary shaft in the thirteenth embodiment.

FIG. 34 is a cross-sectional view of the EGR valve 121 taken along the rotary shaft 134. As shown in FIG. 34, the valve seat 132 is assembled in the flow passage 131. The valve seat 132 has an annular shape and the valve element 133 has a disc shape. The valve element 133 is formed, on its upper surface, with a boss-shaped protrusion 133a. The valve element 133 is fixed to a distal end portion 134a of the rotary shaft 134 through the protrusion 133a. The rotary shaft 134 has a proximal end portion 134b which is rotatably supported in a cantilevered configuration by the housing 122 through two bearings 135 and 136. At the proximal end portion 134b of the rotary shaft 134, the speed-reducing mechanism 137 is provided to be drivingly connected to a motor (not shown). The speed-reducing mechanism 137 includes a plurality of gears, and others. The speed-reducing mechanism 137 is provided with a return spring 138 to urge the valve element 133 to rotate in a valve closing direction.

As shown in FIGS. 33 and 34, the housing 122 includes a valve housing 127 made of a metal material (e.g., aluminum) and an end frame 128 made of a resin material. The flow passage 131 is separated into an upstream flow passage 131A on the upper side and a downstream flow passage 131B on the lower side relative to the valve seat 132. In the present embodiment, the valve element 133 and the protrusion 133a, and the distal end portion 134a of the rotary shaft 134 are placed in the upstream flow passage 131A.

In this EGR valve 121, accordingly, when the rotary shaft 134 is rotated from a fully closed state shown in FIGS. 33 and 34 through the motor and the speed-reducing mechanism 137, causing the valve element 133 to rotate together with the rotary shaft 134, the flow passage 131 is opened. The valve element 133 is thus opened to a fully open state. In contrast, when the rotary shaft 134 is rotated in a reverse direction from the fully closed state through the motor and the speed-reducing mechanism 137, the flow passage 131 is closed. The valve element 133 is thus closed to the fully closed state.

As shown in FIG. 34, an upstream passage member 141 is provided in the upstream flow passage 131A of the valve housing 127, while a downstream passage member 142 is provided in the downstream flow passage 131B. Each of the passage members 141 and 142 is made of a resin material in a nearly pipe shape. Each of the passage members 141 and 142 is placed by being fitted in a stepped portion 127a formed in the valve housing 127 corresponding to the upstream flow passage 131A and the downstream flow passage 131B. With the above configuration, the inner surface of the upstream flow passage 131A and the inner surface of the downstream flow passage 131B of the metal valve housing 127 are resinified, so that the thermal mass of each inside is low.

In addition, the upstream passage member 141 is formed, in its outer surface, with a recess 141a to form an air layer 145 between the passage member 141 and the valve housing 127. With this configuration, the air layer 145 forms a heat insulation configuration between the upstream passage member 141 and the valve housing 127.

The foregoing configuration of the EGR valve 121 can be summarized as below.
<Configuration>
A valve device including:
a housing including a flow passage for a fluid,
the flow passage including an inlet and an outlet each provided in the housing;
a valve element to open and close the flow passage; and
a valve shaft on which the valve element is provided,
wherein a passage member for flowing the fluid is provided in the flow passage, the passage member is made of resin, and the passage member includes an outer surface formed with a recess to form an air layer between the passage member and the housing.

<Operations and Effects of the EGR Valve>
According to the EGR valve 121 of the present embodiment described above, the upstream passage member 141 and the downstream passage member 142, which are made of resin and configured to flow an EGR gas (a fluid), are provided inside the upstream passage 131A and the downstream passage 131B of the metal valve housing 127. Thus, the parts of the valve housing 127 corresponding to the upstream passage 131A and the downstream passage 131B are resinified, and their thermal mass is reduced as compared to metal materials. When the EGR gas flows through the upstream passage 131A and the downstream passage 131B, consequently, the temperatures of those passages 131A and 131B can be quickly raised, thus preventing the generation of condensed water in those passages 131A and 131B. Further, since those passages 131A and 131B are resinified, even if some condensed water occurs in those passages 131A and 131B, it is possible to avoid corrosion of the passages 131A and 131B due to the condensed water.

In the present embodiment, the air layer 145 formed between the outer surface of the upstream passage member 141 and the valve housing 127 makes a heat insulation configuration of the upstream passage 131A. This configuration can prevent heat transfer (heat escape) from the upstream passage member 141 to the valve housing 127, thus prompting a temperature rise of the upstream passage 131A.

Specifically, according to the EGR valve 121 in the present embodiment, since the upstream passage 131A and the downstream passage 131B of the metal valve housing 127 are resinified by the resin upstream passage member 141 and the resin downstream passage member 142, the thermal mass of the valve housing 127 is reduced and each of the flow passages 131A and 131B has a heat insulation configuration, so that the temperature of the inner wall of the flow passage 131 can be quickly increased by the heat of EGR gas. As a result, even if EGR is started at a stage where the engine coolant or the outside air is low in temperature, it is possible to reduce an amount of condensed water to be generated on the inner wall of the flow passage 131.

This disclosure is not limited to each of the aforementioned embodiments, and may be implemented with appropriate changes to some of the configurations without departing from the essential characteristics of the disclosure.

(1) In the foregoing third embodiment, the outlet sealing member 25 is provided in the inclined flat outer surface 22a around the opening of the outlet 19 of the inner housing 22, and accordingly a corresponding part of the assembly hole 16 of the outer housing 21 is formed as the inclined flat inner surface 21a. As an alternative, an outlet sealing member may be provided on an inclined and curved outer surface around the opening of an outlet of an inner housing, and accordingly a corresponding part of an assembly hole of an outer housing may be formed of an inclined and curved inner surface.

Figure 35:
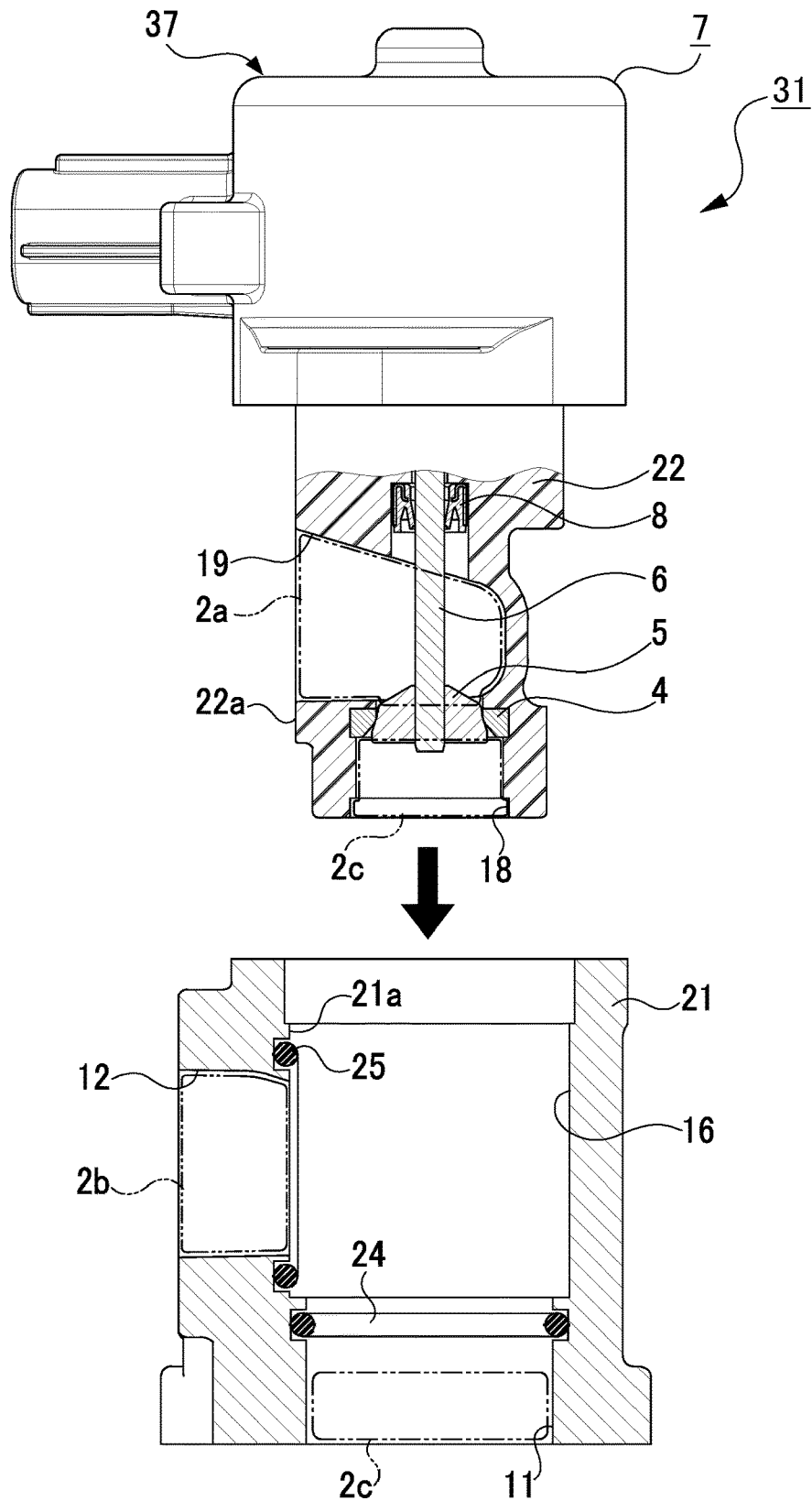
FIG. 35 is a partially-sectional front view of an EGR valve in an exploded state in another embodiment.

(2) In each of the foregoing embodiments, the inlet sealing member 24 and the outlet sealing member 25, 25A, and 25B are assembled to the inner housing 22 or the outer surface 56a, 66a, 76a, 86a, and 96a of the housing 56, 66, 76, 86, and 96, but not provided to the outer housing 21 and the inner surface of the assembly hole 58, 68, 78, and 88, or the assembly hole 98, which are formed in the EGR passage 53, 63, 73, and 83 or the intake passage 93 which are mating members. As an alternative, an inlet sealing member and an outlet sealing member may be assembled to an outer housing and an inner surface of an assembly hole formed in an EGR passage or an intake passage, which are mating member, not to an inner housing or an outer surface of a housing. For instance, as shown in FIG. 35, the inlet sealing member 24 and the outlet sealing member 25 may be assembled in the inner surface 21a of the assembly hole 16 formed in the outer housing 21, not provided to the outer surface 22a of the inner housing 22.

(3) In the foregoing fourth embodiment, as shown in FIGS. 11 and 12, the outer surface 56a around the opening of the inlet 18 provided with the inlet sealing member 24 and the outer surface 56a around the opening of the outlet 19 provided with the outlet sealing member 25 are each formed parallel to the valve shaft 6, and also the inner surface of the assembly hole 58, which faces the outer surface 56a around each opening, is formed parallel to the outer surface 56a around each opening. In contrast, the fourth embodiment may be configured such that the outer surface around the opening of the inlet provided with the inlet sealing member and the outer surface around the opening of the outlet provided with the outlet sealing member are respectively inclined with an orientation that approaches the valve shaft in the direction of assembly into the assembly hole with respect to the direction coaxial with the valve shaft, and the inner surface of the assembly hole, which faces the outer surface around the opening, is inclined to match the inclination of the outer surface around the opening. The same applies to the fifth through eighth embodiments described above.

Figure 36:
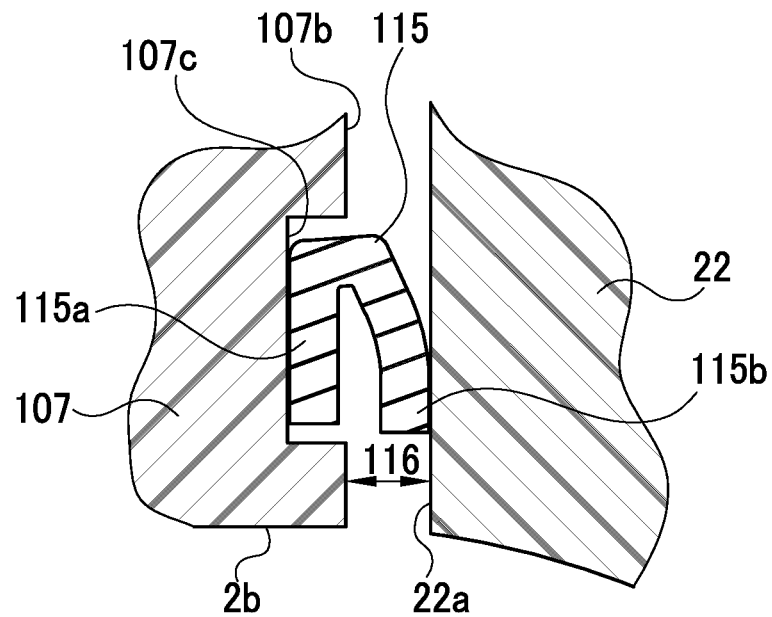
FIG. 36 is an enlarged cross-sectional view, corresponding to FIG. 23, showing a part of an outlet sealing member in another embodiment.

(4) In the foregoing ninth embodiment, as shown in FIG. 23, which is a cross-sectional view, the outlet sealing member 113 is held between the resin inner housing 22, the resin outlet passage member 107, and the metal outer housing 21 to make a sealing structure that can ensure a sealing function while allowing both the positional displacement due to a thermal expansion difference between those members 21, 22, 107 and the positional displacement due to the positive pressure and the negative pressure action on the outlet sealing member 113. In an alternative, as shown FIG. 36, an outlet sealing member 115 is held between the resin outlet passage member 107 and the resin inner housing 22 to make a sealing structure that can ensure a sealing function while allowing both the positional displacement due to a thermal expansion difference between those members 107 and 22 and the positional displacement due to the positive pressure and the negative pressure acting on the outlet sealing member 115. In this case, a slight gap 116 is provided between the outlet passage member 107 and the inner housing 22, and the outlet sealing member 115 is received in an annular groove 107c formed in an end face 107b of the outlet passage member 107. Herein, as shown in FIG. 36, the outlet sealing member 115 is formed in a lip seal having a nearly V-shaped cross section including one side portion 115a placed in an annular groove 107c and the other side portion 115b placed in contact with the outer surface 22a of the inner housing 22. This can ensure the sealing function while allowing slight leakage of the negative pressure of intake air acting from the outlet passage part 2b side. FIG. 36 is an enlarged cross-sectional view of the outlet sealing member 115, corresponding to FIG. 23.

Figure 37:
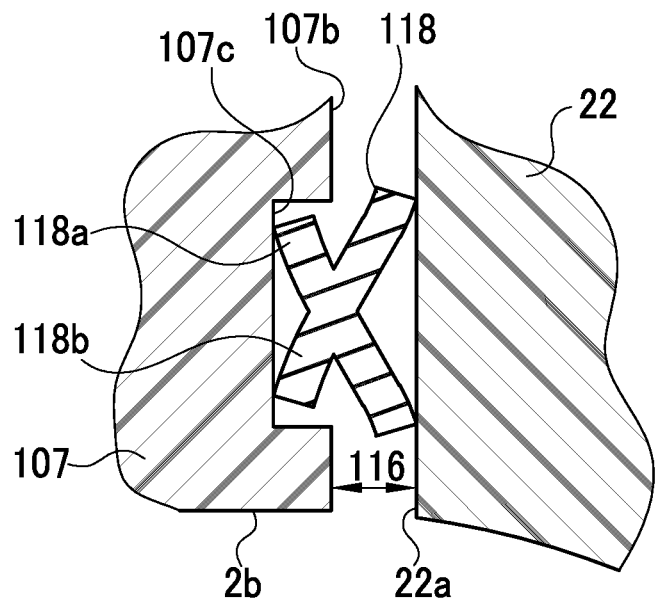
FIG. 37 is an enlarged cross-sectional view, corresponding to FIG. 23, showing a part of an outlet sealing member in another embodiment.

(5) As shown in FIG. 37, differently from the above-mentioned alternative embodiment (4), an outlet sealing member 118 is held between the resin outlet passage member 107 and the resin inner housing 22 to make a sealing structure that can ensure a sealing function while allowing the positional displacement due to a thermal expansion difference between those members 107 and 22 and the positional displacement due to the positive pressure and the negative pressure acting on the outlet sealing member 118. In this case, a slight gap 116 is provided between the outlet passage member 107 and the inner housing 22, and the outlet sealing member 118 is received in the annular groove 107c formed in the end face 107b of the outlet passage member 107. Herein, as shown in FIG. 37, the outlet sealing member 118 is formed of a lip seal having a nearly X-shaped cross section including two side portions 118a and 118b, each having one end placed in the annular groove 107c and the other end placed in contact with the outer surface 22a of the inner housing 22. This can ensure the sealing function while allowing slight leakage of the negative pressure and the positive pressure of intake air acting from the outlet passage part 2b side. FIG. 37 is an enlarged cross-sectional view of the outlet sealing member 118, corresponding to FIG. 23.

(6) In the foregoing ninth to twelfth embodiments, the coaxial opening that opens in the direction coaxial with the valve shaft 6 is the inlet 18 and the inlet sealing member 24 is provided around this inlet 18, while the intersecting opening that opens in the direction intersecting the valve shaft 6 is the outlet 19 and the outlet sealing member 25, 113, 114, or 115 is provided around this outlet 19. In contrast, in the case of reversing the flow direction of EGR gas in the flow passage of the EGR valve from that in each of the foregoing embodiments, the intersecting opening is an inlet and the coaxial opening is an outlet, so that the outlet sealing member 25, 113, 114, or 115 functions as an inlet sealing member and the inlet sealing member 24 functions as an outlet sealing member.

(7) In the foregoing tenth embodiment, the flexible outlet sealing member 114 is provided by filling of an adhesive in a predetermined filling chamber. As an alternative, a soft O-ring, which is less hard than the O-ring adopted as the inlet sealing member 24, may be used to provide a flexible outlet sealing member.

(8) In each of the foregoing embodiments, the valve device is embodied in the EGR valve or the EGR device for flowing EGR gas or in the air-intake device for flowing intake air. However, the valve device also may be embodied in a fluid flow regulating device for regulating other types of fluids.

INDUSTRIAL APPLICABILITY

The present disclosure can be utilized in for example a fluid flow regulating device for regulating a flow rate of a predetermined fluid in an engine system.

REFERENCE SIGNS LIST

1 EGR valve (Valve device)
2a Bent passage part (Flow passage)
2b Outlet passage part (Another flow passage)
2c Inlet passage part (Flow passage, Another flow passage)
4 Valve seat
5 Valve element
6 Valve shaft
16 Assembly hole
18 Inlet (of Inner housing)
19 Outlet (of Inner housing)
19A Outlet
19B Outlet
21 Outer housing (Mating member)
21a Inner surface
22 Inner housing (Housing)
22a Outer surface
24 Inlet sealing member
25 Outlet sealing member 25A Outlet sealing member
25B Outlet sealing member
28 Valve element
29 Valve shaft
31 EGR valve (Valve device)
41 EGR valve (Valve device)
51 Valve device
53 EGR passage (Mating member)
55 Flow passage
56 Housing
56a Outer surface
58 Assembly hole
59 Another passage
61 Valve device
63 EGR passage (Mating member)
65 Flow passage
66 Housing
66a Outer surface
68 Assembly hole
69 Another passage
71 Valve device
73 EGR passage (Mating member)
75 Flow passage
76 Housing
76a Outer surface
78 Assembly hole
79 Another passage
81 Valve device
83 EGR passage (Mating member)
85 Flow passage
86 Housing
86a Outer surface
88 Assembly hole
89 Another passage
91 Valve device
93 Intake passage (Mating member)
95 Flow passage
96 Housing
96a Outer surface
98 Assembly hole
99 Another passage
101 EGR valve (Valve device)
102 EGR valve (Valve device)
103 EGR valve (Valve device)
104 EGR valve (Valve device)
106 Inlet passage member
106a Recess
107 Outlet passage member
107a Recess
109 Air layer
113 Outlet sealing member
114 Outlet sealing member
115 Outlet sealing member
118 Outlet sealing member

The invention claimed is:

1. A valve device comprising:
a housing including a flow passage for a fluid,
the flow passage including an inlet and an outlet provided in the housing;
a valve element for opening and closing the flow passage;
a valve shaft on which the valve element is provided; and
a mating member to which the housing is assembled,
the mating member including: an assembly hole for the housing; and another flow passage,
wherein while the housing is assembled in the assembly hole of the mating member, the inlet and the outlet of the flow passage communicate with the other flow passage, an inlet sealing member is provided between the housing and the mating member, corresponding to a periphery of the inlet, and an outlet sealing member is provided between the housing and the mating member, corresponding to a periphery of the outlet,
wherein at least one of the inlet sealing member and the outlet sealing member is placed in a groove that is formed in at least one of the outer surface of the housing and the inner surface of the assembly hole,
wherein one of the inlet and the outlet opens in a direction coaxial with the valve shaft and the other opens in a direction intersecting the valve shaft,
wherein one of the inlet sealing member and the outlet sealing member is provided between the housing and the mating member, corresponding to a periphery of a coaxial opening that opens in the coaxial direction, and the other is provided between the housing and the mating member, corresponding to a periphery of an intersecting opening that opens in the intersecting direction, and
wherein the inlet sealing member or the outlet sealing member, which is provided corresponding to the periphery of the intersecting opening, has a lower hardness than the outlet sealing member or the inlet sealing member, which is provided corresponding to the periphery of the coaxial opening, and further has a sealing structure that can ensure a sealing function while allowing both a positional displacement due to a thermal expansion difference between at least the housing and the mating member and a positional displacement due to a positive pressure and/or a negative pressure, which act on the inlet sealing member or the outlet sealing member, which is provided corresponding to the periphery of the intersecting opening.

2. The valve device according to claim 1, wherein the outer surface of the housing around the intersecting opening is formed parallel to the valve shaft, and further the inner surface of the assembly hole, which faces the outer surface around the intersecting opening, is formed parallel to the outer surface around the intersecting opening.

3. The valve device according to claim 1, wherein an outer surface of the housing around the intersecting opening is inclined with an orientation that approaches the valve shaft in a direction of assembly into the assembly hole with respect to a direction coaxial with the valve shaft, and further an inner surface of the assembly hole, which faces the outer surface around the intersecting opening, is inclined to match an inclination of the outer surface around the intersecting opening.

4. The valve device according to claim 2, wherein the outer surface around the intersecting opening is curved about the valve shaft, and further the inner surface of the assembly hole, which faces the outer surface around the intersecting opening, is curved to match a curvature of the outer surface around the intersecting opening.

5. The valve device according to claim 1, wherein the flow passage is formed bending from the direction coaxial with the valve shaft to at least one direction intersecting the valve shaft.

6. The valve device according to claim 1, wherein at least the other flow passage of the mating member is internally provided with a passage member for flowing the fluid, the passage member is made of resin, and the passage member has an outer surface provided with a recess that forms an air layer between the outer surface of the passage member and the mating member.

7. A valve device comprising:
a housing including a flow passage for a fluid,
  the flow passage including an inlet and an outlet provided in the housing;
a valve element for opening and closing the flow passage;
a valve shaft on which the valve element is provided; and
a mating member to which the housing is assembled,
  the mating member including: an assembly hole for the housing; and another flow passage,
wherein while the housing is assembled in the assembly hole of the mating member, the inlet and the outlet of the flow passage communicate with the other flow passage, an inlet sealing member is provided between the housing and the mating member, corresponding to a periphery of the inlet, and an outlet sealing member is provided between the housing and the mating member, corresponding to a periphery of the outlet,
wherein one of the inlet and the outlet opens in a direction coaxial with the valve shaft and the other opens in a direction intersecting the valve shaft,
wherein one of the inlet sealing member and the outlet sealing member is provided between the housing and the mating member, corresponding to a periphery of a coaxial opening that opens in the coaxial direction, and the other is provided between the housing and the mating member, corresponding to a periphery of an intersecting opening that opens in the intersecting direction, and
wherein the inlet sealing member or the outlet sealing member, which is provided corresponding to the periphery of the intersecting opening, has a lower hardness than the outlet sealing member or the inlet sealing member, which is provided corresponding to the periphery of the coaxial opening, and further has a sealing structure that can ensure a sealing function while allowing both a positional displacement due to a thermal expansion difference between at least the housing and the mating member and a positional displacement due to a positive pressure and/or a negative pressure, which act on the inlet sealing member or the outlet sealing member, which is provided corresponding to the periphery of the intersecting opening.

8. The valve device according to claim 1, wherein
the inlet sealing member or the outlet sealing member is placed in the groove formed in an outer surface of a part of the housing, and
the assembly hole of the mating member is formed with an opening edge that is chamfered and can contact with the inlet sealing member or the outlet sealing member when the part of the housing is inserted into the assembly hole.

9. The valve device according to claim 6, wherein
while the housing is assembled in the assembly hole of the mating member, a part of the housing is inserted in the passage member,
the inlet sealing member or the outlet sealing member is mounted in a groove formed in an inner surface of the passage member in which the part of the housing is inserted, and
the part of the housing is provided with an end edge that is chamfered and can contact with the inlet sealing member or the outlet sealing member when the part of the housing is inserted into the passage member.

10. The valve device according to claim 1, wherein the fluid is an EGR gas, the valve device includes an EGR valve for regulating a flow rate of the EGR gas, and the EGR valve includes the housing, the flow passage, the valve element, and the valve shaft.

11. The valve device according to claim 3, wherein the outer surface around the intersecting opening is curved about the valve shaft, and further the inner surface of the assembly hole, which faces the outer surface around the opening, is curved to match a curvature of the outer surface around the opening.

* * * * *